United States Patent [19]
Mills et al.

[11] 3,806,804
[45] Apr. 23, 1974

[54] RADIO TELEPHONE SYSTEM HAVING AUTOMATIC CHANNEL SELECTION

[75] Inventors: Lawrence W. Mills; MacDonald J. Wiggins; Lawrence H. Graham; Kampbell T. Larson; Christian C. Pfitzer, all of Orlando, Fla.

[73] Assignee: Martin-Marietta Corporation, New York, N.Y.

[22] Filed: Apr. 6, 1966

[21] Appl. No.: 540,706

Related U.S. Application Data

[63] Continuation-in-part of Ser. No. 463,304, June 11, 1965, abandoned.

[52] U.S. Cl. ..................... 325/55, 340/171, 325/64, 343/227
[51] Int. Cl. ............................ H04j 3/12, H04j 3/00
[58] Field of Search ............ 325/64, 302, 452, 392; 340/171; 343/227, 228

[56] References Cited

UNITED STATES PATENTS

| | | | |
|---|---|---|---|
| 3,268,664 | 8/1966 | Fleissner et al. | 325/302 X |
| 3,358,233 | 12/1967 | Reindl | 325/55 |
| 2,635,228 | 4/1953 | Purington | 340/171 |
| 3,197,563 | 7/1965 | Hamsher et al. | 340/171 X |

OTHER PUBLICATIONS

Alexander et al., Background & Principles of Tacan Data Link, in "Electrical Communication," Sept. 1957, pp. 160–165, 168–170, 173–178.

Goldsmith, Radio Telephony, Wireless Press, 1918, p. 237.

*Primary Examiner*—Maynard R. Wilbur
*Assistant Examiner*—N. Moskowitz
*Attorney, Agent, or Firm*—Julian C. Renfro; Gay Chin

[57] ABSTRACT

This invention relates to an automatic radio telephone system for a large number of users who are not restricted in their geographical locations within a localized area, which automatically provides private, exclusive radio channels when required for communication between users, yet does not require permanent assignment of separate radio channels to every user, thus conserving the radio spectrum. Further, this system by virtue of its automatic operation provides very rapid selection of usable radio channels and connection of one user to another, yet requires no special skills on the part of the user. The system accomplishes these advantages by use of addressing and control techniques generating signals which are transmitted in the same radio channels being used for communications through the system, without interfering with such communications. In addition, signals associated with the addressing and control function are received only by the intended user and are not received by other users.

48 Claims, 43 Drawing Figures

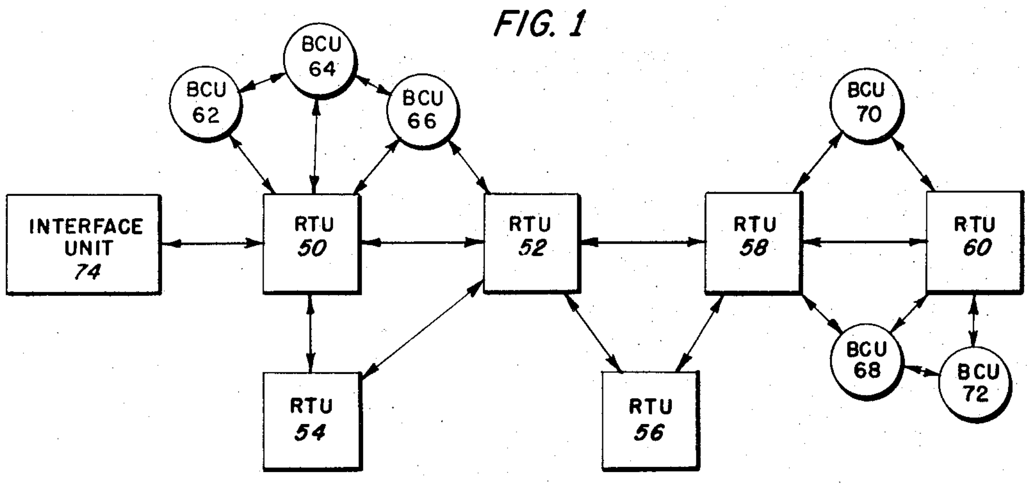
FIG. 4A
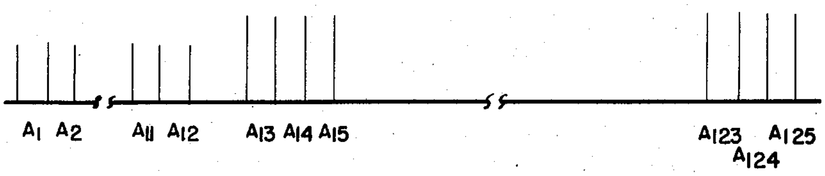
FIG. 4B
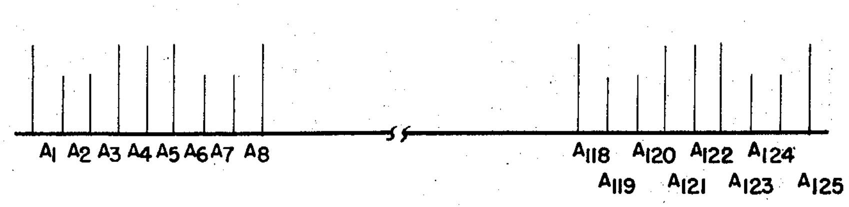
FIG. 4C
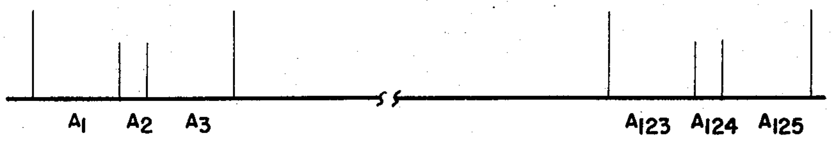
FIG. 4D
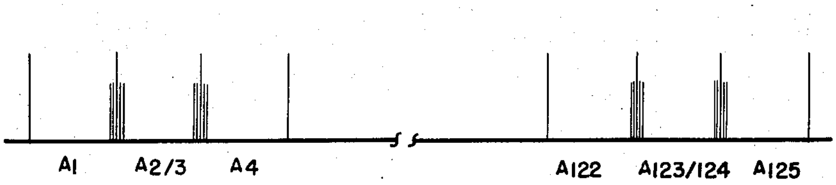
INVENTORS:
LAWRENCE W. MILLS KAMPBELL T. LARSON
MACDONALD J. WIGGINS CHRISTIAN C. PFITZER
LAWRENCE H. GRAHAM
Julian C. Renfro
ATTORNEY INVENTORS:
LAWRENCE W. MILLS KAMPBELL T. LARSON
MACDONALD J. WIGGINS CHRISTIAN C. PFITZER
LAWRENCE H. GRAHAM
Julian C. Renfro
ATTOR.

PATENTED APR 23 1974 3,806,804
SHEET 04 OF 24
FIG. 5A
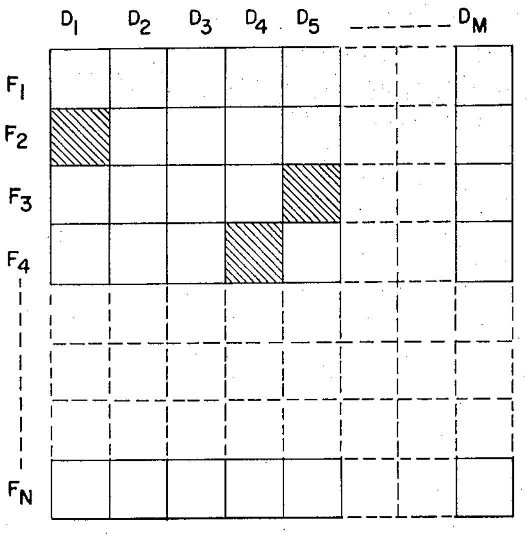
FIG. 5B
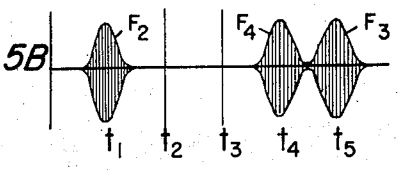
FIG. 12A
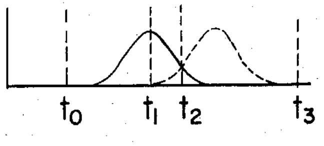
FIG. 12B
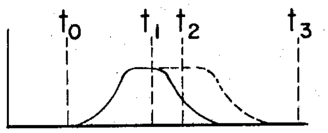
FIG. 12C
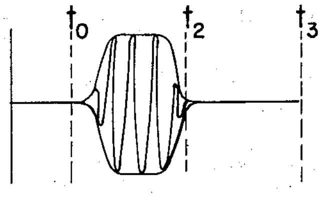
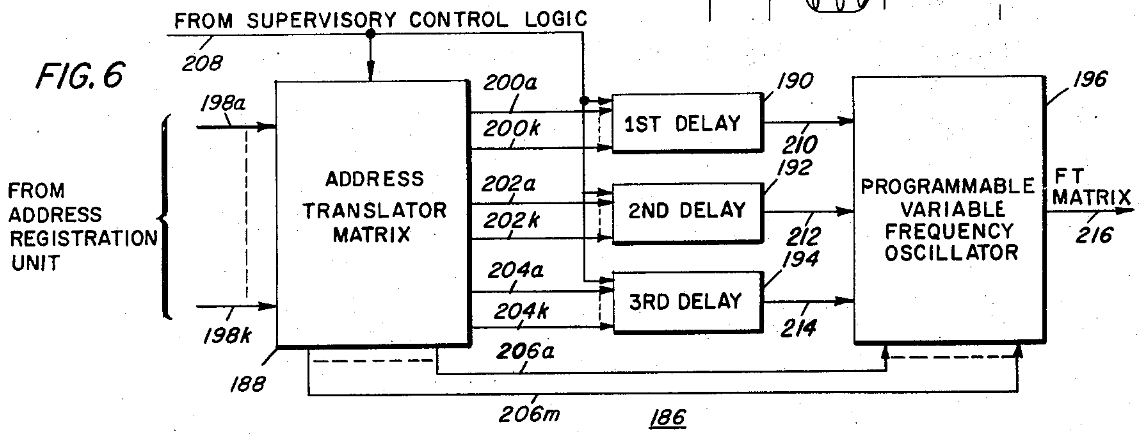
FIG. 7A FIG. 7B
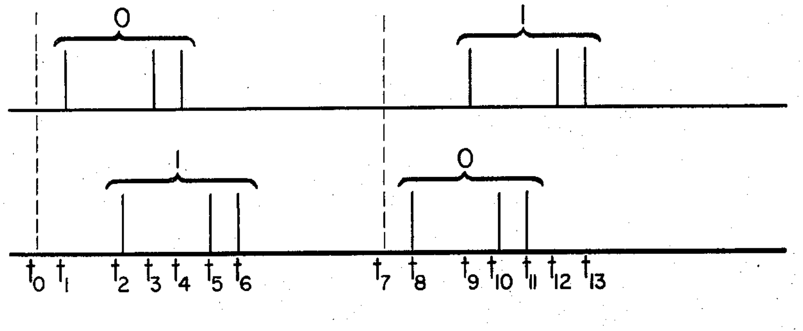
FIG. 13A
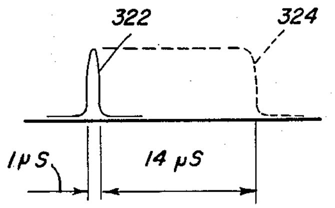
FIG. 13B
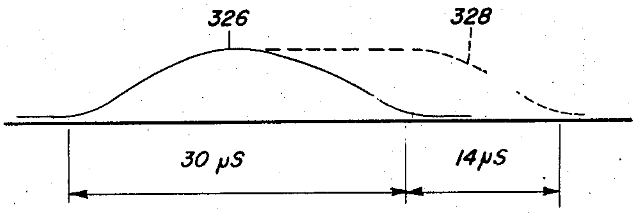

INVENTORS:
LAWRENCE W. MILLS KAMPBELL T. LARSON
MACDONALD J. WIGGINS CHRISTIAN C. PFITZER
LAWRENCE H. GRAHAM
Julian C. Renfro
ATTOR.

RADIO TELEPHONE SYSTEM HAVING AUTOMATIC CHANNEL SELECTION

This application is a continuation-in-part of Ser. No. 463,304, filed June 11, 1965 now abandoned.

This invention relates to a multi-channel automatic communication system, and more particularly to a random access discrete address (RADA) radio telephone system particularly suited for use by a large, highly mobile group, such as a military division or the like. Due to its high mobility, flexibility, fast set-up time, and other features, the system provides substantial improvement over existing "switched" or "wired" communication systems presently in use for such military communication. In addition, the system is capable of replacing many other military communication systems now in use by airborne units, etc., as well as multi-subscriber civilian communication systems requiring an advanced degree of flexibility and automation as well as a great degree of mobility. The invention is not primarily intended to replace commercial wired telephone systems. However, the concepts thereof may be appropriately used to satisfy even the most advanced civilian communication requirements while affording the users a degree of mobility and flexibility heretofore impossible.

BASIC SYSTEM REQUIREMENTS

In a multi-channel radio communication system, whether for military or civilian use, a number of basic requirements must be met. In addition, to render adoption of or conversion to a new system desirable and worthwhile, there must be incorporated a substantial number of convenience features unavailable in alternative systems or in the systems to be displaced.

For example, a primary system requirement is mobility. The system must be susceptible to rapid installation and dismantling, especially for military use where the entire system and its users will frequently, or even continuously, be in transit. There should be a minimum loss of communication facility during movement, with no disruption of communication during the displacement of command headquarters within a stationary military organization.

The system should require a minimum number of external wired connections, both to maximize mobility, and also to minimize the possibility of accidental destruction of wires or sabotage, etc.

The requirement of mobility further dictates that the portions of the system actually to be carried by the users be as small as possible. Thus, it is impractical to require long-range direct user-to-user calls, because of the attendant requirement of high-power transmitters, etc., and the inevitable increase in weight. Nonetheless, since a military division, for example, is likely to be deployed over a substantial area, suitable range extension equipment must be included in the system, to provide intercommunication for all users. Preferably, in order to conserve equipment, it would be desirable to provide one or more range extension units for use in common by all of the basic communication units in the system.

Upon first consideration, it might seem reasonable for the system to be comprised of a large number of basic communication units, and a number of central offices, for providing overall system synchronization and call routing, each of the central offices being associated with a number of basic communication units. To limit range requirements for each of the basic communication units, each one would be arranged to have direct access to one central office, with all communication being established through a series of one or more central offices. This, of course, is basically the configuration employed in present commercial telephone systems.

Unfortunately, military use poses a requirement somewhat in conflict with the central office type system configuration. This requirement may be described as survivability under battle conditions. For example, as may be understood, if under battle conditions, a central office is destroyed, there is substantial disruption of communication for those basic communication units served by the central office. Further, the enemy might attempt to disrupt system communication by various electronic counter measures, such as jamming, whereupon central synchronization would be undesirable, since the enemy could identify the common system synchronizing signal by relatively unsophisticated means, and disrupt communication for the entire system simply by jamming the synchronization channel.

Thus, it would appear that each basic communication unit should have direct access to other nearby basic communication units and should include equipment for establishing local synchronization between the calling and called parties to minimize the need for the central office functions described above. This technique is quite appropriate, in fact, statistical analysis of the communication requirements of a typical army division indicate that well over 50 percent of the expected communication requirements could be satisfied on a direct user to user basis with basic communication units having an operating range of approximately 10 km.

However, this approach requires that a certain amount of supervisory and call establishing equipment be located within each basic communication unit, and thereby conflicts with the above-noted requirement of maximum portability.

Moreover, for a system having an extremely large number of basic communication units, as in the case of the army division, deployed over a large area, e.g., substantially in excess of 10 kilometers, range extension or retransmission units remain necessary in order that the power requirements for the basic communication units do not become so great as to preclude the convenient portability thereof.

In order to protect the long distance calling facilities from disruption due to the destruction of a particular retransmission unit, each communication unit must have access to two or more retransmission units. In such a configuration, i.e., a number of retransmission units and a substantially greater number of basic communication units having access to two or more retransmission units, it may be understood that upon destruction of retransmission unit, its functions would be distributed to the remaining operative retransmission units until the in-operative one was replaced or repaired.

A further requirement somewhat related to those of mobility and survivability is one of user inter-accessibility. The system should be designed so that any party anywhere in the system can rapidly and conveniently reach any other party, either directly or through a network of retransmission units, as described above. For a wired telephone system, this presents no particular difficulty, since the location of each telephone unit remains fixed, and can be reached through one or more predetermined or alternative paths through a single fixed central office. Given the availability of a communications channel, a connection can be made to the telephone of the called party unless such unit is in use or unattended. (It might be noted that with the most advanced wired commercial communication systems, a call directed to a particular user may be transferred from his normal equipment to that of another system user when the normal equipment is to be unattended.)

In the case of a mobile radio telephone system, nonattendance of such basic communication unit is minimized since the user will often take his equipment with him. However, in a system using short-range, highly mobile basic communication units, the problems may be vastly increased by the facility of the system to permit direct interconnection of basic communication units over short ranges, with routing through one or more retransmission units for long distance calls.

For example, even though each basic communication unit and retransmission unit may be assigned a unique identifying address, the calling unit does not know whether the called unit is within direct call range or whether the call must be established through the retransmission unit network. In the event that it is necessary to establish the call through the retransmission unit network, the calling unit may know neither the identity nor the location of the nearest retransmission unit. As for the retransmission unit itself, once it has been located by the calling basic communication unit and instructed to search for the called party, the retransmission unit itself has no prior information as to whether it can directly reach the called basic communication unit or whether it is necessary to establish the call through the retransmission network and if so, what the appropriate path would be to reach the desired party. Further, the retransmission unit itself may be mobile, or worse, will be adapted for frequent removal and redeployment in order to follow mass movement of the entire system, or reorientation of parts of the system. Under such circumstances, the retransmission unit network itself posses no fixed configuration, and without highly adaptive search programming, even the interconnection of retransmission units within the range extension network itself would be time-consuming or even impossible. Thus, it may be seen that fixed or predetermined routing programs become impractical or impossible, and that the search facilities throughout the system must be adaptable to considerable random variation of system configuration.

As previously noted, installation of a highly complex system, such as described herein, (or the substitution thereof for previously existing equipment) will depend in part upon the attractiveness of the new system from the standpoint of operational convenience. For example, in a mobile system, it may be expected that the attention of the user will be divided between the function of establishing the desired call and some other function, such as driving a vehicle. Thus, it is most desirable that the communication system be substantially automatic in operation, and that the mechanics of actually placing the call be made as simple as possible. A consideration of the pertinent "human factors" indicates the desirability of making the system operation, insofar as the user is concerned, as much as possible like that of the typical commercial telephone system. In other words, in order to place a call, the user should only be required to lift his handset and register the identification or address of the called party. The registration may be by dialing or more preferably, by push buttons, since the latter method has provided to be more reliable and convenient.

In addition, an operational convenience which should be included in the system, is the provision for transmission of data information, or other non-voice messages. In other words, the modulation techniques, channel bandwidth, and other system parameters must be such as to accommodate a wide variety of input information formats. Among these formats should be teletype, facsimile, etc., and in the case of military use, the system should readily accommodate the connection of various encryptation units and complementary decoders, in order to permit secret or secure communication.

A further highly desirable and convenient feature in multi-channel systems of the present type may be termed channel privacy. In other words, once a call is established, there should be little or no likelihood of unauthorized listeners accidentally or intentionally monitoring the call. However, the system must be sufficiently flexible to permit the establishment of multiparty conference calls or to permit the interruption of a call which is in progress by certain priority users, in order to reach one of the parties with a priority message. In addition, under certain circumstances it is further desirable that the system include facilities for a general network alert call whereby the transmission of a message over the retransmission unit network simultaneously to all users is possible.

A further basic system requirement may be termed "equipment compatibility". For example, in a case of partial introduction of the present system into an organization already having an existing communication system, it will generally be necessary to permit the establishment of communication between users of the new and old equipment. Similarly, even when the entire military or other organization which has been equipped with the present system, there will often arise the necessity of permitting communication between users of the present system and members of an unrelated organization using a different system. Thus, there must be provided suitable adapters or interface equipment accessible to all, or at least a predetermined number of users, to facilitate such intersystem communication. Preferably, in order to provide convenient access to the interface units, it would be desirable to permit access thereto through an associated retransmission unit and addressable by the basic communication unit in the manner previously described for placing a normal intrasystem call.

Finally, in addition to all of the above-described requirements and desirable features, there exists the extremely important consideration of frequency spectrum practicability.

First, there arises the necessity of finding a suitably clear portion of the spectrum in which the communication system is to operate. Among the considerations which must enter into the final determination of an appropriate portion of the spectrum are the indigenous RF noise level, propagation path attenuation, availability of RF power devices useful at the frequencies of interest and sufficiently compact to assure portability, and the actual system bandwidth requirements. The final system must be able to quickly and efficiently serve all of its users, in the various ways described above with minimum self-interference and jamming. Of course, the frequency allocation will be determined in part by the additional requirement that interference with equipment operating on nearby frequency channels be minimized. In fact, the system should be designed, and frequency channels appropriately alloted to permit coexistence with unrelated equipment operating at one or more points within the band of frequency aloted to the new system.

In addition, the requirement of bandwidth efficiency becomes quite critical with a large number of basic communication units and a moderately high use factor. Frequency allocation for the system must be determined in part by the frequency bandwidth actually needed to provide the desired quality of service for each conversation, or alternatively, a suitable channel allocation must be devised such that an overall frequency range may be effectively used for the number of simultaneous conversations anticipated.

As will be explained subsequently, it may be shown that the straight-forward approach of providing individual exclusive frequency channels for each basic communication unit in the system, is highly wasteful of the already crowded frequency spectrum, and is therefore an unsatisfactory solution to the channel allotment problems mentioned above. Therefore, it becomes necessary to provide for the sharing of a number of frequency channels by a number of basic communication units which exceeds by a considerable amount the number of channels available. To this end, the system must be designed to identify and distribute the available channels to those basic communication units desiring to place a call. Of course, the total number of channels available will be determined on the basis of the expected average simultaneous use requirements for the system in light of various environmental factors and the intended system use. Since there may be times when the actual channel demand will exceed that predicted in designing the system, there arise two addition requirements which must be met to provide an efficient and useful system. First, as demands on the system exceed its peak traffic design capacity, the system performance in terms of channel quality and time to establish a connection between users should fall off or be degraded gradually. The system should not abruptly cut off service to calls in progress nor should it refuse service to new calls. Thus, means must be provided in the system to vary the channel selection criteria whereby, as traffic demands increase, subsequent calls will be placed on channels of lesser and lesser quality whereby the quality of communication, though lower than during conditions of reduced traffic demands, may nonetheless be acceptable under the extreme conditions causing the traffic overload.

In addition to the above requirement for gradual degradation of system quality and in view of the fact that the many basic communication units which comprise the system may well be spread over a considerable geographical area, there exists the possibility that even though a particular frequency channel may be in use in one area of the system, because of the shielding effects of the terrain or for other reasons, it may be possible to reuse the same channel in a distant portion of the system. Accordingly, in addition to the above requirement to gradual degradation, there exists the requirement that the system be able to determine when a channel is free and its intended area of communication even though perhaps in use in some distant area and to permit the reuse of such channel. Thus, there is provided a maximum use of a limited frequency spectrum, resulting in improved communication quality and peak traffic capacity.

As may be understood from the above discussion, any communication system when configured for specific application (such as providing radio communication for an army division) will involve many compromises including to name only a few, bandwidth efficiency, reliability, susceptibility to jamming, mobility, flexibility, and complexity as well as convenience of operation and range of services available to the users. The present system represents an optimum compromise of all features and is designed to afford the user all of the capabilities of the prior switch or radio systems, plus operational features not heretofore available, and at the same time to provide an increase in operational simplicity, and efficient spectrum.

PRIOR TECHNIQUES

Neither the presently available systems of wired or radio-type, nor systems employing traditional approaches to channel allotment have been found to meet the requirements which motivated the development of this invention. For example, a communication system for use by an army division, would be required to serve approximately 2,000 or more users (i.e., separate addresses) with approximately a 40 percent use factor. In other words, for each army division served by this system it must be possible to accommodate approximately 400 simultaneous transmissions, or 800 off-hook subscribers while providing high-quality channels for substantially all of the conversations. In addition, the system must be readily adaptable for use by an entire 20 division field army (i.e., approximately 40,000 or more subscribers) while providing direct inter-accessibility among all subscribers with a minimum amount of effort and delay. In addition to these numerical requirements, there remain all the requirements of mobility, flexibility, survivability, etc., discussed in detail above, which must be met. As noted, the above combination of desirable and required features, heretofore unavailable, are provided by the present system and will justify the replacement therewith of many of the switched communication systems presently employed.

The simplest approach to channel allocation in a multi-channel communication system would be to assign a single communication channel of appropriate bandwidth to each basic communication unit in the system. With such an arrangement, a particular party could be reached by transmitting an appropriate message over the assigned channel. This approach may be termed "exclusive channel allotment."

A system of this type could easily meet the requirements of mobility, flexibility, etc., and would require an extremely low bandwidth per channel. However, even for a moderately large number of users, the total system bandwidth required would rapidly become so large as to be prohibitive. Of course, if substantially all users were expected to require a communication channel at all times, the exclusive channel assignment approach would be feasible; however, analysis indicates that a maximum use factor of approximately 40 percent may be expected. Accordingly, it may be understood that at least 60 percent of the frequency channels allocated to the system would be idle at all times. Such a waste of the frequency spectrum is unacceptable, and therefore the exclusive channel assignment approach cannot be successfully applied to the military requirements outlined above.

The opposite approach is exemplified by those multiparty communication systems in which all the basic communication units utilize the same frequency spectrum and incorporate coding techniques which identify the desired party. Each basic communication unit in such a system responds only to messages directed to its unique address, so as to permit the concurrent use of the spectrum by all of the basic communication units. Such a technique, which might be described as cochannel frequency assignment, is exemplified in a system disclosed in assignee's co-pending application of McKay Goode, Ser. No. 107,194, filed May 2, 1961, and titled "Discrete Address Communication System with Random Access Capabilities", now U.S. Pat. No. 3239761. This system, which is particularly suited for use with a moderately large number of subscribers, e.g., up to about 700, employs a so-called frequency-time (FT) matrix by which each addressee is identified. The FT matrix, to be described in detail subsequently, comprises a repeated pattern of pulses at a plurality of frequencies, and with a pre-determined time spacing. The presence or absence of the entire frequency-time matrix or the position thereof within an extablished time slot may represent the digits 1 and 0 respectively in a binary code. A unique FT matrix is provided for each basic communication unit in the system, whereby a message for a given basic communication unit, transmitted on the appropriate frequency-time matrix, may unambiguously be received by the desired party.

As in the case of exclusive channel assignment, such a system is capable of satisfying the tactical requirements discussed above, and further, a large number of discrete addresses can be accommodated. However, use of such a system with a large number of basic communication units and a high ratio of inactive to active users (i.e., a moderately low traffic or use factor) has proved to be impractical for two primary reasons:

1. Since the message information has to be sent redundantly over several channels to satisfy the matrix addressing requirements, spectrum is wasted; and
2. The duty factor (e.g., as indicated by message pulse density) for even a single channel of message transmission is several hundred times that required for the information needed to establish addressing and supervisory control, thus multiplying the problem of redundancy even further. In effect, to obtain any reasonable message capacity, bandwidth efficiency must be very low, and the cochannel frequency assignment approach, at least in systems having more than approximately 700 basic communication units represents only a slight improvement over a system employing exclusive channel assignment.

A somewhat different approach involves what might be termed adaptive channel assignment. According to this technique, a number of common communication channels are provided as determined by the expected system use factor, and whenever a basic communication unit desires to place a call, it is assigned any one of the common channels which happens to be free at the time.

Equipment-sharing techniques somewhat analogous to adaptive channel assignment are in common use in commercial telephone systems whereby the cost of providing high-quality telephone service to a large number of subscribers may be reduced considerably from that in which equipment-sharing techniques are not used. Also, time division multiplex systems such as the so-called time assigned speech interpolation (TASI) type are known in which an adaptive channel assignment is made on the basis of instantaneous needs and may be changed during breaks in the message to be transmitted. Such systems may result in efficient use of the frequency spectrum; however, they are quite complex and must be closely synchronized. Therefore, such an approach would not provide the degree of mobility and survivability required for tactical communication systems.

A modification of this approach involves what might be termed as an adaptive-exclusive channel assignment. According to this approach, a channel, once assigned to a particular call, is retained by the calling and called parties throughout the entire communication and is only released after the call has been completed. A system of this type overcomes the highly inefficient use of the spectrum characteristic of purely exclusive channel assignment systems and in addition, provides high bandwidth efficiency for each channel, as in the case of exclusive channel assignment.

One example of the adaptive-exclusive approach is found in U. S. Pat. No. 2,629,092, entitled "Multi-Channel Mobile Telephone System", issued to Roswell H. Herrick. In this system, there are provided a number of communication channels for common use by all of the mobile units of the system. Each mobile unit is tuned to the same channel and includes a receiver to sense the presence of a call directed to that unit. Addressing is provided by a multi-pulse code such as produced by a telephone dial switch. As succeeding groups of pulses are received by each receiver, and it determines that the appropriate address for that receiver is not the one being transmitted, each such unaddressed receiver steps to the next available communication channel and rests there. The intended callee remains on the original channel and the communication occurs over that channel. Once the call is completed, the callee also steps to the next available channel whereby all non-busy mobile units are tuned to the same channel.

This approach has not proved to be satisfactory to meet the tactical requirements set forth above. In particular, the supervisory signaling functions (e.g., addressing, ringing signals, busy signals, etc.) are provided over the same channel as will eventually be used for the call being placed. This significantly limits the use of such a system. For example, when the basic communication units of the system are spread over a wide area having diverse geographic features in many instances, the particular channel being guarded by all free mobile units may be noisy or otherwise unusable in the area of one or more basic communication units. Furthermore, the system is by its very nature tied to a synchronized central office, and therefore could not meet the basic requirements of survivability.

Further, according to the system of the Herrick patent, calls may be placed between fixed units and the various mobile units or between the mobile units and the various fixed, but not between mobile units. In addition, none of the various convenience features described above, (e.g., conference calls, compatibility with a wide variety of message formats, etc.) are provided.

Thus, while adaptive exclusive message channel assignment represents a valid conceptual approach to the problem of large-scale military and civilian communication, presently available embodiments thereof, as exemplified by the Herrick system, have not provided a satisfactory solution to the various multi-faceted problems involved.

BRIEF DESCRIPTION OF THE PRESENT INVENTION

According to the present invention, the concept of adaptive-exclusive message channel allotment is exploited to its fullest advantage by the employment of improved assignment techniques to provide system supervisory functions.

As previously noted, the requirements of survivability dictate a system configuration including a large number of highly mobile basic communication units, and a smaller number of range-extension or retransmission units arranged to form a relay network. In the present system, each basic communication unit is provided access to other basic communication units which happen to be in range, and access to all of the remaining basic communication units (i.e., those out of its local range) through one or more of the retransmission units in the range-extension network.

In order to achieve optimum utilization of the frequency spectrum and efficient equipment operation, it has been found desirable to divide the total frequency spectrum available for the system into separate bands for direct intercommunication between the basic communication unit and the retransmission units, and for communication between retransmission units.

According to this invention, separate and distinct sub-systems and channel assignments are provided for the transmission of supervisory control information, and for transmission of the actual voice or data messages in each of the bands listed above.

In one suitable embodiment, there are provided a number of narrow-band, all-pulse, single-frequency channels for duplex transmission of voice messages, data, facsimile, etc. As noted above, the channels are grouped for interconnection of basic communication units, for interconnection of retransmission units, and for connection of retransmission units and basic communication units. Any pulse format may be provided for the message transmission; for example, pulse-position modulation, quantized pulse-position modulation, Delta modulation, pulse-code modulation, etc. is suitable.

In addition, in order to reduce the overall transmitted power (and to correspondingly reduce the power supply and weight requirements of the basic communication units) there may be included in the system suitable means to analyze the modulated waveform, and to inhibit the transmission of redundant portions thereof. Suitable apparatus to accomplish this function is disclosed in assignee's copending U. S. Patent application of Spyros G. Varsos and William Taylor Douglas, Ser. No. 496,495, filed Oct. 15, 1965, entitled "Redundancy Elimination System" now U.S. Pat. No. 3,378,641.

Alternatively, the narrow-band message channels may employ suitable continuous wave modulation techniques such as FM, AM, SSB, etc. However, it has been found that the various pulse modulation approaches are more satisfactory than the continuous-wave techniques for satisfying the requirements of military security and duplex operation. The narrow bandwidth of the channels (e.g., approximately 50 kc) implies that fairly wide pulses (25 to 30 microseconds) must be used. However, this is advantageous from the point of view of reducing multipath effects as well as from the resultant reduction in bandwidth requirements.

As previously mentioned, an entirely new approach to the transmission of supervisory control signals is necessary with the sophisticated channel allocation and re-use techniques employed in the present invention, and with the possibility of geographic disparities in channel availability, and further in view of the fact that the message channel itself is most advantageously not allocated to the calling party until after the call is initiated.

According to the present invention, therefore, it has been found that the optimum features of both the exclusive-channel systems and the co-channel systems may be obtained by using the adaptive-exclusive channel allocation approach only for message channels, and by using the co-channel technique for addressing and other supervisory purposes. It has been found that through such a combination, the disadvantages of the co-channel technique for message transmission, — viz, poor bandwidth efficiency — is eliminated and replaced by the high bandwidth efficiency of the exclusive-channel technique. Similarly, problems inherent in the exclusive-channel techniques are overcome by the fact that with the co-channel addressing technique, each unique address signal can be modulated by members of a low duty-factor code set (e.g., binary code words having relatively few digits) to achieve effective and non-ambiguous addressing and supervisory control. This result is summarized in Table I set forth below.

TABLE I

| CO-CHANNEL | Adaptive-Exclusive | EXCLUSIVE |
|---|---|---|
| Advantages: Takes advantage of information statistics. Many addresses directly - without centrals - if within range. Disadvantages: Poor bandwidth efficiency. (high duty factor for message transmission) | Advantages: Same as Exclusive for bandwidth efficiency and quality for message transmissions (i.e., high message capacity). By adaptively using only the number of channels representing the capacity needs, a high capacity utilization can be realized. Result: High bandwidth efficiency. | Advantages: Good bandwidth efficiency for good message quality (while actually in use.) Disadvantages: Too many channels required to address large number of subscribers, i.e., one channel per subscriber. Result: Net loss bandwidth efficiency. Cross-talk and adjacent channel interference due to range extremities, i.e, close-up independent transmitter and distant desired transmitter. |

According to the co-channel addressing and supervisory signaling technique, each basic communication unit is provided with a coded address, which is modulated in accordance with the particular supervisory or addressing message to be sent, and is transmitted over one or more narrow-band channels especially provided for supervisory signaling. Thus, all basic communication units utilize a common set of narrow-band channels on a co-channel basis. If the modulation or coding used is such that the various addresses are statistically independent (i.e., orthogonal), all basic communication units may utilize the common band simultaneously, with negligible mutual interference.

One suitable co-channel technique employs the so-called F-T matrix disclosed in the McKay Goode patent identified above. Here, each basic communication unit and retransmission unit is assigned an address which comprises a series of tones corresponding to a number of the frequencies in the narrow band provided for supervisory signals; which tones are transmitted in a predetermined sequence and having predetermined delays therebetween. Simultaneous transmission of tones is avoided in order to reduce the transmitted power.

For purposes of encoding on the address signals of the various supervisory messages required, each of the series of tones (the so-called F-T matrix) may be considered as a single pulse, and the message may be encoded thereon by time-shift keying modulation. Thus, the message, an appropriate sequence of 1's and 0's in a binary code, may be represented by the relative position of successive F-T matrices within established time frames. Alternatively, the presence or absence of individual F-T matrices within established time frames may be employed to represent the digits 1 or 0 in the binary code.

The supervisory and message channels may be on separate portions of the overall spectrum, either continuous or non-continuous. However, under conditions where electronic countermeasures such as jamming may be expected, it would be possible to disrupt all communications by merely jamming the supervisory channels. For civilian usage this, of course, is not considered a problem. However, for military applications, it would be unsatisfactory, and in order to minimize this problem, it is more desirable to employ in-band signaling techniques for the supervisory channels. In other words, the supervisory channels should preferably be hidden among the message channels. In this way, an enemy would necessarily be required to spread jamming energy across a relatively wide band of frequencies to effectively deny use of the system by interfering with the signaling functions.

One suitable in-band signaling technique would be to interleave the supervisory channels between the message channels. An alternative approach would be to overlay the supervisory channels throughout the spectrum. The choice of techniques would depend upon the degree of mutual errors which may be tolerated. Using the interleaved channel approach would result in less interference between the supervisory and message channels than would the overlaid channels; however, this might somewhat simplify the task of the enemy jammer since the identity of the supervisory channels could more readily be determined. Fortunately, in practice, it is found that supervisory and message functions may actually share the same channels, and that the few omissive and comissive errors which might occur can be tolerated without noticeable degradation. This may best be accomplished by randomly distributing the frequencies which comprise the address throughout the entire message channel spectrum. Such distribution, plus the low duty factor of supervisory signal messages, results in negligible interference with the message channels. Furthermore, the voice or data messages are all transmitted on a single channel, and to interfere with the supervisory control, several message and supervisory signals would have to be correlated in frequency and time. The probability of occurrence of such a condition is extremely small. Therefore, message and supervisory signals can exist on all channels throughout the spectrum, thereby reducing the susceptibility of the system to hostile jamming.

One possible modification of the interleaved signaling channel technique permits the use of a single frequency channel for each address, rather than the frequency time matrix described above. Each address may be comprised of a single supervisory channel frequency plus a second identifying signal characteristic. Such identifying signal characteristic could be a binary code, an audio tone or combinations of audio tones. Several addresses could then share the same frequency, by assigning different second signal characteristics thereto. The various supervisory signaling functions could then be transmitted by appropriate modulation of the appropriate identifying frequency or other signal characteristic.

Operation of the system, as far as the user is concerned, is very the single to that of the conventional telephone. In other words, by merely inserting an address into his instrument either by means of a dial switch, or by means of an array of buttons, the user may communicate with any other user in the system either directly, or through the range extension network. In means of the interface equipment detector, referred to, it is also possible to establish communication paths into unrelated communication systems such as wired systems, or other radio systems.

Once the address of the desired party is registered, as described above, the entire process of selecting an available channel, locating the called party, and establishing a connection is initiated automatically, under the control of the caller's basic communication unit.

Each basic communication unit is capable of evaluating the usability of the message channels in its particular area and selecting an available channel for subsequent communication purposes. The channel so selected is used for communication of the actual information message, while supervisory signaling takes place over the channels appropriate to the particular basic communication unit being addressed — i.e., the frequency or frequencies which identify the unique address of the particular basic communication unit. Message channel selection is based on signal and noise conditions, i.e., a channel having a noise level above a certain predetermined value is considered to be unavailable.

In order to provide the gradual degradation of system service under conditions of increased traffic demands, the system may be arranged to employ a number of selection criteria. For example, an initial channel availability search can be made in which only a channel having substantially no noise or signal appearing thereon is selected. In the event that such a channel cannot be found, means may be provided to search for a less acceptable channel. One technique to accomplish this would involve determining the path loss between the calling and called units, and varying both the transmitted power and the receiver sensitivity in both units to exactly compensate for such path loss. Then, the selection can be effected by measuring the quality of the channel at a slightly higher receiver sensitivity than that required by the path loss, and by transmitting with a probing signal of slightly higher power than necessary for the measured path loss and receiver sensitivity. Each receiver unit may include equipment to respond to received probing signals and to provide an indication to the interrogator if the channel being interrogated is in use. Thus, if a probe signal is responded to, then in all probability communication—even with transmission at a slightly lower power level than that of the probe signal and reception at slightly less sensitivity than used for the test, i.e., at levels previously determined by consideration of path loss—is likely to be of degraded quality. However, if no better channels are found, indicating high traffic demands, successive measurements may be made at higher power and sensitivities, in order to find an acceptable, though lower quality, channel. By this technique, it is possible to reuse a channel even if the first conversation on the channel is only slightly out of range of the parties to the second conversation.

To establish the call, a calling basic communication unit transmits over the co-channel address of the called basic communication unit, a signal to indicate that a connection to it is desired. The called basic communication unit will return a message indicating either that it is busy or that it is available. This message is sent on the co-channel address of the called rather than the calling basic communication unit, both to simplify tuning of the receiver in the calling basic communication unit and also to avoid the necessity for the calling unit to initially identify itself. (No ambiguity of intended recipient will result, since the calling unit will respond only to the co-channel address of the called unit if the supervisory message is "busy" or "available.") Upon return of the busy signal, the operator of the calling basic communication unit will be so notified, as by an audible signal. Upon the return of an availability signal, the calling basic communication unit will automatically transmit to the called basic communication unit a signal identifying an available channel over which further communication may be conducted.

If the proposed channel is satisfactory to the called basic communication unit, it will so signal over the proposed channel; but if the channel is noisy, in use, or otherwise unavailable in its local area, it will transmit an appropriate message to this effect, again, over the proposed channel. (The unavailability of the proposed channel in the vicinity of the called basic communication unit does not prevent the transmission of the unacceptability signal thereover, since the channel is presumed to be available both for transmission and reception in the vicinity of the calling basic communication unit and the momentary interference with the users of the channel will be negligible.) As may be understood, once a message channel is identified for the called basic communication unit, all subsequent communication may take place thereover, in order to conserve the supervisory channels and, in case of multifrequency addresses, to limit the power transmitted.

If the called basic communication unit returns a channel unavailability signal, then the calling basic communication unit proposes another channel, and the process is repeated until a mutually satisfactory channel is found. At this time, a ringing signal is sent to the called basic communication unit and a ring-back signal is provided to the calling basic communication unit. In response to the ring signal, the operator of the called basic communication unit may be audibly notified and, upon his response to the call, communication may begin. Assuming the availability of the called basic communication unit in the area of the calling basic communication unit, the entire process outlined above may be accomplished automatically in less than one second.

In the event that no initial response is received from the called basic communication unit within a predetermined time period, the calling basic communication unit assumes that it will be necessary to establish communication through the range extension network, and is automatically switched to the so-called "basic communication unit to retransmission unit" mode of operation.

In the "basic communication unit to retransmission unit" mode of operation, adaptive channel assignment techniques are also employed. More specifically, the basic communication unit sequentially calls all the retransmission units in the system on their normal co-channel addresses until one is reached. During the call-up, the calling basic communication unit provides sufficient supervisory information to the retransmission unit for the call to be completed. Such information includes the calling basic communication unit's address, the called basic communication unit's address, message type and call priority. Responsive to receipt of the above information, the retransmission unit automatically initiates a search for the called basic communication unit on the appropriate co-channel address. Upon establishing contact, a suitable message channel is assigned by the retransmission unit, and both the calling and called basic communication units are notified of the assignment. The retransmission unit may be designed such that either the same channel is assigned for transmission both between the calling basic communication unit and the retransmission unit, or, if desired, different channels may be assigned to the two portions of the connection in accordance with local availability.

As may be understood, either 3FT or single frequency plus code word addresses may be used for the retransmission units. However, the retransmission may alternatively select its own address by adaptive acquisition of a free channel and generation of its identification thereon as in the case of the retransmission unit to retransmission unit calls described hereinafter.

If the retransmission unit contacted by the calling basic communication unit is unable to reach the called basic communication unit by a direct search, there is provided means to establish connections sequentially to each of the remaining retransmission units in the range extension network, to effect local searches for the called basic communication unit in the system. Since, in general, each retransmission unit will not have direct access to all of the remaining retransmission units, means are provided to permit a relay from the first retransmission unit through two or more of the remaining retransmission units as is necessary in order to provide a contact to each of the remaining retransmission units in turn. Thus, there is provided a technique whereby if the initiating retransmission unit is unable to directly contact the called basic communication unit, a sequential search is made by which the entire area served by the system may be logically and rapidly searched. It has been determined that under the worst conditions, the entire sequential search outlined above may be accomplished in approximately 17 seconds or less for a system having 2,000 or more basic communication units and 6 to 10 active retransmission units.

For the sequential search, a so-called "block adaptive channel assignment" technique is employed. Each block contains a number of channels, one or more of which is employed for supervisory purposes. Supervisory message information may be transmitted to the remaining retransmission units on either multifrequency addresses or on single frequency plus code word addresses as in the "basic communication unit to retransmission unit" and "basic communication unit to basic communication unit" calls previously described. Preferably, however, supervisory signaling is provided by on-off keying of one of the supervisory frequencies of the block of channels being used.

As previously mentioned, the present system contemplates that during use there may be considerable reorientation of the communication network, including repositioning of the retransmission units. Accordingly, in order that all retransmission units actively operating within the system may be kept up-to-date as to the instantaneous configuration of the system, means are provided in each retransmission unit to initiate a learning and identification process immediately upon its entry into the system, and to initiate a withdrawal program immediately prior to its disconnection. Each entering retransmission unit interrogates all of the blocks of channels assigned for "retransmission unit to retransmission unit" communication, to determine which of the remaining retransmission units are directly accessible and which may be only reached through one of the accessible retransmission units. This information is stored in the retransmission unit for use during subsequent sequential searches. Similarly, all the retransmission units contacted by the entering retransmission unit store identifying information as to the accessibility of the newly unit, retransmission unit whereby the entrant is rapidly assimilated into the system.

Upon the anticipated withdrawal of a retransmission unit from the system, information to this effect is transmitted to all retransmission units; which units are then requested to transmit such information to the remaining retransmission unit, whereupon no further calls may be directed to the retransmission unit leaving the system.

It is therefore one object of the present invention to provide a novel radio communication system.

Another object of the present invention is to provide a tactical communication system satisfying the field telephone requirements of an army division, or other organization requiring a highly mobile communication network connecting a large number of users.

It is also an object of this invention to provide communication for a substantially larger number of parties than the number of radio-frequency communication channels available in order to achieve a high order of bandwidth efficiency.

It is a further object of this invention to provide a radio-telephone system in which calls may be accomplished on a direct user-to-user radio path without necessity of routing through a central switching station, in order to reduce the complexity of the system and to improve the survivability of the system under battle conditions.

It is also an object of the invention to provide a wireless communication as described above in which long-distance calls are transmitted through one or more retransmission units in a range extension network and which provides for a search by all the retransmission units in the network in sequence in order to locate the called party.

It is a further object of this invention to provide a wireless communication system as described above in which each of the retransmission units is provided with the capability of analyzing and adapting itself to variations in the range extension network configuration.

A further object of this invention is to provide a wireless communication system as described above in which each basic communication unit is provided with the capability of contacting any other basic communication by knowing only the unique address associated with that basic communication unit, and with no a priori information regarding the geographical or organizational location of either the calling or the called basic communication units or the configuration of the range extension network.

It is a further object of this invention to provide a communication system as described above which provides a number of conference connections whereby a number of basic communication units may establish simultaneous communication with each other.

It is a further object of this invention to provide a communication system as described above providing a commandoverride feature whereby a busy basic communication unit may be apprised of the presence of an incoming priority call.

It is a further object of this invention to provide a wireless communication system having a network-alert feature whereby all of the basic communication units in the system may simultaneously receive a broadcast warning call.

A further object of this invention is to provide a communication system in which communication channels are adaptively assigned for the exclusive use of a calling basic communication unit on the basis of the measurement of the signal and/or noise characteristic of the channel immediately prior to its desired use.

It is a further object of this invention to provide a communication system in which exclusive communication channels are adaptively assigned to a calling basic communication unit on the basis of a variable selection criterion.

It is a further object of this invention to provide a communication system in which the same communication channel may be adaptively assigned to the exclusive use of a plurality of calling basic communication units so located that the simultaneous use for a plurality of calls will not result in significant interference therebetween.

Another object of this invention is to replace the so-called "switched" or "wired" communication system presently in use by the army division.

Another object of the present invention is to provide a communication system embodying an adaptive channel means of handling messages which relies on a cochannel technique for message addressing and control functions.

Another object of the present invention is to provide a wireless communication system utilizing an F-T matrix co-channel technique for addressing and control functions in conjunction with an adaptive channel means for handling messages.

Another object of the present invention is to provide a wireless communication system utilizing a digital F-T matrix co-channel technique for addressing and control in conjunction with adaptive channels of the exclusive pulse position modulation type for handling messages.

Another object of the present invention is to provide a wireless communication system utilizing a digital QPPM matrix co-channel technique for addressing and control in conjunction with adaptive channels of the exclusive pulse position modulation type for handling messages.

Another object of this invention is to permit the placement of extended range calls without the aid of area codes or designators.

Another object of the present invention is to provide a communication system which combines the best features of the exclusive, co-channel, and adaptive-exclusive communication techniques; i.e., a system that provides a good bandwidth efficiency and good message quality with high capacity.

Another object of the present invention is to provide a system in which the supervisory control information is transmitted with distinguishing characteristics which allows processing and detection at the receiver in the presence of message channel interference.

Another object of the present invention is to provide a system in which the supervisory signaling time is sufficiently short to cause negligible interference to the message channels.

Another object of this invention is to provide a communications system which is capable of multiple random access and discrete address.

A yet further object of this invention is to provide supervisory logic functions in the user sets which will automatically accomplish the channel selection and all necessary system functions preparatory for the desired communications without effort on the part of the user other than dialing or otherwise entering the telephone call of the called party.

The exact nature of this invention, as well as other objects and advantages thereof, will be readily apparent from consideration of the following detailed description relating to the annexed drawings in which:

FIG. 1 is a representation of the configuration of the network according to the present invention at some given time, showing the inter-accessibility of the retransmission units and basic communication units of the system;

FIGS. 4A–4D are representative of various suitable distributions of the message and supervisory channels within the portion of the spectrum assigned for use by the system of FIG. 1;

FIGS. 5A and 5B are representative of one suitable F-T matrix which may be assigned as the address of one of the basic communication units or retransmission units of the system of FIG. 1;

Figure 3:
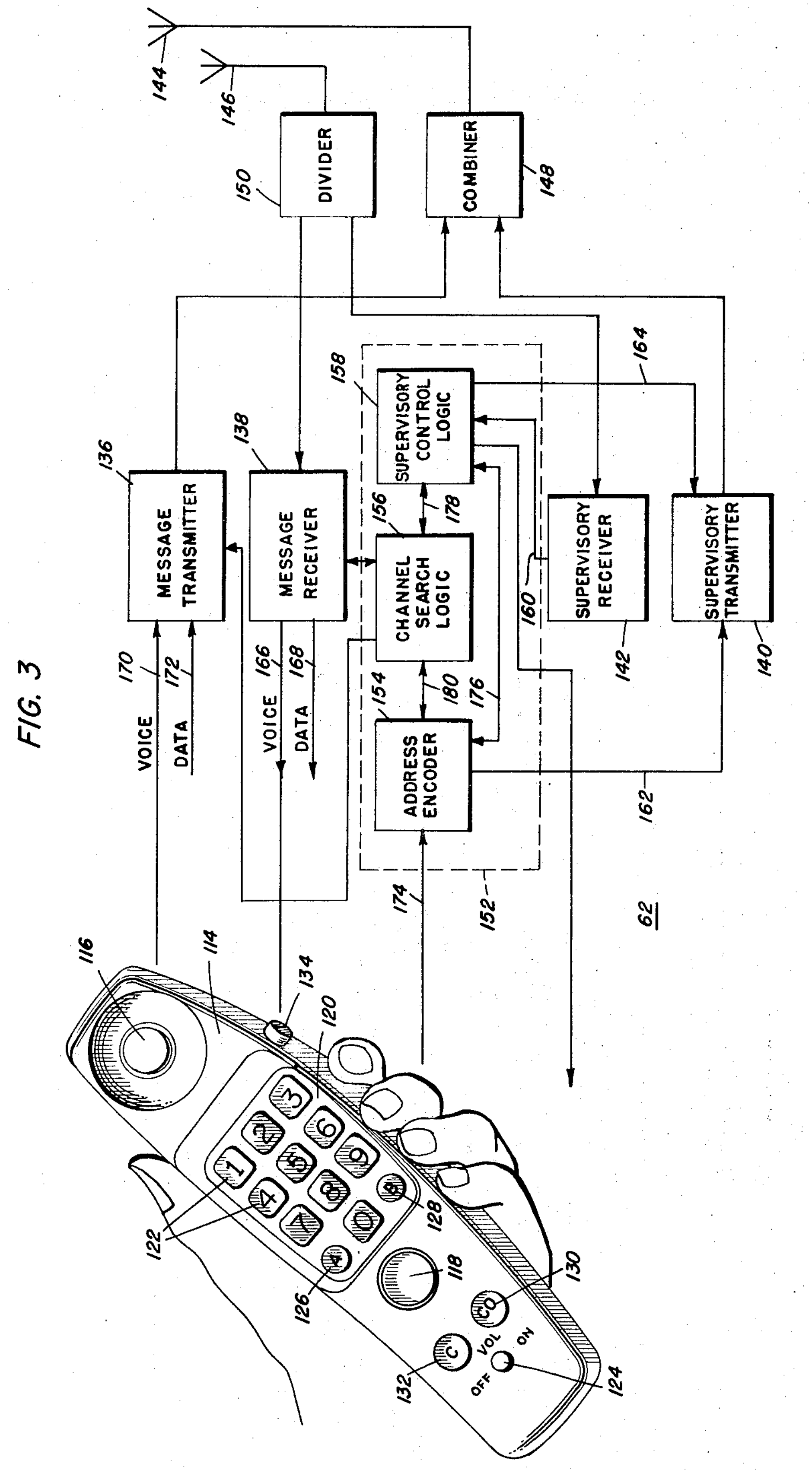
FIG. 3 is a generalized block diagram of a basic communication unit suitable for use in the system of FIG. 1.
Figure 8:
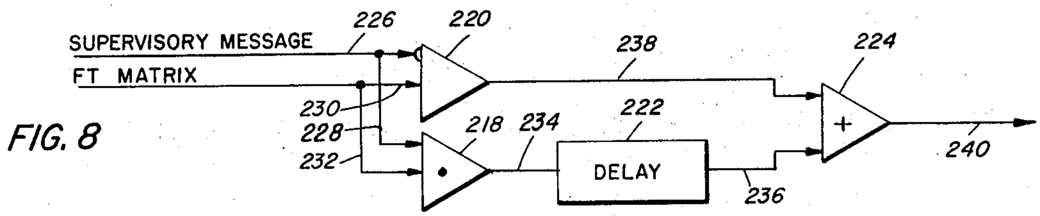
Figure 9:
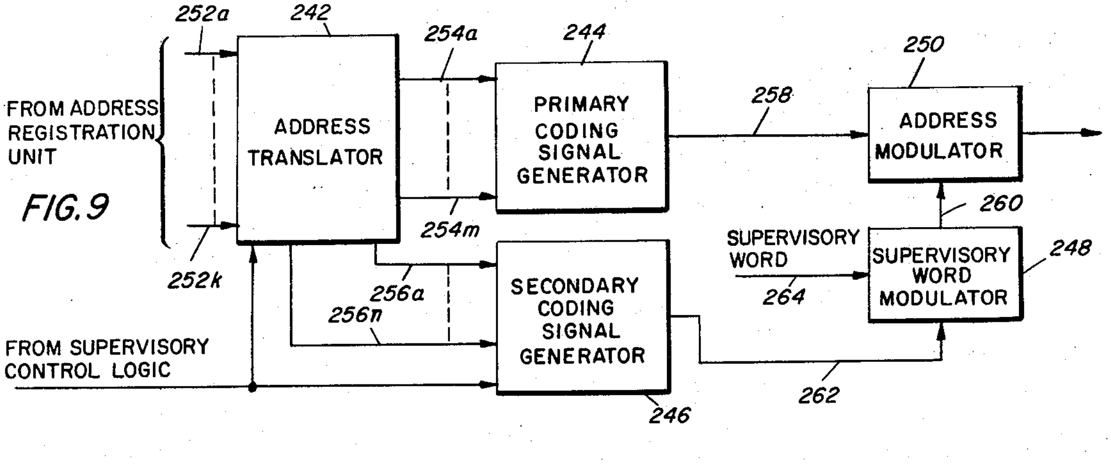
Figure 10:
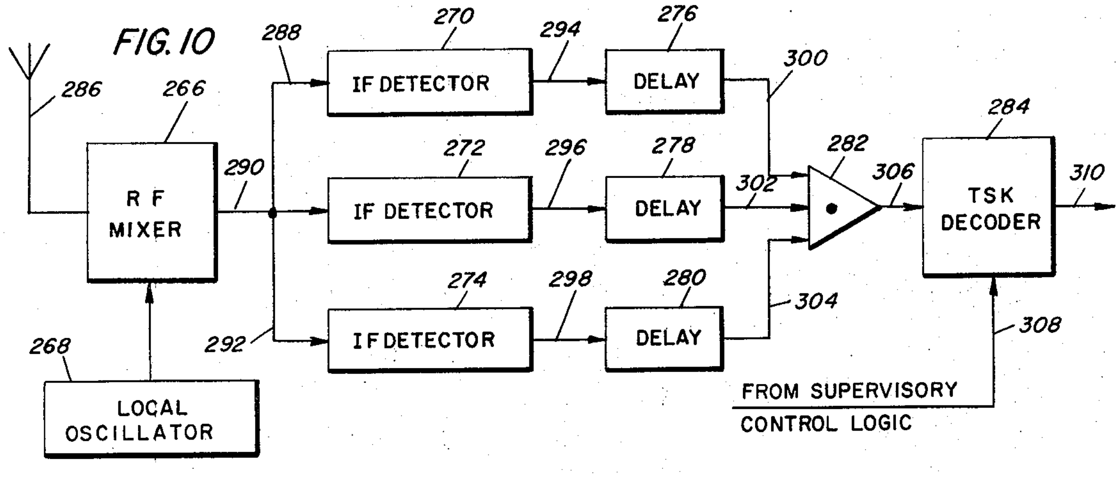
Figure 11:
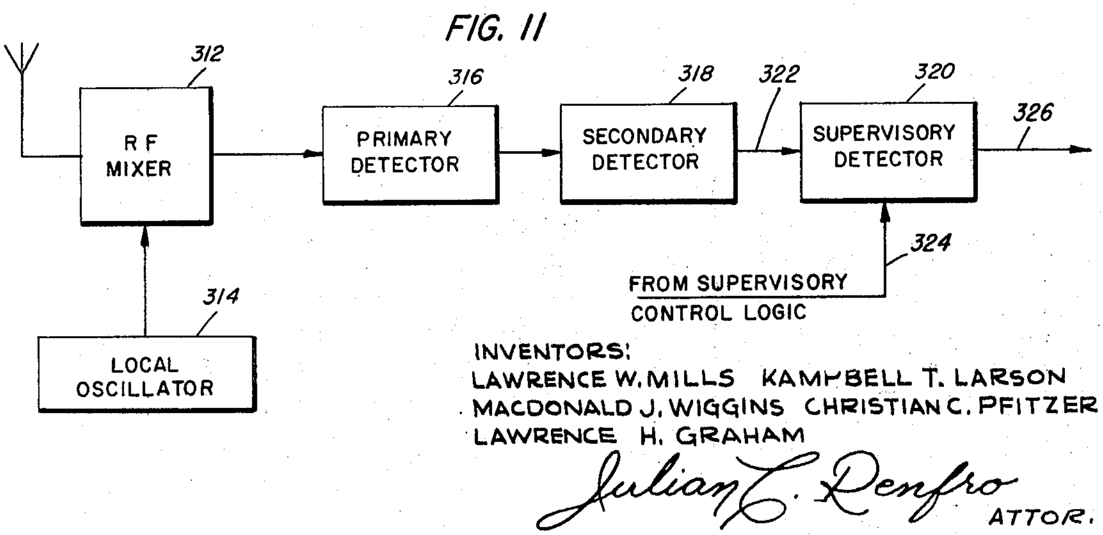
Figure 14A:
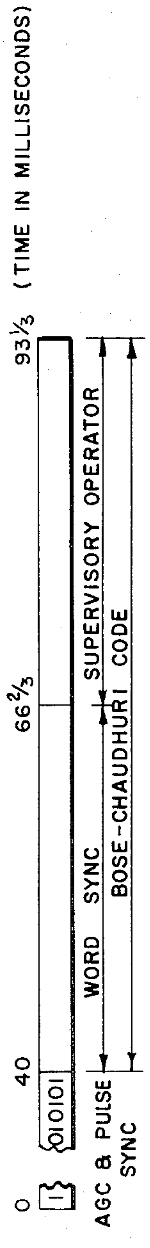
Figure 14B:
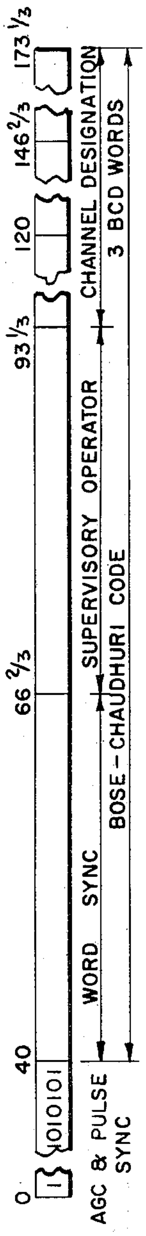
Figure 14C:
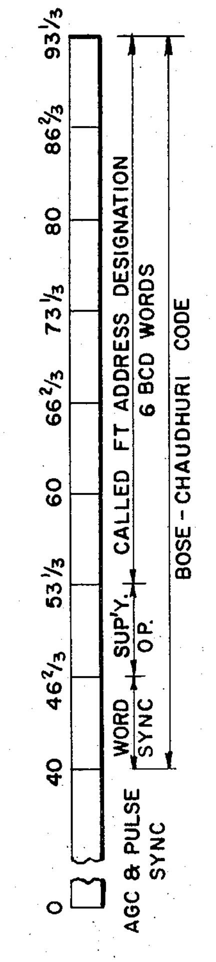
Figure 15:
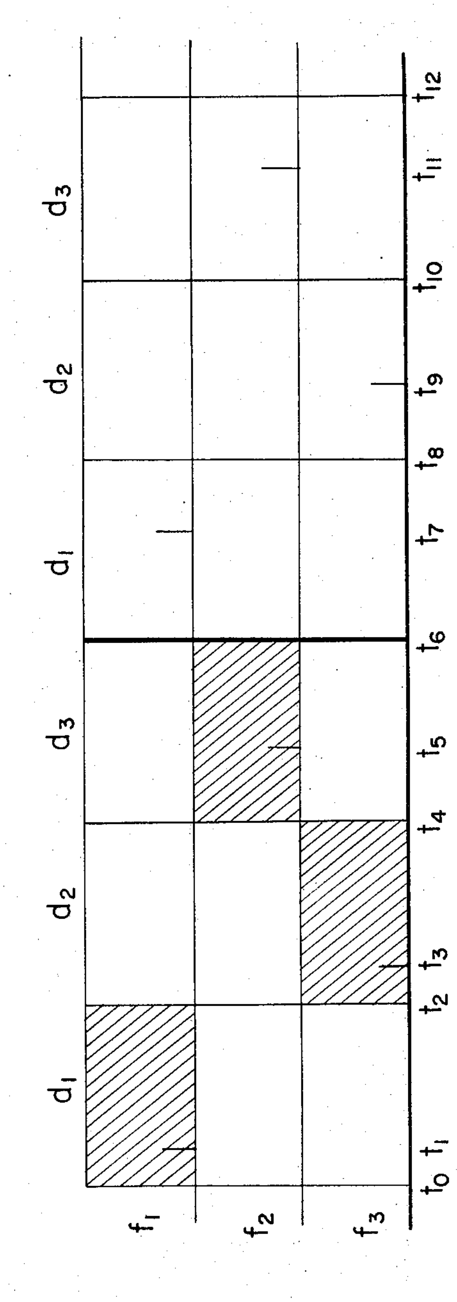
Figure 16:
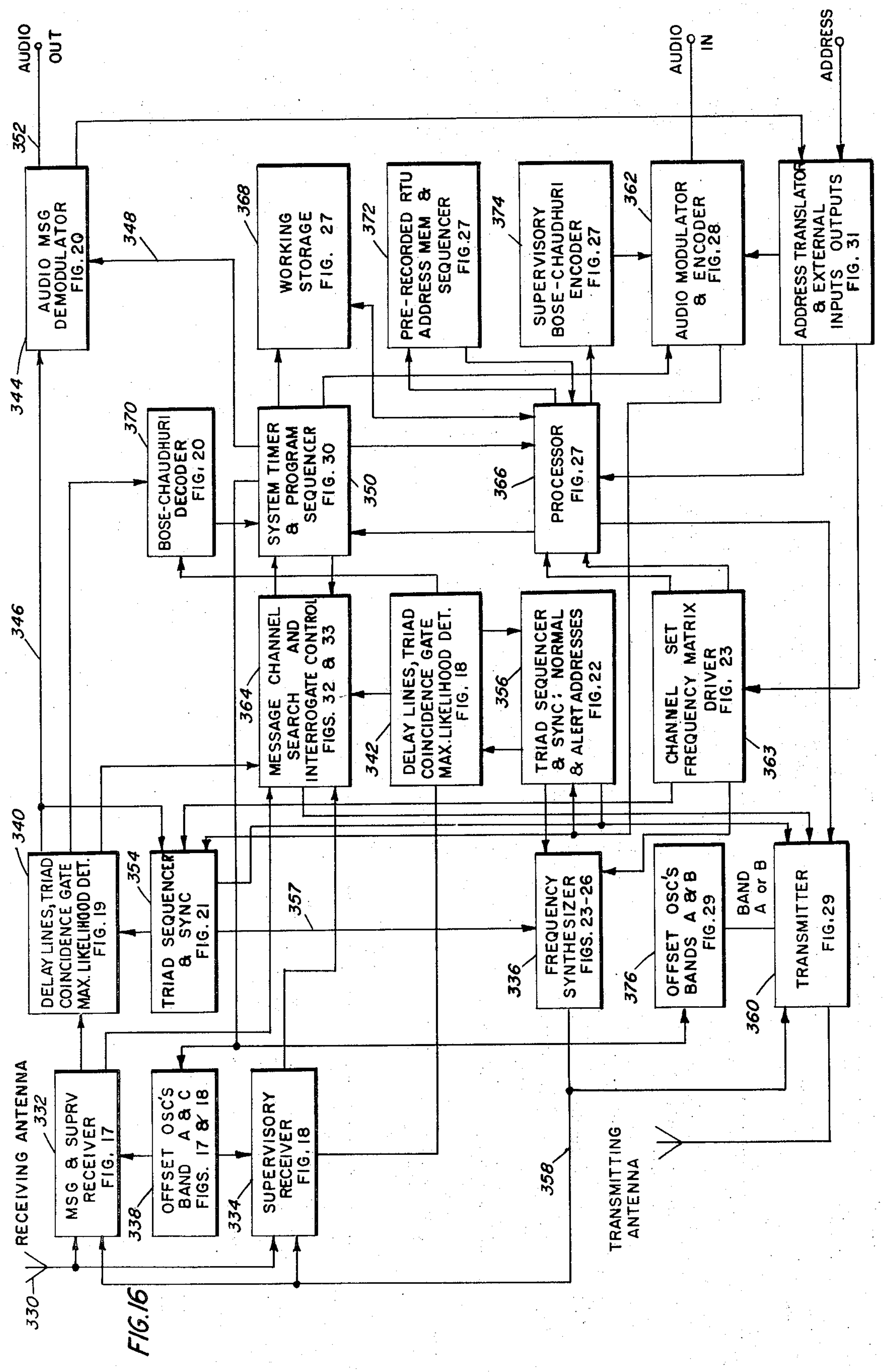
Figure 32:
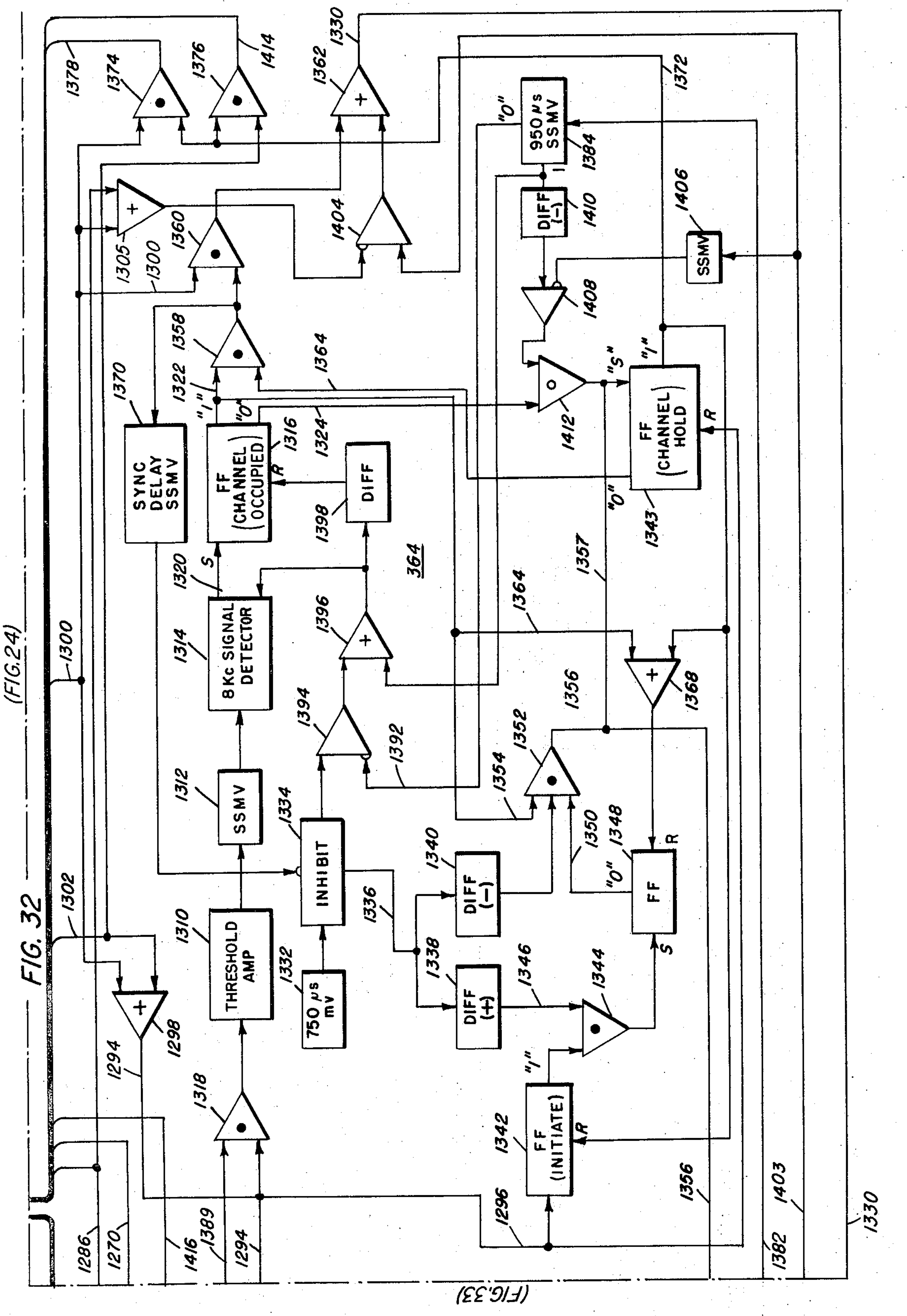
Figures 33, 34:
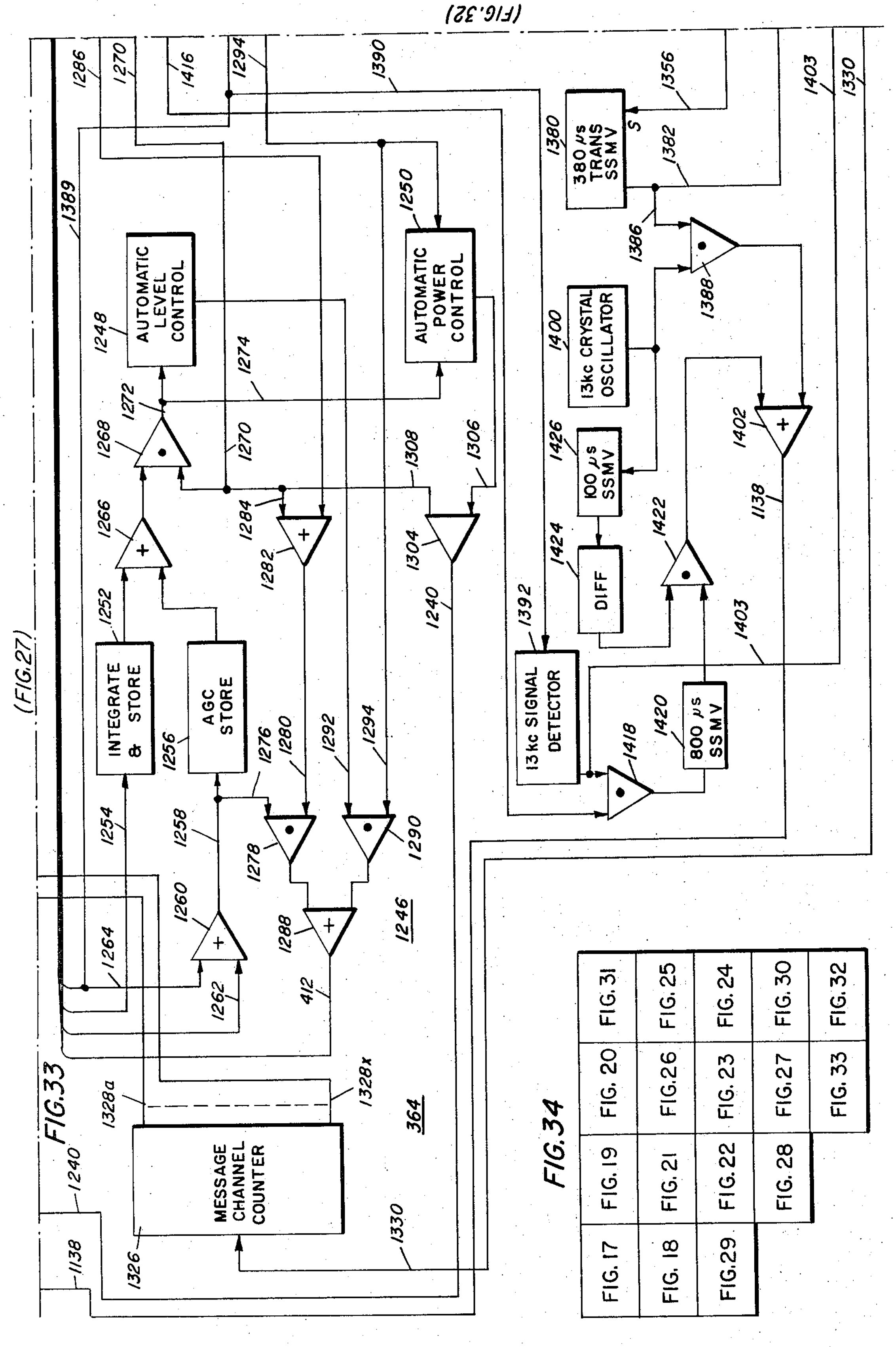

FIG. 6 is a generalized and simplified block diagram showing the manner in which a given F-T matrix may be generated in response to the registration in the calling basic 52 and 54). Similarly, contact between retransmission units 50 and communication unit of the address of a called basic communication unit;

FIGS. 7A and 7B are representative of the manner in which supervisory information may be encoded on the F-T matrices of FIGS. 5A and 5B;

FIG. 8 is a simplified and generalized block diagram of circuitry for encoding the information as shown in FIGS. 7A and 7B upon the F-T matrices of FIGS. 5A and 5B;

FIG. 9 is a simplified and generalized block diagram of circuitry for generating a "single frequency plus code word" co-channel address, and for encoding supervisory information thereon;

FIG. 10 is a simplified and generalized block diagram of circuitry suitable for detecting and decoding the supervisory information transmitted by the F-T matrix technique;

FIG. 11 is a simplified and generalized block diagram of an address detector and decoder for use with the "single frequency plus code word" co-channel addressing technique;

FIGS. 12A–12C are a representation of a pulse position modulation technique suitable for encoding information on the message channels according to the present invention;

FIGS. 13A and 13B are representative of signals transmitted on the supervisory and message channels of the present invention, showing the effects of backscatter or multipath distortion thereon;

FIGS. 14A–14C are representative of a suitable word format for transmission of the supervisory information either according to the "F-T matrix" technique or the "single frequency plus code word" technique;

FIG. 15 is a representation of a modified form of information coding which may be substituted for that shown in FIGS. 7A and 7B and for the supervisory word format of FIGS. 14A–14C;

FIG. 16 is a detailed, overall block diagram of the basic communication unit shown in FIG. 3; and FIGS. 17–33, when arranged as shown in FIG. 34, show in detail the construction of the basic communication unit of FIG. 16.

Referring now to FIG. 1, there is shown an arrangement representative of the network geometry and relationship between the basic communication units and the retransmission units of the system at a given time. The system includes a number of retransmission units, such as 50, 52, 54, 56, 58, and 60, and a considerably larger number of basic communication units, such as 62, 64, and 66, associated with retransmission unit 50, and basic communication units 68, 70, and 72, associated with retransmission unit 60. In addition, each retransmission unit preferably includes line-drop capability and an interface unit such as unit 74. As previously mentioned, the function of the interface unit is to provide access for the basic communication units of the system, shown in FIG. 1, to various foreign communication systems, such as a wired system, or some preexisting radio system.

As indicated schematically in FIG. 1, depending upon the geographical relationship between the basic communication units at a givne time, direct communication with some nearby units is possible, while more remote basic communication units must be contacted through one or more of the retransmission units in the range extension network. For example, basic communication unit 62 may establish a direct communication link with basic communication unit 64, while basic communication unit 64 may establish direct links with both basic communication units 62 and 66. However, communication between basic communication units 62 and 66 may be effected only through a nearby retransmission unit such as retransmission unit 50. Similarly, while a direct link between basic communication units 68 and 72 is possible, a link between basic communication units 68 and 70 may be effected only through one of the nearby retransmission units such as 58 or 60.

As may be understood, the particular orientation of the range extension network itself at a given time will determine which retransmission units may make direct contact. For example, a connection between retransmission units 50 and 52, or between 50 and 54, may be made directly; however, a connection between retransmission units 50 and 56 must be accomplished either through retransmission unit 52 (or both retransmission units 52 and 54). Similarly, contact between retransmission units 50 and 60 may be through any of the paths comprised of retransmission units 52 and 58; 54, 52, and 58; or 54, 52, 56, and 58. Thus, it may be understood that a connection between any of basic communication units 62, 64, or 66, and 68, 70, and 72, would be established through retransmission units 50 and 60, in cooperation with one of the various alternative paths described.

In addition, in order to assure survivability of communication, should retransmission unit 50, for example, be inactivated or destroyed, the range extension network is always maintained in such configuration that all or substantially all of the basic communication units have access to more than one retransmission unit. In FIG. 1, this is indicated by the arrows connecting basic communication unit 66 to both retransmission units 50 and 52, and the arrows connecting basic communication unit 68 to retransmission units 56, 58, and 60. Thus, it may be seen that alternative long-distance paths may be readily provided for all of the basic communication units in the system.

Each of the interface units such as 74, shown in FIG. 1, may be a manual switchboard employing a human operator, although it should be recognized that any suitable interface equipment may be provided as needed. As may be seen from the Figure, the interface units may be reached only through the associated retransmission units such as retransmission unit 50. Accordingly, should basic communication unit 64, for example, desire to reach interface unit 74, the call would be placed directly through retransmission unit 50. However, should a basic communication unit such as basic communication unit 72 desire to reach interface unit 74, the call would be handled by retransmission units 50 and 60, and any of the alternative paths between retransmission units 50 and 60. Each of the interface units may be provided with an appropriate cochannel address, which address may be published in a system directory (as would be all the other system addresses) whereby to permit ready access by all basic communication units to each interface unit. A basic communication unit desiring to reach a particular interface unit would simply register the directory address of that unit in his set. In addition, there may be provided a suitable digit as part of the address, to identify it as an interface call, whereby the normal local search (in "basic communication unit to basic communication unit" calls) would be bypassed. The call would be automatically routed into the "basic communication unit to retransmission unit" mode and an appropriate search would be initiated by the first retransmission unit reached, either alone, or in combination with such other retransmission units as is necessary to place the desired call. If the interface unit desired happened to be associated with the retransmission unit first reached, a direct connection thereto would immediately be established, and the calling party would verbally transmit the address of the desired party to the interface unit operator. In the event that the desired interface unit was not associated with the immediately reached retransmission unit, each retransmission unit in the system would be called in turn, and requested to determine whether it could provide access to the desired interface unit.

For calls from the foreign system to a particular basic communication unit in the system of FIG. 1, the operator of the interface unit would register the address of the desired basic communication unit and the call would be established as if the interface unit was itself a basic communication unit.

Figure 2:
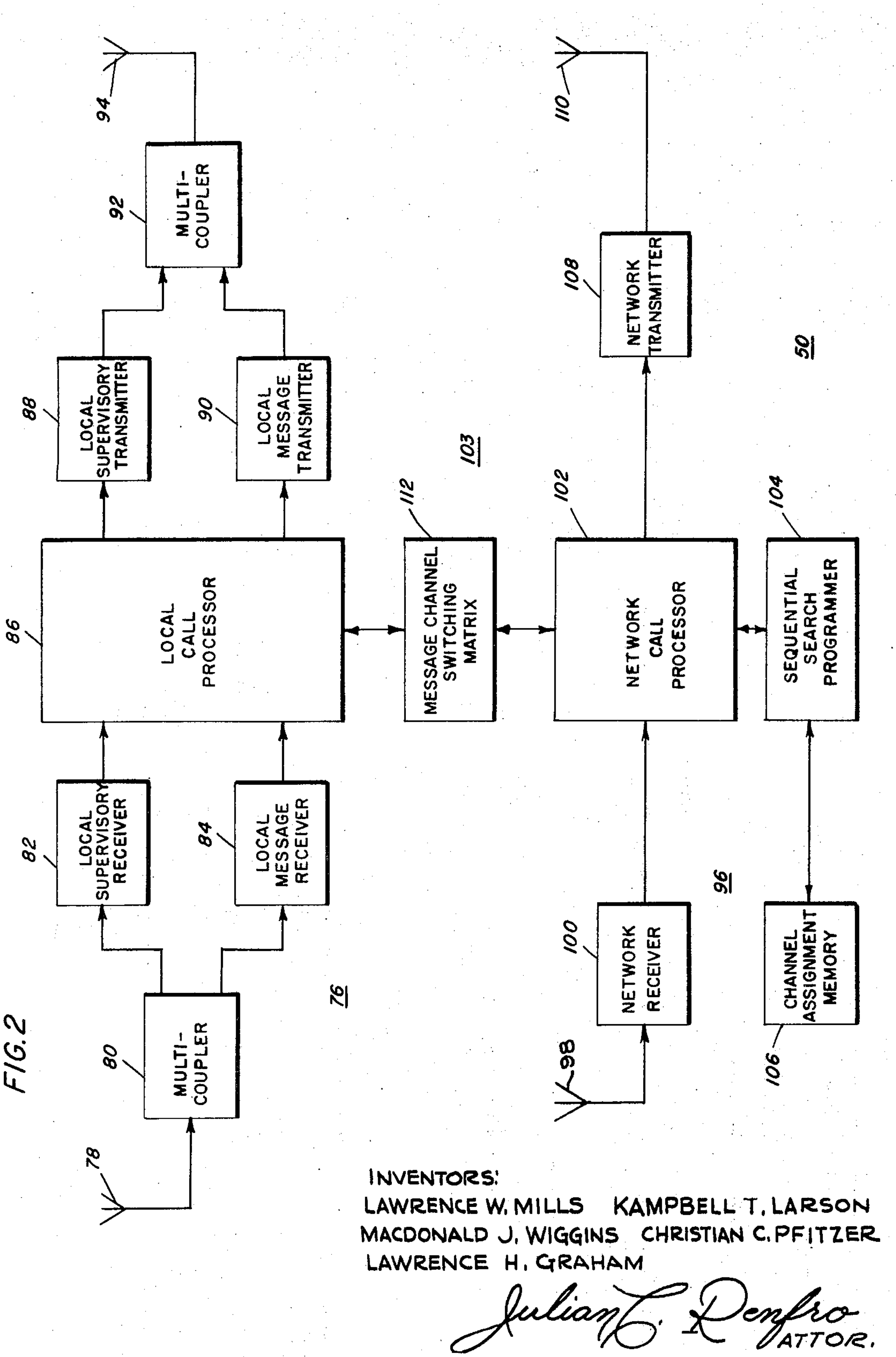
FIG. 2 is a generalized block diagram of a retransmission unit suitable for use in the system of FIG. 1.

FIG. 2 is a simplified and generalized block diagram showing the fundamental components of a retransmission unit such as unit 50, which may be used in the system of the present invention. Retransmission unit 50 is the basic component of the range extension network shown in FIG. 1, and includes a local subsystem 76 for processing calls between the retransmission unit and local basic communication units, comprised of an omnidirectional receiving antenna 78, a multi-coupler 80, local receivers 82 and 84, a local call processor 86, local transmitters 88 and 90, a second multi-coupler 92, and an omnidirectional transmitting antenna 94. The retransmission unit further includes a network subsystem 96 for processing calls between retransmission units, comprised of an omnidirectional receiving antenna 98, a network receiver 100, a network call processor 102, a sequential search programmer 104, and an associated channel assignment memory 106, a network transmitter 108 and an omnidirectional transmitting antenna 110. In addition, the two subsystems 76 and 96 are interconnected by means of a message channel switching matrix 112, which serves to interconnect incoming channels in local subsystem 76 with outgoing channels in network subsystem 96, incoming channels in network subsystem 96 with outgoing channels in local subsystem 76, and incoming and outgoing channels within each subsystem.

Omnidirectional antennas 78 and 94 in local subsystem 76 may be of any type suitable for use at the frequencies of operation of the system. Local supervisory receiver 82 and local message receiver 84 are shown connected to antenna 78 by means of a multi-coupler 80, although, if desired, each of receivers 82 and 84 (and transmitters 88 and 90) could be provided with separate antennas, or receivers 82 and 84 (and transmitters 88 and 90) could be connected to a single antenna by the use of suitable isolation circuits.

Receivers 82 and 84 each include a plurality of channels to permit simultaneous processing of a plurality of service requests, and the simultaneous reception of a large number of incoming messages. Local supervisory receiver 82 monitors the co-channel address of the particular retransmission unit to detect the presence of a service request from a nearby basic communication unit and to provide access to the retransmission unit for initiating longdistance calls. Local message receiver 84 serves as a link in the actual message path of the call to be placed, and in addition, may provide for the reception of certain supervisory messages from a nearby basic communication unit after an appropriate message channel has been assigned.

Local supervisory receiver 82 and local message receiver 84 are both connected to local call processer 86, which accepts service requests from the nearby basic communication units, supervises the local search for a called basic communication unit, and controls the connection between the calling and called parties.

The address of the desired basic communication unit, as well as other necessary supervisory information, is generated and transmitted under the control of local call processor 86 by local supervisory transmitter 88.

Relaying of the voice or data message between local message receiver 84 and the party for which it is intended, is provided by local message transmitter 90 also under the control of the local call processor 86. Both transmitters 88 and 90 include the same number of channels as respective receivers 82 and 84. The transmitters are connected by means of a multi-coupler 92, similar to multi-coupler 80, to an appropriate omnidirectional transmitting antenna 94, or directly to separate antennas, if desired.

Network receiver 100, which is coupled to antenna 98, monitors the band of channels designated for communication between the retransmission units. Receiver 100 includes a plurality of channels to simultaneously monitor all of the supervisory channels in the entire band, i.e. within all of the blocks, and all of the message channels except those in the block or blocks assigned to the particular retransmission unit in question.

Network transmitter 108 includes the same number of channels as network receiver 100 and serves to transmit supervisory information to the other retransmission units on the supervisory channels in all of the blocks assigned for communication between retransmission units, and to relay, on the message channels in the block or blocks assigned for use by the particular retransmission units, messages either received by network receiver 100 or received by local message receiver 84, processed by local call processor 86 and switched through message channel switching matrix 112.

Network call processor 102 responds to a supervisory request from other retransmission units (received by network receiver 100), either to initiate a local search for a particular called basic communication unit or to participate in a sequential search (i.e., to serve as a link in a connection between other retransmission units).

Local call processor 86, network call processor 102, sequential search programmer 104, and message channel switching matrix 112 comprise an overall retransmission unit—control logic unit 103—in reality a special purpose computer which controls all of the functions and operations of the retransmission unit. Control logic unit 103 includes suitable input and output information buffers, memory units for storage of all operational programs and information regarding call status, control circuits for switching matrix 112, frequency synthesizing means to tune receivers 82, 84 and 100, and transmitters 88, 90 and 108, and channel selection circuitry, etc. to perform all of the required system operations. In addition, by means of sequential search programmer 104, the control logic unit 103 supervises the storage and updating of information related to the range extension network configuration stored in channel assignment memory 106.

For a local search, network call processor 102 suitably commands local call processor 86 to perform a search, as in the case of initiation of the call by a nearby basic communication unit. In the event that the desired basic communication unit is reached as a result of the local search, a connection is established through message channel switching matrix 112, whereby messages being transmitted from a remote retransmission unit (in the "retransmission unit to retransmission unit" communication band) may be switched into local subsystem 76 for transmission to the desired called basic communication unit by means of local message transmitter 90 and transmitting antenna 94.

Upon a request for participation in a sequential search, initiated either by a remote retransmission unit and received by network receiver 100, or initiated by local call processor 86 (as a result of an unsuccessful local search for a particular basic communication unit called by a local basic communication unit), network call processor 102, sequential search programmer 104, and channel assignment memory 106, cooperate to sequentially address each accessible retransmission unit in the network to request a local search in the vicinity of such retransmission units and in the event that such local searches are all unsuccessful, to request each of the accessible retransmission units in turn to contact those additional retransmission units accessible to it and request them to perform the local search.

In addition to the above-described functions, sequential search programmer 104 and channel assignment memory 106 cooperate to control the assimilation of a newly entering retransmission unit into an existing network, or to prepare the remainder of the network for the withdrawal of a particular retransmission unit. Also, when the entire network is activated, all of the retransmission units in the system cooperatively participate in a learning process whereby each of the operative retransmission units is made aware of the initial network configuration.

As previously mentioned, immediately upon the activation of a retransmission unit, an appropriate search program is initiated whereby a sequence of messages are transmitted, and the replies thereto analyzed. Responsive to such replies, information is stored in channel assignment memory 106, to identify each of the retransmission units in the system as well as the appropriate block or blocks of channels by which each retransmission unit may be reached. For the inaccessible retransmission units, i.e., for those retransmission units which may not be directly reached by means of any of the blocks of channels, there is stored in channel assignment memory 106 information identifying each of the inaccessible retransmission units and each of the accessible retransmission units through which the inaccessible ones may be contacted.

Similarly, upon the entry of some other retransmission unit into the system, and responsive to the assimilation program of that retransmission unit, updating of channel assignment memory 106 in each of the already existing retransmission units is accomplished, whereby both the entrant, and the previously operative retransmission units are kept up to date as to the configuration of the range extension network.

In FIG. 3 is shown a simplified and generalized block diagram of the components of a basic communication unit such as unit 62 shown in FIG. 1, suitable for use in the system of the present invention. Basic communication unit 62 includes a handset 114 having therein a speaker 116, a noise cancelling microphone 118, and an address registration unit 120 comprised of a keyboard of pushbuttons 122, by which each digit of a desired address may be entered. Handset 114 may further include an on-off switch/volume control 124, and a plurality of indicators 126, 128, 130, and 132, by which the nature of the incoming call may be identified. For example, conference operation can be provided in either of two modes. If all conferees are within the direct range of the basic communication unit, each of the desired conferees may be sequentially contacted to establish a non-prearranged conference network.

On the other hand, if the conferees are not within direct range of one another, a prearranged conference number can be called, and the range extension network automatically sets up the conference. The system may be arranged so that each basic communication unit is capable of inclusion in a number of such prearranged conferences. If two such prearranged conferences are available to each basic communication unit, there may be provided two indicators, 126 and 128, appropriately labeled. Thus, in accordance with the nature of the particular prearranged conference being established, one of indicator lights 126 and 128 will be illuminated, to provide an identification for the local basic communication unit. Similarly, in order to indicate to the using party that a command override call is being received, an indicator light 130, appropriately labeled, may be illuminated upon the receipt of such call, and when a network alert call is received, indicator light 132 will be illuminated to provide the appropriate information. Finally, handset 114 may further include a push-to-talk switch 134 which serves in conventional fashion to provide half duplex operation for the system. However, in regard to the use of a push-to-talk switch, it should be recognized that alternatively, the system may include suitable voice operated switches including provision for breaking in by a listening user as a substitute for the push-to-talk arrangement shown.

In addition to the indications as just described, signals representative of an incoming conference call, command override call, or network alert call may be provided in the form of distinctive tones to handset speaker 116 and/or to an independent speaker mounted within the basic communication unit itself.

Basic communication unit 62 further includes a voice/data encoder and message transmitter 136, a voice/-data decoder and message receiver 138, a supervisory transmitter 140, a supervisory receiver 142, suitable omnidirectional antennas 144 and 146, an associated combiner and divider 148 and 150, and a call control logic subsystem 152, comprising an address encoder 154, channel search logic control unit 156, and supervisory control logic unit 158. Message encoder and transmitter 136 and supervisory transmitter 140 are connected by means of combiner 148, which serves to permit transmission by both of the transmitters simultaneously, to transmitting antenna 144. Similarly, supervisory receiver 142, and message receiver and decoder 138 are connected by means of divider 150 to receiving antenna 146. In one suitable embodiment, antennas 144 and 146 may be mounted in a whip-type, multisection colinear configuration. In such an assembly, the transmitting antenna 144 may be located above the receiving antenna 146 to provide a substantial degree of isolation (e.g. 50 db) between the transmitters and receivers. However, while separate antennas are illustrated in the generalized circuit of FIG. 3, a single receiving and transmitting antenna may be used instead with an appropriate duplexer.

Supervisory receiver 142 is adapted to respond to the address of the particular basic communication unit. The receiver includes means to recognize a particular incoming address as being the correct one, to process the signal modulation appearing thereon, and to provide suitable pulse information over lead 160 to supervisory control logic unit 158 indicative of the supervisory information which was encoded upon the co-channel address. In addition, in order to permit response of the basic communication unit to various types of conference calls, command override, (break-in) calls, or general network alert calls, supervisory receiver 142 may be adapted to respond to appropriate supervisory messages representative of these functions, in addition to the normal co-channel address of the basic communication unit.

Supervisory transmitter 140 is connected to address encoder 154 by means of lead 162 and to supervisory control logic unit 158 by means of lead 164. Transmitter 140 includes means for appropriately responding to an addressing instruction provided over lead 162 and to a supervisory instruction provided over lead 164 to appropriately modulate the frequency or frequencies comprising the address to be transmitted with the supervisory instruction. Transmitter 140 includes RF amplifying means providing sufficient output power for communication only over the desired range of the basic communication unit.

Message receiver and decoder 138 is tunable through the range of frequencies encompassed by the "basic communication unit to basic communication unit" bands and the "retransmission unit to basic communication unit" bands, under the control of channel search logic unit 156. Receiver 138 may be a conventional design incorporating a wide dynamic range RF front end having suitable band-width (e.g., approximately 50 kilocycles per second) required to receive narrow bandwidth pulses (e.g., of approximately 30 microseconds time duration at half amplitude). Of course, if it is desired to transmit and receive messages with other than pulse modulation (such as single side band AM, FM, or the like) then demodulation devices of appropriate band-width may be provided in receiver 138.

Receiver 138 further includes means responsive to the particular type modulation employed to convert the incoming message into a usable signal. For example, there may be provided suitable circuitry for converting a pulse position modulated message signal into an audio or data waveform for further use. The voice signal may be connected directly over lead 166 to handset speaker 116. The data output on lead 168 may be provided to a suitable utilization device (not shown), such as a printer or other data recorder.

In addition, receiver 138 also includes means similar to that in supervisory receiver 142 for decoding and processing supervisory information which may be sent over the adaptively assigned message channels. Also, message receiver 138 cooperates with channel search logic unit 156 to scan the message channels in the "basic communication unit to basic communication unit" bands to determine the availability of such channels, either for use in setting up a call, or in response to the proposal of such channel by a calling basic communication unit.

Message transmitter 136 is capable of selective operation at any of the frequencies within the "basic communication unit to basic communication unit" and "basic communication unit to retransmission unit" bands, again, under the control of channel search logic unit 156. Transmitter 136 is of suitable band-width, etc., to assure compatibility with the particular message transmission technique employed and includes means to properly modulate and transmit the voice or data message with sufficient RF power to communicate over the desired range of the basic communication unit. If desired, message encoder and transmitter 136 and supervisory transmitter 140 may utilize common circuitry for RF power amplification in order to somewhat simplify the construction of the basic communication unit. Message transmitter 136 may be provided with suitable voice and data inputs by means of leads 170 and 172 respectively. The voice input may be provided directly from microphone 118 of handset 114 or for military purposes may be provided by a suitable encryptation device in order to effect secret or secure message transmission. The data input may be provided from a suitable recorder read-out device, or by a teletype unit, facsimile unit, etc.

Call control logic subsystem 152, including address encoder 154, channel search logic unit 156, and supervisory control logic unit 158 controls all phases of the automatic operation of the basic communication unit 62. Among the functions of call control logic subsystem 152 are processing address instructions, establishing appropriate local clock signals, establishing appropriate co-channel addresses for the supervisory transmitter 140 and supervisory receiver 142, processing supervisory information received on the co-channel address of the basic communication unit, and automatically initiating appropriate responses thereto, generating appropriate supervisory signals and providing them to supervisory transmitter 140 for transmission to other parties, controlling the sequential searching process of message channels in the "basic communication unit to basic communication unit" band in order to obtain a channel suitable for communication, properly setting message transmitter 136 and message receiver 138 to the desired channels over which a communication path is to be established, appropriately initiating the request for retransmission unit (i.e. long distance) service if a particular called basic communication unit is not available in the local area of the calling basic communication unit and establishing appropriate receiver gain and transmitter power in order to permit optimum reuse of channels in remote portions of the geographical area served by the system.

The hand set 114 is provided with an address registration unit 120, such as a telephone dial switch or the plurality of push buttons shown, into which the address of the called party may be inserted. The registration unit is connected over signal path 174 to address encoder 154 which responds to the particular address inserted, and to signals from the supervisory control logic unit 158 over lead 176 to generate the proper co-channel address and to supply it to supervisory transmitter 140 over lead 162.

As previously mentioned, among the possible modes of address assignment, are the so-called "FT matrix" address technique comprised of a sequence of tones in proper order, and with appropriate delay therebetween, or a "one frequency plus code word" addressing scheme where a single tone is appropriately modified so as to be representative of a particular code word. A suitable example of such a technique would be a single RF carrier frequency modulated by an audio tone. For the "FT matrix" technique, supervisory information could be encoded by the presence or absence or relative position within established time frames of succeeding FT matrices; for the single frequency plus code word technique, the supervisory information could be transmitted by appropriate modulation of the audio tone transmitted on the carrier frequency.

Supervisory control logic unit 158 provides overall subsystem control for the basic communication unit. Incoming supervisory information on the appropriate co-channel address is provided over lead 160 from supervisory receiver 142. In response to these signals, appropriate tones, such as ring-back, busy signals, ringing tones, etc. are provided over lead 178 to a local signaling speaker (not shown) as well as to speaker 116 in handset 114 to provide audible supervisory indications. Also, the signals are provided, as appropriate, to the various indicator lights 126, 128, 130, and 132.

Supervisory control logic unit 158 further provides control signals over leads 176 and 178 to address encoder 154 and channel search logic unit 156 respectively in order to initiate the appropriate functions of these units.

Channel search logic unit 156 operates in conjunction with message transmitter 136, and message receiver 138, to locate an appropriate channel for communication or to assess the availability of a particular channel in response to a proposal thereof by a remote calling basic communication unit. Channel search logic unit 156 may include suitable means to measure the communication path loss between a remote unit (either a retransmission unit or a basic communication unit) and to appropriately adjust the transmitter power, and receiver gain to minimize the geographical area over which the particular communication channel being used must be allotted exclusively to that particular communication. Channel search logic unit 156 also includes means to program a search of each of the channels in the band allotted for message communication and to determine both the absence of modulation thereon, and to measure the signal to noise ratio of the particular channel. Upon the arrival of the search mechanism at a channel appropriately free of modulation or noise, the searching process stops and the identity of the available channel is stored in a memory section of logic unit 156. This information is used to tune message transmitter 136 and message receiver 138 to the appropriate communication channel and is also provided over lead 180 to address encoder 154 to appropriately modulate the co-channel address for transmission to a remote basic communication unit or to a retransmission unit for the purpose of initiating a remote search to the called basic communication unit. In addition, channel search logic unit 156 includes a memory unit wherein there is stored the addresses of each of the retransmission units in the system and upon appropriate command from supervisory control logic unit 158, such addresses are called in sequence, until a response is obtained whereupon the information necessary to initiate a remote search for a called party may be transmitted.

If the proposed channel proves to be unsatisfactory or unavailable in the area of the called basic communication unit, the channel search continues until a mutually satisfactory channel is found.

Before proceeding with a detailed description of the construction and operation of the system according to this invention, there will be explained the fundamentals of the various channel assignment and information coding schemes which may be used in order to afford the reader a better understanding of the detailed description to follow. Referring first to Table II below, there is summarized an exemplary scheme of frequency band and channel allocation for the various types of communication of which the system is capable. As previously indicated, in an effort to achieve optimum utilization of the frequency spectrum and efficient equipment operation, the overall spectrum is divided into separate operational bands for communication between the various system components. For example, listed in column 1 of Table II are bands A, B, C, and D. As shown band D is subdivided in ten blocks of channels labeled D1 through D10. As indicated in the second column of the Table, band A is used exclusively for direct "basic communication unit to basic communication unit" messages. Columns 3 through 6 of the table show a suitable channel allocation providing service to approximately 2,000 basic communication units in the environment of an army division. As may be seen, an appropriate number of message channels would be 113 and a suitable number of supervisory channels would be 12 (a total of 125). It has been found that both message and supervisory channels having a band width of 50 kilocycles per second is satisfactory for use with pulse position modulation (continuous or quantized) on the message channels and time shift keying (i.e. pulse position modulation employing only two positions) in the supervisory channels. Of course, it should be recognized that the bandwidth chosen for both the message and the supervisory channels will depend on the particular schemes of modulation employed and may be varied as necessary.

As described subsequently in connection with FIGS. 4A through 4D, the twelve supervisory channels may either occupy a separate portion of the band, may be interleaved with the message channels, or may be overlaid thereon. Supervisory signaling is on a co-channel basis, that is, all addresses comprise one or more of the twelve supervisory channel frequencies.

Channel bands B and C are provided for "basic communication unit to retransmission unit" and "retransmission unit to basic communication unit" messages respectively. If desired, bands B and C, which may each include 186 channels having band-widths of 50 kilocycles per second per channel, may be merged into a single band having 372 channels. However, it has been found that by providing two separate bands, and locating the A band between the B and C bands, the equipment for tuning the various transmitters and receivers to the appropriate frequencies may be considerably simplified.

As previously noted, a band A message channel is adaptively appropriated for exclusive use by the calling party upon determination of the absence of either modulation or noise on the particular channel. If desired, the system can be so arranged that in the event that the channel proposed by the calling basic communication unit is unsatisfactory to the called basic communication unit, the latter may propose an alternative channel; however, this may considerably increase the complexity of the channel search program.

Since the number of retransmission units in the system will always be extremely small, a single frequency could be employed for the address of each (i.e., an exclusive channel allocation scheme). However, where an FT matrix approach is employed for assignment of basic communication unit addresses, it is more convenient to provide a somewhat larger number of supervisory channels in the B and C bands, so that B band FT matrix addresses may be assigned for establishing communication in the "basic communication unit to retransmission unit" mode of operation.

In addition, in order to simplify the construction of the retransmission unit and to avoid the necessity for the retransmission operating in the A band, a number of supervisory channels may be provided in the C band, and each basic communication unit assigned an additional C band address bearing a fixed relationship to its address in the A band. In other words, the C band supervisory channels may be so arranged, as to be equal in number to those in the A band, all of the C band su-

TABLE II.—FREQUENCY BAND AND CHANNEL ALLOCATION

| Band | Function | Number of message channels | Message channel bandwidth, kc./s. | Number of supervisory channels | Supervisory channel bandwidth, kc./s. |
|---|---|---|---|---|---|
| A | Basic communication unit to Basic communication unit | 113 | 50 | 12 | 50 |
| B | Basic communication unit to Retransmission unit | 186 | 50 | 39 | 50 |
| C | Retransmission unit to Basic communication unit | 186 | 50 | 12 | 50 |
| $D_1$ . . . . $D_{10}$ | Retransmission unit to Retransmission unit | 30 | 50 | 2 | 50 |
| | | 30 | 50 | 2 | 50 |

pervisory channels bearing a fixed relationship to a corresponding channel in the A band. Thus, the basic communication unit supervisory receivers may be adjusted to respond either to the assigned A band address or to a C band address whose frequency components are each a given multiple of the A band address.

Therefore, a basic communication unit may address a particular retransmission unit on its own co-channel address by means of the supervisory channels in band B, whereupon the retransmission unit selects an appropriate pair of channels in the B and C bands for further communication, and transmits the identity of this channel pair on an FT matrix (or by any other co-channel scheme) on the C band address of the calling basic communication unit. Similarly, in the performance of the search, the called basic communication is addressed on its C band co-channel address, which address includes a designation of the B and C band message channel pair to be used for further communication.

It should be noted that the adaptive channel assignment technique used in the B and C bands differs from that used in band A since the retransmission unit always makes the determination as to which channel pair will be used, rather than the calling party. The assignment of a channel pair is final, i.e., no verification by the calling or called basic communication unit is necessary.

Intercommunication between the retransmission units is provided in the D band which may comprise ten blocks $D_1$ through $D_{10}$ of 32 channels each, (a total of 320 channels). As may be seen in Table II, in each block there are provided two supervisory channels, and 30 message channels, each having a band-width of 50 kilocycles per second, (or any other band-width suitable for the types of modulation employed).

As previously mentioned, the block assignment technique rather than an individual channel assignment technique, is employed in the D band. Each retransmission unit, instead of searching the individual channels, acquires one or more blocks of 32 channels each, as needed, and uses these blocks for transmission only. After a block or blocks of channels have been acquired, the retransmission unit message receivers are set to the channels in all of the blocks not being used for transmission, and to the two supervisory channels in all of the bands, including those in the blocks acquired for transmission.

The so-called block adaptive technique provides a system with flexible frequency allocations which permits the rapid shifting of frequencies to accommodate variations in traffic commands and system configuration without requiring personnel to select the frequencies. In addition, it will permit two divisions to operate adjacent to one another, using the same spectrum, since frequencies may be reused if the separation of the particular units is sufficiently great.

Further, by use of the block assignment technique, there will generally be wide frequency separation between the transmit and receiving channels being used by the particular retransmission unit at a given time, thus alleviating the dynamic range problems which might otherwise exist.

As previously mentioned, a number of possible approaches are available for placement of the supervisory and message channels within band A. In FIG. 4A, there is shown a channel distribution for the exemplary embodiment of Table II. Here, the twelve supervisory channels (A1 through A12) and the 113 message channels (A13 through A125) occupy separate portions of the frequency spectrum. As previously noted, each channel is of band-width suitable to accommodate the particular type of modulation employed. In FIG. 4A, both supervisory channels A1 through A12, denoted by short lines, and message channels A13 through A125 (denoted by longer lines) are of equal band-width.

Referring now to FIG. 4B, there is shown a channel distribution in which the supervisory channels (again denoted by a pair of short lines) are interleaved between the message channels (here designated either by a pair of long lines or by a short line and a long line). As may be seen from the Figure, channels A1, A4 through A6, A8, A118, A120 through A123, and A125 are message channels. Interleaved therebetween are supervisory channels A2, A7, A119 and A124. While the supervisory channels have been shown as regularly distributed between the message channels, it may be recognized that any distribution, especially random distribution, is appropriate.

Referring now to FIG. 4C, wherein the frequency scale is expanded somewhat from that in FIGS. 4A and 4B, there is shown an interleaved channel distribution, similar to that of FIG. 4B, wherein the frequency bands used for message signalling, i.e. A1, A3, A123, and A125, are of greater band-width than the signalling channels, (e.g. A2, and A124). Such a channel arrangement would be appropriate, for example, for single frequency co-channel addressing, or for any other low duty cycle address coding technique.

Finally, referring to FIG. 4D, there is shown a frequency channel allocation scheme wherein the supervisory channels are overlaid on equal band-width message channels. For example, channels A1, A4, A122, and A125 are used only as message channels. However, channels A2–3 and A123–124 are used both as supervisory channels and as message channels. The technique of FIG. 40 is desirable both for conserving band-width, and also for reducing electronic countermeasures vulnerability. Mutual interference between supervisory signals and message signals on the common channels is minimized by the fact that the pulse rate for supervisory signalling may be considerably lower than that of speech signalling. In addition, the pulse length of the supervisory signals may be made considerably greater than that of the message signals whereby suitable width detectors may be included in the receivers to appropriately separate the short and long pulses if necessary. Further, according to the particular embodiment of this invention, each supervisory signalling message exists only for approximately 175 milliseconds, which further minimizes the effect of such signals on the quality of the received speech.

In addition to the above alternatives, it may be understood that an approach similar to that of FIG. 4C may be used with overlaid channels, i.e. narrow band supervisory signalling channels may be overlaid on the wider band message channels.

Referring now to FIG. 5A, there is shown one suitable technique by which the co-channel addresses of the basic communication units and retransmission units for use in channels A, B and C may be determined. The so-called FT matrix comprises a plurality of columns of time slots $D_1$, $D_2$, .... $D_M$, and a plurality of rows of frequencies $F_1$, $F_2$, ..... $F_N$. Each element of the matrix represents a portion of the complete address. For example, in FIG. 5A, there is shown a frequency time address comprised of short bursts of three different frequencies occurring at particular time slots. Thus, during time slot $D_1$, a short burst is transmitted at frequency $F_2$. During time slot $D_4$ a short burst is transmitted at frequency $F_4$, and during time slot $D_5$, a short burst is transmitted at frequency $F_3$. As shown, no time slot includes more than one frequency in order to conserve transmitted power.

Shown in FIG. 5B is a representation of the transmitted signal corresponding to the particular frequency-time matrix shown in FIG. 5A. For the exemplary frequency allocation scheme described in connection with Table II, there may be 12 possible frequencies (each corresponding to one of the supervisory channels) and an appropriate number of time delays (e.g. 10). However, it should be realized that the number of frequencies and the number of delays needed for a given system, are dependent upon the total number of discrete addresses, (i.e. separate basic communication units and retransmission units in the system). In particular, for the 3FT matrix shown in FIG. 5, with 12 frequencies and 10 delays, there may be easily accommodated the more than 40,000 discrete addresses necessary for a 20 division field army.

One suitable means of establishing the FT matrix corresponding to each address would be to associate each basic communication unit, retransmission unit, and interface unit with a six-digit decimal address, and to select a frequency and a corresponding subsequent delay on the basis of each of the three pairs of decimal digits. Of course, other suitable encoding techniques may be employed, and it should be recognized that any number of frequencies and time delays other than three may be used if desired.

In FIG. 6 is shown a generalized and greatly simplified block diagram, depicting the fundamental components necessary for the generation of a three-frequency, three-delay FT matrix such as shown in FIGS. 5A and 5B. Address coder 186 comprises an address translator matrix 188, three programmable variable delay elements 190, 192, 194, and a multi-frequency programmable oscillator 196. Input signals from the address registration unit are provided over leads 198*a* – 198*k* to address translator matrix 188. The format of the input signals will depend on the nature of the registration unit. As indicated, convenience for the operator dictates the use of a keyboard of pushbuttons, whereupon each digit in the address will be represented by a signal appearing on one of leads 198*a* through 198*k*.

Address translator matrix 188 may include a suitable switching matrix comprised of magnetic elements, semiconductor diodes, etc., and serves to process the input signals, and to provide properly timed selection signals to first delay circuit 190, over leads 200*a* through 200*k*, to second delay circuit 192, over leads 202*a* through 202*k*, and to third delay circuit 194, over leads 204*a* through 204*k*. In addition, matrix 188 provides frequency set signals over leads 206*a* through 206*m*, to the multi-frequency oscillator 196. For the FT matrix of FIG. 5A, one of leads 200*a* through 200*k* will set delay unit 190 to correspond to time period $D_1$. Delay unit 192 will be set to correspond to time period $D_4$ by one of leads 202*a* through 202*k*, and delay unit 194 will be set to correspond to time period $D_5$ by one of leads 204*a* – 204*k*. Similarly, during each of the appropriate time periods, signals on leads 206*a* – 206*m* will set variable frequency oscillator 196 to the proper frequencies for the FT matrix shown in FIG. 5A; i.e., Frequency F–2 at time $D_1$, frequency F–4 at time $D_4$, and frequency F–3, at time $D_5$.

A series of timing signals are provided over lead 208 from the supervisory control logic unit such as unit 158 shown in FIG. 3 to the address translator matrix 188, and to each of delay units 190, 192, and 194. Thus, in accordance with the particular delay intervals selected by translator matrix 188, appropriately timed signals appear on leads 210, 212, and 214 at the outputs of respective delay elements 190, 192, and 194, and are provided to programmable oscillator 196 to gate out onto lead 216, the sequence of tone bursts comprising the FT matrix address.

Of course, it should be realized that FIG. 6 is a functional representation of the basic steps required for address encoding, and that the actual circuit implementation of the address coding function may be considerably different from that shown in FIG. 6. For example, address translator matrix 188 may be included as a part of the supervisory control logic unit. Similarly, the timing signals may be so arranged as to permit the first frequency component to be generated without delay, whereupon, delay element 190 may be dispensed with.

FIGS. 7A and 7B illustrate one suitable form of pulse position modulation, namely, time shift keying (TSK), which may be used to encode information on the FT matrix of FIG. 5B.

FIG. 7A shows the binary sequence 01, while alternatively, FIG. 7B shows the binary sequence 10. As may be understood, the total time delay (i.e. $D_1$ to $D_m$ shown in FIG. 5A) defines a time slot within which the 3 FT matrix address may be positioned. In FIGS. 7A and 7B, the beginnings of two time slots are denoted by the vertical dotted lines at times $t_0$ and $t_7$. For the binary sequence, 01, (FIG. 7A) the three pulses in the frequency time matrix of FIG. 5B appear (for binary 0) at times $t_1$, $t_3$, $t_4$, and (for binary 1) at times $t_9$, $t_{12}$, $t_{13}$. For the binary sequence 10 (FIG. 7B), the pulses appear at $t_2$, $t_5$, $t_6$ (for binary 1), and at times $t_8$, $t_{10}$, $t_{11}$ (for binary 0). Thus, if the system includes means to establish the beginning of successive time slots, i.e., times $t_0$ and $t_7$, it may be seen that the relative position within the time slot may determine the binary digit.

In FIG. 8 is shown a functional representation of means to accomplish the time shift keying described in connection with FIGS. 7A and 7B. The circuitry comprises a coincidence gate 218, an inhibit gate 220, a delay unit 222 and an OR gate 224. As subsequently described, each of the supervisory messages may be represented as a series of digital numbers, i.e., ones and zeros. This sequence of ONES and ZEROS may be provided over lead 228 to one input of coincidence gate 218, and over lead 226 to the inhibit input of gate 220. A second input coincidence gate 218 and inhibit gate 220 is provided directly from the address coder (see FIG. 6), over leads 230 and 232. The output of coincidence gate 218 may be provided over lead 234 to delay element 222. Delay unit 222 provides a delay exactly equal to the time between times $t_1$ and $t_2$ or $t_8$ and $t_9$ in FIGS. 7A and 7B whereby the signal appearing on lead 236 at the input thereof will be time shifted by an amount corresponding exactly to the digit ONE if a signal is passed by coincidence gate 218. However, the signal appearing on lead 238 at the output of inhibit gate 220 will have not time shift, and therefore will correspond to the digit ZERO.

The rate at which successive FT matrices appear on leads 230 and 232 may be appropriately timed such that for each digit in the supervisory message appearing on lead 226, one FT matrix will be provided. Therefore, it may be seen that if the signal appearing on lead 226 represents a ONE, the FT matrix will pass through coincidence gate 218 to delay unit 222, but will not pass through inhibit gate 220. Therefore, the signal appearing at the input of OR gate 224 will be delayed, and the output on lead 240 will be time shifted to correspond to a digit ONE. Similarly, the presence of a ZERO signal on lead 226 will block the output of coincidence gate 218 and permit the passage of the FT matrix through inhibit gate 220, whereby the signal appearing at the input of the OR gate will be undelayed, and the output on lead 240 will correspond to the digit ZERO.

In FIG. 9 is shown a functional diagram of an address coder, such as may be used for the alternate single frequency co-channel address assignment technique. The circuit comprises an address translator 242, a primary coding signal generator 244, a secondary coding signal generator 246, a supervisory word modulator 248, and an address modulator 250. As in the case of the encoder of FIG. 6, signals are provided over leads 252*a* through 252*k* from an appropriate address registration unit, to the address translator 242 (FIG. 9), which processes the information, and provides a frequency set signal over leads 254*a* through 254*m* to the primary coding signal generator 244 which may comprise a variable frequency RF oscillator. Secondary coding signals are also provided over leads 256*a* to 256*n* to secondary coding generator 246, which may comprise a variable frequency audio oscillator. Variable RF oscillator 244 is selectively tunable to each of the supervisory channels. Similarly, secondary coding generator 246 is setable to any one of a number of possible tones. The output of coding generators 244 and 246 may be provided over leads 258 and 260 to a suitable address modulator 250, whereby the RF signal may be frequency or amplitude modulated by the audio tone. While the secondary coding characteristic has been shown as a variable audio tone, it should be recognized that it is within the scope of this invention to use other distinctive characteristics such as binary codes, or combination of audio tones for the secondary coding characteristic.

In order to transmit information upon the coded address, the output of secondary coding generator 246 may be provided over lead 262 to Supervisory Word Modulator 248 which may comprise a time shift keying circuit, similar to that shown in FIG. 8, whereby the supervisory word provided over lead 264, and appropriately synchronized with the gated audio pulses may cause either delayed or undelayed transmission of the audio pulses over lead 260 to address modulator 250. Alternatively, supervisory word modulator 248 may be arranged to amplitude modulate the audio pulses produced by secondary coding generator 246 in response to the supervisory word appearing on lead 264.

In the event that a binary code is chosen as the secondary coding characteristic, an additional digit may be added thereto, or its parity changed, etc., by supervisory word encoder 248 to represent each digit of the supervisory word, as an alternative to the time shift keying technique described. In addition, other suitable modulation schemes may be used, as will be apparent to one skilled in the art in view of the above discussion.

FIG. 10 shows a functional diagram of an address receiver suitable for identifying and decoding a supervisory message encoded upon the FT matrix of the receiving basic communication unit. The receiver comprises an RF mixer 266, a local oscillator 268, IF detectors 270, 272, and 274, delay circuits 276, 278, and 280, coincidence gate 282, and an appropriate TSK decoder 284. RF mixer 266 and local oscillator 268 which may be of any suitable type, serve to convert the three frequency RF signal provided by an antenna 286 into three corresponding IF frequencies. The local oscillator may provide two signals, appropriately separated in frequency, such that signals in the C band (i.e., signals from a retransmission unit) and signals in the A band (i.e., received from a nearby basic communication unit) will be converted into the same intermediate frequency. Thus, the receiver is able to recognize both its A band and C band address.

The output of mixer 266 is connected over leads 288, 290, and 292 to detectors 270, 272, and 274 respectively, which may comprise narrow band IF amplifiers, and associated envelope detectors, each responsive to a different IF frequency corresponding to one of the A band and C band channels in the address of the basic communication unit.

The outputs of each of the IF detectors are provided over leads 294, 296, and 298 respectively to corresponding delay circuits 276, 278, and 280. Circuits 276, 278, and 280 are each arranged to have a delay inverse of each of the delays in the FT address, and are connected over leads 300, 302, and 304 to coincidence gate 282, whereby a signal appears on lead 306 when an output is simultaneously present from each of the delay circuits. Since each of the delay circuits is chosen to provide mutually coincident outputs only for the delays associated with the correct address, and since IF detectors 270, 272, and 274 respond only to the appropriate frequencies for the correct address, the coincidence of input signals to gate 282 is indicative that a message addressed to the particular unit has been received. This message is provided over lead 306 to TSK decoder 284, which responds to timing signals over lead 308 from the supervisory control logic unit (see FIG. 6) to appropriately decode the time shift keyed information on the FT matrix, and to provide a series of ONES and ZEROS on lead 310.

FIG. 11 shows a functional diagram of a suitable receiver for use with thesingle frequency coding scheme described in connection with FIG. 9. The circuit includes an RF mixer 312, and local oscillator 314, a primary detector 316, which may comprise a tuned IF amplifier and envelope detector, a secondary detector 318, which may comprise an audio frequency filter, and a supervisory detector 320, which may comprise either an AM detector, a TSK detecor, etc., in accordance with the particular supervisory modulation scheme employed in the coder of FIG. 9. Local oscillator 314 and RF mixer 312 cooperate to produce at the input of primary detector 316, an IF signal corresponding either to the A band or C band address of the particular basic communication unit. Primary detector 316 is sharply tuned, and responds only to a signal corresponding to the particular RF frequency representing the primary coding characteristic of the address.

The output of primary detector 316 is a modulated audio tone (either time shift keyed, amplitude modulated, etc.) and represents the supervisory message encoded by supervisory word encoder 248 of FIG. 9. Secondary detector 318 may comprise a simple band pass filter, which in effect screens all supervisory messages having the proper primary coding characteristic (as indicated by the presence of a signal at the output of primary detector 316) but having an improper secondary coding characteristic.

In the event that the incoming message includes both the proper primary and secondary coding characteristics, the signal is provided over lead 322 to a supervisory detector 320, which responds to synchronizing pulses from the supervisory control logic unit over lead 324 to provide a sequence of ONES and ZEROS on lead 326 representative of the supervisory word transmitted.

FIG. 12*a* illustrates a modulation scheme, namely, pulse position modulation, which may be utilized in the message channels of the various communication bands. Either analog or quantized pulse position modulation may be employed. In the former, the pulse may occur at any time within a fixed length time frame bounded by time $t_0$ and $t_3$ in FIG. 12*a*. For quantized pulse position modulation, a pulse may occur at any one of the fixed number of quantized positions in the time frame. The center time of one such time frame is shown in FIG. 12*a* at time $t_2$ with the center line of a pulse occurring at a time $t_1$, occurring slightly earlier than frame center time $t_2$. The delay between the pulse center time and the frame center time, i.e., $t_2 - t_1$, is representative of the modulation and corresponds, for example, to the amplitude of the signal to be encoded. As may be understood, the position of the pulse, either to the right or to the left of the frame center time $t_2$ is indicative of the particular instantaneous polarity of the signal being sampled.

A second suitable modulation method is shown in FIG. 12*b*. Pulse Width Modulation, which is bounded by frame time $t_0$ and $t_3$. Either leading or training pulse edge modulation may be employed, however trailing edge modulation is illustrated in the figure. For the trailing edge modulation case, the leading edge of the pulse begins at $t_0$ frame time and the width of the pulse is related to amplitude of the signal being encoded. The width of the pulse may either extend through $t_2$ or fall short of $t_2$ depending upon the polarity of the signal being sampled. It may be recognized, of course, that it is within the scope of this invention to employ "presence-absence" coding for the message and/or supervisory channels, or various forms of continuous wave modulation if desired, rather than the pulse position modulation technique outlined above.

FIG. 12*c* illustrates a pulsed carrier modulation scheme in which the signal being encoded is modulated onto the carrier may be frequency, amplitude, or phase modulated. The modulated carrier may be subsequently pulsed to cause the modulated carrier to recur at the frame rate between $t_0$ and $t_2$. The time gap between $t_2$ and $t_3$ may be used in the extended range mode of operation to restransmit the information received during $t_0 - t_2$ interval even on the same frequency channel with relatively simple equipment which stores the information during the $t_0 - t_2$ interval. The frame rate may also be derived by synchronously dividing down the carrier frequency which establishes a phase relation between the envelope of the pulse modulated carrier and the carrier. The carrier frequency and frame frequency information conveyed by the modulated pulse envelope is particularly useful in rederiving the carrier frequency where reference carrier frequency and phase are required for detection of the signal at the receiver. For example, single sideband suppressed carrier, phase shift keying, etc. The carrier may be rederived at the receiver by multiplication using the inverse processes performed in preparing the frame pulse at the transmitter and stabilizing the regenerated carrier by automatic frequency control of the receiver carrier oscillator using known techniques.

One of the particular benefits derived from the utilization of narrow band message channels, as in the present invention, is the ability to employ relatively wide information pulses. As previously mentioned, the pulse channels are of approximately 50 kilocycles per second bandwidth, and consequently wide pulses may be utilized. In one particular embodiment of the invention, pulses having a half-amplitude duration of approximately 30 microseconds are used for message channel signalling, while the FT matrices are composed of pulses of approximately 120 microsecond half-amplitude duration.

In addition to the band-width reduction resulting from the use of narrow band channels, the use of wide pulses provides the additional desirable result of reducing considerably the effect of back-scatter or multipath distortion on the received signal. This result may be clearly seen in FIGS. 13A and 13B. In FIG. 13A is shown a narrow pulse 322 (e.g. of approximately one microsecond duration) as transmitted, and in outline, the corresponding received pulse 324 subject multipath distortion. On the other hand, FIG. 13B shows a relatively wide transmitted pulse 326 (e.g., 30 microseconds), and in outline, the received pulse 328 as distorted in transmission.

It has been determined that for the dynamic range required in the present system, the effect of multipath distortion is to introduce a stretching of the received pulse by approximately 14 microseconds. This stretching is found to be constant for both narrow pulses, such as the one-microsecond pulse 322, and the wide, 30-microsecond pulse 324. Thus, it may be seen that the relative effect of the distortion on the 30-microsecond pulse is considerably less than that on the one-microsecond pulse. It is found that a considerable degree of improvement in the message transmission qualities may be achieved by the use of the wide pulses such as shown in FIG. 13B.

As previously indicated, supervisory information may be encoded upon the pulses comprising the cochannel address of the intended recipient of the supervisory message. One suitable approach, applicable either to "single frequency plus code word" addressing or to "F-T matrix" addressing, would be to assign to each supervisory word a corresponding word of a multibit error-correcting code. For example, it may be shown that a 15-bit Bose-Chaudhuri error-correcting code may be used with appropriate logic circuitry to detect and correct three received errors in all cases, and four received errors in some cases. In addition, when the number of errors exceeds the correction capability of the code, error detection remains possible. Thus, an error indication may be provided, for example, to initiate a request for a retransmission of the message in order to attempt to obtain the proper code word.

In FIGS. 14A–14C there are illustrated a number of supervisory word formats which may be used to transmit the information which must be provided for the establishment of the various calls. FIG. 14A shows a suitable format for use in the initial basic communication unit call-up. In an exemplary embodiment of the invention, the entire duration of the initial message may be 93 and one-third milliseconds. During the first 40 milliseconds, there is transmitted a preamble comprising a sequence of 1's and 0's (i.e., successions of FT matrices), whereby the receiving equipment at each basic communication unit within range may establish pulse synchronization and gain control for the incoming message. Following the 40-millisecond preamble, there is transmitted a 26 and two-third millisecond word synchronization code by which there is established synchronization of the information-processing equipment at the called basic communication unit. The sync word serves as a tag whereby the beginning of supervisory information is identified. Following the period of word synchronization, there is provided an additional 26 and two-third millisecond period during which the appropriate supervisory word is transmitted for use by the receiver.

In FIG. 14B is shown the supervisory word including a channel designation such as would be transmitted to identify the proposed message channel to be used for further communication with the called basic communication unit. The format of the word shown in FIG. 14B is similar to that shown in FIG. 14A except that following the 93 and one-third millisecond period of example, word sync., and supervisory operator, there follows an 80-millisecond period during which the identity of a proposed message channel is transmitted.

The supervisory word format shown in FIG. 14C is appropriate for transmission of supervisory information from the calling basic communication unit to an accessible retransmission unit. As in the case of the previously described formats, the word begins with a 40-millisecond preamble for automatic gain control and pulse synchronization, followed by, in this case, a shortened period of word synchronization and supervisory operator. The remainder of the word, i.e., 40 milliseconds, is devoted to the transmission of the cochannel address of the called basic communication unit.

As shown in FIGS. 14A through 14C, following the period of AGC and pulse sync., all of the information is encoded upon the 15-bit error-correcting Bose-Chaudhuri code. However, as may be seen in FIGS. 14B and 14C, the actual channel designation for the co-channel address of the called basic communication unit is itself a binary coded decimal word which is encoded in the Bose-Chaudhuri code format.

A somewhat modified approach to the encoding of information on the FT matrix of FIG. 5 is shown in FIG. 15. Here, for exemplary purposes, an extremely simplified FT matrix having three frequencies and three possible time delays is employed, though the technique may readily be extended to the 12-frequency, 10-time delay matrix previously discussed. In FIG. 15, each of the possible frequencies, $F_1$, $F_2$, and $F_3$, are represented by a row, and each delay period, $D_1$, $D_2$, and $D_3$, is represented by a column. Using the time $t_0$ as a reference, it may be seen that delay period $D_1$ extends from time $t_0$ to $t_2$, delay period $D_2$ extends from time $t_2$ to $t_4$, and delay period $D_3$ extends from time $t_4$ to $t_6$. The presence of a particular tone burst in each of the intervals constitutes a complete FT address. For example, as shown in FIG. 15 a tone burst of frequency $F_1$ appears at time $t_1$ between times $t_0$ and $t_2$, a tone burst of $F_3$ appears at time $t_3$ between times $t_2$ and $t_4$, and a tone burst of $F_2$ appears at time $t_5$ between times $t_4$ and $t_6$. Thus, the particular FT matrix address is represented by the shaded boxes $F_1D_1$, $F_3D_2$, and $F_2D_3$.

The manner in which information may be encoded upon this matrix may be understood from recognition of the fact that each of the pulses may appear in any one of a number of possible time positions such as $t_1$, $t_3$, and $t_5$ within each of delay periods $D_1$, $D_2$, and $D_3$. Thus, three possible messages may be simultaneously transmitted by varying the time interval, within the delay periods, between each pulse in the matrix. For example, a first information signal may be represented by the actual time delay between the first and the second pulses, i.e., $F_1$ and $F_3$, a second information signal may be represented by the time difference between the first and the third pulses, i.e., $F_1$ and $F_2$, while a third information signal may be represented by the time difference between the second and third pulses, i.e., $F_3$ and $F_2$. The first information signal may be representative of one of the supervisory words described above, the second information signal representative of a channel assignment to be used for further communication, and the third information signal may be representative of the abdress of a called basic communication unit as might be forwarded to a retransmission unit. Thus, as may be understood, each of the three described message signals may correspond to one of the word formats shown in FIGS. 14A through 14C.

Using the above coding scheme, the supervisory receiver in the basic communication unit need only detect the presence of the appropriate frequencies anywhere during the entire appropriate delay interval in order to identify the incoming FT matrix. In order to permit the convenient use of logic circuitry for the decoding of the information represented by the relative delay between the components of the matrix, and to improve the accuracy of reception, the system may be arranged so that the pulses may appear in only one of a limited number of discrete time intervals during the delay period. If a sufficient number of discrete intervals is provided, then each interval may be used to represent a particular supervisory word. However, if the number of supervisory words is greater than the number of possible intervals, then a succession of matrices must be employed in order to transmit a complete message. In other words, if a total of eight discrete intervals are provided within each delay period, then, in effect, an octal code is being employed for message transmission.

As may be understood, the transmission of channel identification information, as well as called basic communication unit addresses with a single FT matrix will not be possible with any practical number of discrete intervals. Thus, it will, in these cases, always be necessary to effectively transmit the information in the form of a multi-digit code word. For example, if 1,000 possible communication channels are available, an octal number may be assigned to each, and the number encoded upon successive FT matrices. Similar means may be employed for the encoding of the called basic communication unit address to be transmitted to a retransmission unit.

While it would clearly be possible, to transmit a four-digit code word, for example, on four successive FT matrices, it is more desirable to transmit each digit of the code sequentially for a number of times in succession before transmitting the next digit, in order to permit the receiver circuitry to employ majority selection circuitry (e.g., five-out-of-eight), to improve the received accuracy of the message, in view of the fact that a simple two-position code is not being employed. Thus, while in FIG. 15 is shown two successive FT matrices in which the transmitted pulses do not appear in the same relative position within each delay period, it may be understood that eight successive transmissions of the same digit may alternatively be employed.

By the employment of the techniques shown in FIG. 15, both supervisory and channel assignment information may be simultaneously transmitted, permitting concurrent processing of both types of information by the receiving equipment, and eliminating the need for a certain amount of storage equipment within the system.

Table III below summarizes the various supervisory words required for use in establishing a communication. Each of the words may be assigned a particular 15-bit Bose-Chaudhuri code word and transmitted by appropriate modulation of successive FT matrices as discussed in connection with FIGS. 7A and 7B.

TABLE III

Supervisory Operator Indicators

Words Used in the Basic Communication Unit

Normal call channel indicator
FT address indicator
Busy
Conference/interface
Local conference
Broadcast warning
Broadcast warning terminate
Command override from basic communication unit Command override from retransmission unit
Basic communication unit callup/channel request
Channel verified
No answer (originated by retransmission unit only)
Terminate callup
Retransmission unit channel terminate
Go-ahead
Data In particular, the "callup/channel request" word is transmitted by a basic communication unit on the appropriate co-channel address of the called basic communication unit as an indication that the user of the calling basic communication unit desires to establish a connection. This message would be transmitted in the format of FIG. 14A, discussed above. Upon receipt of the "callup" word by the called basic communication unit, if it is available (i.e., not otherwise engaged), there is returned to the calling basic communication unit a so-called "go-ahead" word upon receipt of which the calling basic communication unit transmits the "normal call channel indicator" word and the coded identification of the proposed channel to be used for subsequent communication, using the format shown in FIG. 14B. If the proposed channel is satisfactory to the called basic communication unit, the "channel-verified" word is returned to the calling party, and the called unit generates a ringing signal to summon its user. In addition, the ringing signal modulates the message channel frequency at the called basic communication unit, and the modulation received at the calling basic communication unit is provided to the handset speaker thereof to apprise the user thereof of the fact that a connection has been established. In the event that the called basic communication unit is busy upon receipt of the "callup" word, a "busy" word is returned, whereupon an appropriate busy signal is provided to the user of the calling basic communication unit. Upon completion of the call, or in the event that the called party is not reached, "hanging up" the handset at the calling basic communication unit results in a transmission of the so-called "terminate callup" word, whereby the communication channel previously assigned in released.

The "local conference" word, the "broadcast warning" word, the "broadcast warning terminate" word, the "data" word, the "preset conference" word, and the "command override" words are transmitted in the appropriate cases as an indication of the special status of the calls being established. Shown in Table IV is a summary of the effect of the various types of calls on the call basic communication unit and the reply (i.e., either go-ahead or busy) resulting from each.

TABLE IV

Supervisory Calls and Replies in the Basic Communication Unit

| New Call Received | Current Call in Progress | Reply |
|---|---|---|
| Normal | None (idle) | Go-ahead |
| Normal | Normal | Busy |
| Normal | Command Override | Busy |
| Command Override | None | Go-ahead |
| Command Override | Normal | Go-ahead |
| Command Override | Command Override | Busy |
| Data | None | Go-ahead |
| Data | Normal | Busy |
| Data | Command Override | Busy |
| Local Conference | None | Go-ahead |
| Local Conference | Normal | Busy |
| Local Conference | Command Override | Busy |

Thus, for example, it may be seen that if a normal call is in progress, and a new command override call is received, a go-ahead signal will be provided to the calling basic communication unit, but if a command override call is in progress upon the receipt of a new command override call, a busy signal will be returned. On the other hand, should a normal call or a command override call be in progress upon the receipt of a local conference call or a data call, a busy signal would be transmitted.

The "FT address indicator" word, the "no-answer" word, and the "retransmission unit channel terminate" word are used in the establishment of long distance calls. The "callup" word is transmitted on the normal B band address of each retransmission unit in turn until a B band message channel assignment is received. Upon receipt of such channel assignment, the calling basic communication unit transmits the co-channel address of the called basic communication unit (accompanied by the "FT address indicator" word) and one of the supervisory words (e.g., "broadcast warning," "command override," etc.) to indicate the nature of the call.

Upon completion of a local search by the retransmission unit reached as described above, and a subsequent unsuccessful sequential search of all the remaining retransmission units in the range extension network, the "no-answer" word is returned to the calling basic communication unit to indicate that it has been impossible to find the called basic communication unit anywhere in the system. At this time, as well as upon the completion of a connection between retransmission units, hanging up of the handset in the calling basic communication unit results in the transmission of the "channel terminate" word, whereby previously established connections may be released.

The various techniques described above may be combined as appropriate to provide a flexible and convenient system capable of meeting whatever radio communication demands may arise, as may be understood in light of the present disclosure.

The following detailed description of one operative embodiment of the invention may be considered to be exemplary, and it should be recognized that a large degree of modification is possible within the scope of the invention.

DESCRIPTION OF OPERATION OF RETRANSMISSION UNIT

Referring again to FIG. 2, upon the receipt of a service request from a nearby basic communication unit, there are assigned B and C band message channels, the former to be used for transmission by both the calling and called basic communication units, and the latter to be used for reception by both the calling and called units of the messages transmitted on the B band. Upon the initiation of a local search, there is first transmitted on the C band address of the called basic communication unit, the indentity of the B and C band channel pair assigned to the call by supervisory transmitter 82.

If the called basic communication unit is within range of the transmitted message, it will reply on the assigned B band channel and the called basic communication unit (to which the identity of the B and C band channel pair has also been transmitted) will be automatically connected with the called party.

If the called basic communication unit is not within range of the first retransmission unit or otherwise fails to respond, within a specific period of time, to the initial message therefrom, control logic unit 103 immediately initiates the sequential search mode program under control of sequential search programmer 104. From channel assignment memory 106, sequential search programmer 104 selects the address of a second retransmission unit which is within direct range, and transmits an appropriate message on one of the D band supervisory channels in the assigned block used by the first retransmission unit. This message identifies the first retransmission unit, the second retransmission unit, and the channel within the assigned block on which further information will be transmitted by the first retransmission unit. If the second retransmission unit, upon receiving this message is unable to handle the message because of temporary overload, or for other reasons, it returns a message on the supervisory channels within its own assigned block, giving the identity of the first retransmission unit, and its own identity, and the fact that it is busy.

If it is not busy, the second retransmission unit tunes its receiver 100 to the indicated D band channel, and selects a transmission channel within its own assigned block. A suitable supervisory message is transmitted on one of the supervisory channels in this block, the message identifying the calling and called retransmission units, the identity of the selected channel, and the fact that the message is a reply to a call. Reception of this reply by the calling retransmission unit causes to be transmitted, by means of network transmitter 108, the address of the original called basic communication unit, and instructions for the second retransmission unit to conduct the local search.

In response to this message, the second retransmission unit conducts a local search in the same manner as did the first retransmission unit, except that in this instance the called retransmission unit selects an available channel pair (i.e., in the B and C Bands) for the called basic communication unit and relays any answer back to the first retransmission unit over a D band transmission channel assigned to the second retransmission unit. In addition, the message channel switching matrix 112 in the second retransmission unit connects the B band channel with its own D band transmitting channel, and the selected C band channel with the D band channel in the transmission block being used by the first retransmission unit. A similar interconnection is also made at the first retransmission unit. As may be understood, if the called basic communication unit is reached but returns a busy signal, the called retransmission unit transmits the busy signal to the calling retransmission unit and terminates the connection. If the called basic communication unit does not respond (i.e., is not within the range of the second retransmission unit), there is returned a "not present" signal to the first retransmission unit which selects the address of a third retransmission unit from its channel assignment memory 106 and repeats the process. As may be understood, in the event that each of the addresses in the channel assignment memory 106 of the calling retransmission unit is unable to contact the called basic communication unit, the entire process outlined above is repeated, except that the initiating supervisory message to the called retransmission unit includes a request that the called retransmission unit set up a D band link to another retransmission unit rather than to conduct the local search. Upon the establishment of this second link, the intermediate retransmission unit relays the information from the initiating retransmission unit which comprises the supervisory message requesting a local search as previously described. Replies from such local searches are handled in the same way as those outlined above, except that the intermediate retransmission unit does not break the communication path until instructed to do so by the initiating retransmission unit. Thus, it is seen that the sequential search is controlled by the initiating retransmission unit on the basis of program and channel assignment information stored in its channel assignment memory 106 and sequential search programmer 104. As may be understood, if necessary, the intermediate retransmission unit may be instructed to contact yet another retransmission unit, or the process may be extended to include a second intermediate retransmission unit (i.e. a total of four) by repeating the appropriate actions.

As previously mentioned, each retransmission unit includes the facility for establishing and updating, in its channel assignment memory 106, the configuration of the range extension network at the time the rtransmission unit is activated, and to cooperate with a newly entering retransmission unit to modify the information in its own channel assignment memory 106 such that the newly entering retransmission unit may be rapidly assimilated into the system.

When a retransmission unit is inserted into the system, the sequential search programmer 104 (and its associated memory 106) contains no information as to the number or identity of other retransmission units in the system, or as to which supervisory frequencies are being used. Thus, in order for the newly entering retransmission unit to be able to relay calls, it must acquire a noise free block of D band channels including one or more supervisory channels. It must also determine the identity of the retransmission units already in operation in the system and the supervisory channels used by such retransmission units. In order to obtain this information, a suitable orientation program, stored in channel assignment memory 106 is run under control of the sequential search programmer 104.

Information relating to the identity of each of the available channels in the B, C, and D bands may be inserted into a suitable memory in the retransmission unit by means of punched cards or tape or the like. To initiate the actual orientation program, one of the D band channel blocks is chosen at random from channel assignment memory 106, and network receiver 100 simultaneously tuned to all of the channels in the block. Network call processor 102 includes suitable integration circuitry which measures the noise level throughout the entire block being monitored by receiver 100. If the block has an unacceptable noise level, another block is selected at random, and the monitoring process repeated. When a block with an acceptable noise level is located, network call processor 102 initiates the sequential transmission of a first interrogation message on each of the channels in the block, and receiver 100 synchronously sweeps each of the channels within the band in anticipation of a response from any other retransmission unit using the particular channel being monitored as a supervisory channel. In the event that any such response is received, the first portion of the search program is reinitiated, and another block having an acceptable noise level is sought.

Once an acceptably quiet block is found, and the first interrogation message transmitted to each of the channels within the block, without receipt of a response from any other retransmission unit, then it is assumed that no other retransmission unit has selected that particular block of channels for transmission, and the block is selected for the exclusive use of the retransmission unit entering the system. No subsequently entering retransmission unit will be able to acquire this block, since its first interrogation message will be responded to by the retransmission unit which first acquired the block, after which another noise-free block will be selected and its channels interrogated. Upon determination of the availability of the block, the retransmission unit randomly selects one or more of the channels therein for supervisory signaling.

The next step of the program requires the transmission of an identification message on each channel in the selected block identifying the channel or channels selected for supervisory purposes. In response, all other retransmission units tune a section of their network receivers 100 to the identified channels, to permit reception of supervisory information from the newly entering retransmission unit. Simultaneously, a section of receiver 100 of the entering retransmission unit is swept through all of the channels in the non-selected blocks of the D band in anticipation of replies from other retransmission units responding to the identification message. Other retransmission units receiving the supervisory channel identification message each respond on their own supervisory channels whereby the newly entering retransmission unit is automatically apprised of the identity of each of the supervisory channels being used by other retransmission units within range. In response to this information, appropriate sections in network receivers 100 are set for permanent monitoring of the identified supervisory channels, whereby the newly entering retransmission unit, and all retransmission units within its range may be tuned to all the D band channels on which it may be necessary to receive supervisory information.

The next step of the orientation program requires the newly entering retransmission unit to determine the identity of all of the retransmission units within range, and the identity of those transmission units which may be reached only through nearby retransmission units. As may be understood, prior to the establishment of the system, analysis of projected traffic requirements will determine the number of retransmission units which may ultimately be necessary for use in the system. Each such retransmission unit is assigned a particular address which will be exclusively associated with that retransmission unit throughout its entire operating range. In order to increase the flexibility of the system, these addresses are not associated with particular supervisory frequencies, (as indicated above, the identity of the supervisory channels to be used is selected at random by the retransmission unit when it enters the system) but rather may be suitable binary code words to be transmitted by time shift keying or presence-absence keying over the selected supervisory channels.

In order to establish the network configuration in channel assignment memory 106, network call processor 102 randomly selects one of the pre-established retransmission unit addresses (other than its own) and transmits an appropriate message on the supervisory channel in the D band block previously acquired. If no answer to the message is received, another address is selected and the process repeated. Eventually, if the calling retransmission unit is within range of other retransmission units, it message will be received and an acknowledgment will be returned. The first retransmission unit then informs the second retransmission unit of its own identity and requests the other retransmission unit to transmit the addresses of all remaining retransmission units which the second retransmission unit can reach directly. This information is, of course, available in the channel assignment memory 106 of the second retransmission unit since at some prior time, the same orientation program now being run by the presently entering retransmission unit was used by the second retransmission unit. The second retransmission unit transmits only the addresses of those retransmission units which it may reach directly since storage and use of the addresses of more remote retransmission units at this time would require a needlessly complicated correlation program. The entering retransmission unit then repeats the above outlined process for each of the remaining retransmission unit addresses, and thus obtains information as to the identity of all directly accessible retransmission units, and the identity of the retransmission units accessible through the assitance of one of the directly accessible retransmission units.

Referring to FIG. 1, for exemplary purposes, let retransmission unit 50 represent a retransmission unit entering a system already including retransmission units 52, 54, 56, 58 and 60. Assume that at the start of the orientation program, retransmission unit 50 selects the address of retransmission unit 52 and establishes contact. In response to the appropriate request, retransmission unit 52, informs retransmission unit 50 that it can reach retransmission units 54, 56 and 58 directly. Retransmission unit 50 now knows that retransmission units 54, 56 and 58 exist and may be reached via retransmission unit 52. Retransmission units 54, 56 and 58, however, do not yet know of the existence of newly entered retransmission unit 50.

Retransmission unit 50 then selects another address from its memory; for example, the address of retransmission unit 54. As above, retransmission unit 50 now discovers that retransmission unit 54 may be directly contacted and further learns that retransmission unit 54 may directly contact only it, and retransmission unit 52.

Retransmission unit 50 then calls the remaining retransmission unit addresses and find that it may not directly reach any of them.

As may be understood, all the information received from retransmission units 52 and 54 in response to its interrogation signals is stored in the channel assignment memory 106 of the entering retransmission unit and corresponding information about the new retransmission unit is stored in the channel assignment memory 106 of all retransmission units contacted by it.

At this point, the information previously stored is used to further augment the knowledge of the entering retransmission unit as to the network configuration. Retransmission unit 50 now calls one of the directly accessible retransmission units, for example, retransmission unit 52, and requests that it contact to one of the accessible retransmission units, for example retransmission unit 56, to establish a link between retransmission units 50 and 56. At this time, retransmission unit 50 requests the addresses of retransmission units adjacent to retransmission unit 56. Upon reply, information is stored in the channel assignment memories 106 in both retransmission units 50 and 56 relating in the first case, to the identity of retransmission units accessible to retransmission unit 56, and in the second case to the existence of retransmission unit 50 and the means of access thereto.

Retransmission unit 50 then instructs retransmission unit 52 to establish a link to retransmission unit 58, and the above process is repeated. Retransmission unit 50 then inspects the information stored in its memory 106, and observes that no other accessible retransmission unit, in this case, only unit 54, can reach retransmission units not previously contacted. Therefore, retransmission unit 50, still in contact with retransmission unit 58 through retransmission unit 52, instructs retransmission unit 58 to contact one of the retransmission units accessible to it, e.g. retransmission unit 60, to establish a connection between it and retransmission 50. At this time, there is a connection between retransmission units 50 and 60 which includes retransmission units 52 and 58. Retransmission unit 50 transmits an appropriate message to retransmission 60 by which it is informed of the existence of retransmission unit 50 and is requested to identify those retransmission units directly accessible to it.

Retransmission unit 58 is then instructed to contact all remaining retransmission units not previously contacted (in the case of FIG. 1, none) and the process is repeated. In response to each reply from a new retransmission unit, the information stored in channel assignment memory 106 of retransmission unit 50 is compared with the newly received information, and updated if necessary. When it is determined that no new retransmission units may be reached by any path, and that all retransmission unit addresses are accounted for, either as accessible through one or more of the other retransmission units, or as not accessible by any path, all of the supervisory links are released, and the orientation program is completed. At this time, retransmission unit 50 has learned of the existence of one or more paths to retransmission units 52, 54, 56, 58 and 60, and the absence of any paths by which the remaining retransmission unit 50 has learned of the existence of one or more paths to retransmission units 52, 54, 56, 58, and 60, and the absence of any paths by which the remaining retransmission unit addresses may be reached, indicating that retransmission units bearing such inaccessible addresses are not in operation. Correspondingly, the channel assignment memories 106 in all of the other retransmission units include information as to the identity of newly entered retransmission unit 50, and the paths by which it may be reached. Thus, it may be seen that as a new retransmission unit enters the system, upon the completion of its orientation program, all of the retransmission units then in existence include up-to-date information as to network configuration, and retransmission unit enter accessibility.

From the above description of the operation of the retransmission units, the cooperation thereof with the basic communications units in the system may be understood, however, a detailed description of the components of the retransmission unit shown in FIG. 2 as well as more detailed description of the operation thereof may be found in the present assignee's copending U.S. Patent application entitled "Communication System", of Lawrence H. Graham, Ser. No. 460,316, filed June 1, 1965 now allowed, which description is incorporated herein by reference.

DETAILED DESCRIPTION OF BASIC COMMUNICATION UNIT

FIG. 16 is a detailed overall block diagram of a preferred construction of a basic communication unit according to the present invention. As shown, signal information is provided by receiving antenna 330 coupled to a message and supervisory receiver 332, and a separate supervisory receiver 334.

Message and supervisory receiver 332 is capable of operation in the A and C bands in both the supervisory and message modes. On the other hand, supervisory receiver 334 is adapted for operation only to detect incoming supervisory information on the basic communication unit normal address (A or C band) and on the network alert address used by all basic communication units in this system.

Message and supervisory receiver 332 is capable of operating both on the co-channel addressed, and in the various system message channels. As previously noted, after a basic communication unit has initiated a cell on a particular co-channel address, the callee, if it is within range, will return an acknowledge message, or a busy signal on its own co-channel address, rather than on the co-channel address of the calling basic communication unit. In order to respond to this address, message and supervisory receiver 332 is provided with appropriate frequency conversion circuitry, whereby it may be set to the address previously transmitted, in anticipation of a reply on that address. In addition, receivers 332 and 334 are provided with means for responding to addressing signals from a retransmission unit provided over a C band address, each frequency of which is separated by a predetermined equal amount from the frequencies of the normal A band address.

To this end, there is provided A and C band offset oscillators 338 under the control of a system timer and program sequencer 350 which selects the A and C bands, as appropriate, for receivers 332 and 334.

From receiver 332, the demodulated video signals are fed to address detector 340 including delay lines, a triad coincidence gate, and a maximum likelihood detector. A second address detector 342 is fed by the output of supervisory receiver 334.

Units 340 and 342 serve to analyze incoming information and to recognize such information if it was transmitted on the co-channel address of the called basic communication unit (in the case of an acknowledgment of a call-up signal) or on the normal address of the basic communication unit or the network alert address in the case of unit 342. In addition, units 340 and 342 include maximum likelihood detector circuits which convert the time shift keyed FT matrices into on-off signals representative of the ZEROS and ONES of the Bose-Chaudhuri code previously described.

Unit 340 associated with the message and supervisory receiver 332 handles message channel information (30 microsecond pulses) and provides the same to a suitable audio message demodulator 344. Unit 342, associated with supervisory receiver 334 handles broadcast warning (network alert) supervisory information and normal call supervisory information (120 microsecond pulses) only.

Audio message demodulator 344 is connected over lead 346 from delay lines etc., 340. Demodulator 344 performs the following functions: (1) accepts the pulse position modulation or encrypted QPPM and includes a detector to determine the time position of the pulses; (2) accepts decrypted quantized pulse position modulation from the security device and demodulates it, thus recovering the audio waveform; (3) demodulates the unencrypted pulse position modulation; and (4) routes supervisory tones provided over lead 348 from the program sequencer 350 to the handset with the audio message over lead 352.

Encrypted quantized pulse position modulation is decoded exactly the same as unencrypted PPM, except that the QPPM is first processed by an external security device to yield decrypted QPPM.

Triad sequencer and synchronization units 354 and 356 are provided for the message and supervisory signal receiver 332 and the supervisory receiver 334, respectively. Triad sequencer and synchronization circuit 354, associated with the message and supervisory receiver, provides synchronized gating pulses to the frequency synthesizer 336 over lead 357. Frequency synthesizer 336 in turn provides the proper gated frequencies (corresponding to an FT address) over lead 358 for properly tuning supervisory and message signal receiver 332, supervisory receiver 334, and transmitter 360.

Triad sequencer 356 serves a similar function for receiver 334; however, it provides timing signals for both normal and network alert addresses.

During the transmission of a call, the triad sequencers 354 and 356 are used to provide the proper frequencies, gating times, and modulation pulses to transmitter 360, which transmits both supervisory information and messages in all A and B band channels. The triad sequencers are driven by position modulated pulses from an audio modulator and encoder 362. When the basic communication unit is set up for communication on message channels, the triad sequencers are bypassed and the position modulated pulses are coupled directly into transmitter 360.

Since a relatively large number of frequencies must be synthesized simultaneously, frequency synthesizer 336 may advantageously comprise a crystal matrix. By use of suitable matrix driver 363 under control of program sequencer 350, the desired frequencies may be gated out of the matrix upon command. Signal inputs from a frequency matrix driver 363 energize the oscillators or select frequencies from those oscillators which are on continuously. Time signal inputs from the triad sequencer

354 and 356 gate out the selected frequencies at the desired time.

The basic communication unit also includes a message channel search and interrogate control block 364 which provides the means for selecting an acceptable communication channel, or verifying a proposed channel. Automatic level and power control are incorporated as previously mentioned to optimize channel assignment and to provide gradual degradation during high traffic demands.

The control section of the basic subscriber unit is incorporated in the system timer and program sequencer 350. The system timer generates most of the timing signals needed for the system, including all the logic-control timing. The various supervisory tone signals are also generated in the system timer. These are used internally and are transmitted as required.

A processor 366 is provided to perform the following functions:

1. It receives the call initiation data from the key unit (i.e., push buttons) of the handset;
2. It assemblies the above and transfers it to a working storage element 368;
3. It receives the channel selection and assembles the calling preamble to be transmitted to the callee;
4. It receives supervisory data from supervisory Bose-Chaudhuri decoder 370 and transfers channel assignments to the frequency matrix driver 363.

Block 372 is a pre-recorded retransmission unit address memory and sequencer which stores up to 20 addresses. An address programming card may be used to pre-set the retransmission unit addresses into the memory 372 when the basic communication unit is being prepared for use.

Processing unit 366 includes a supervisory word decoder with decoding matrix. This unit processes the supervisory words involved in the various basic communication unit operations. The outputs from this decoder are used to initiate programs and/or jump operations in the program sequencer and to activate lights or gate on tone signals.

Bose-Chaudhuri decoder 370 generates word synchronization signals which are provided to the system timer 350 and also performs error correction and detection on all received supervisory data.

A corresponding Bose-chaudhuri encoder 374 is provided to encode the supervisory signaling data before transmission.

Audio modulator and encoder 362 is connected to the audio input terminal and performs the following functions: (1) It accepts speech input from the handset, signal tones from the program sequencer, and voice frequency data inputs and converts them to uniform sample PPM; (2) Provides PPM signals to the security device and accepts encrypted QPPM from the security device; (3) Accepts supervisory words from encoder 374 and converts them to either time-shift keyed pulses or on-off pulses as required by the signaling mode; (4) Accepts interrogation request and reply signals from message channel search etc., unit 364; (5) Provides 8-k.c. clock pulses to demodulator 344.

Transmitter 360 performs the following functions: (1) Provides 20 watts peak pulse power in the assigned band; (2) Responds to signals from frequency synthesizer 336 and from an offset oscillator 376 to place the transmitter in band A or band B; (3) Accepts the video modulation pulses from encoder 362 via the triad sequencers 354 and 356 and creates the 30-microseconds Gaussian RF pulse for 600-pulses-per-second signaling; and (4) Accepts the ALC-APC control signal from the message channel search, ALC-APC and interrogate control circuit 364, and adjusts the RF power output to the correct value.

In FIGS. 17–33, assembled as in FIG. 34, is shown in detail the construction of the exemplary embodiment of FIG. 16. Clearer understanding of the following material may be had by frequent reference to FIG. 16 as the discussion progresses.

Figure 17:
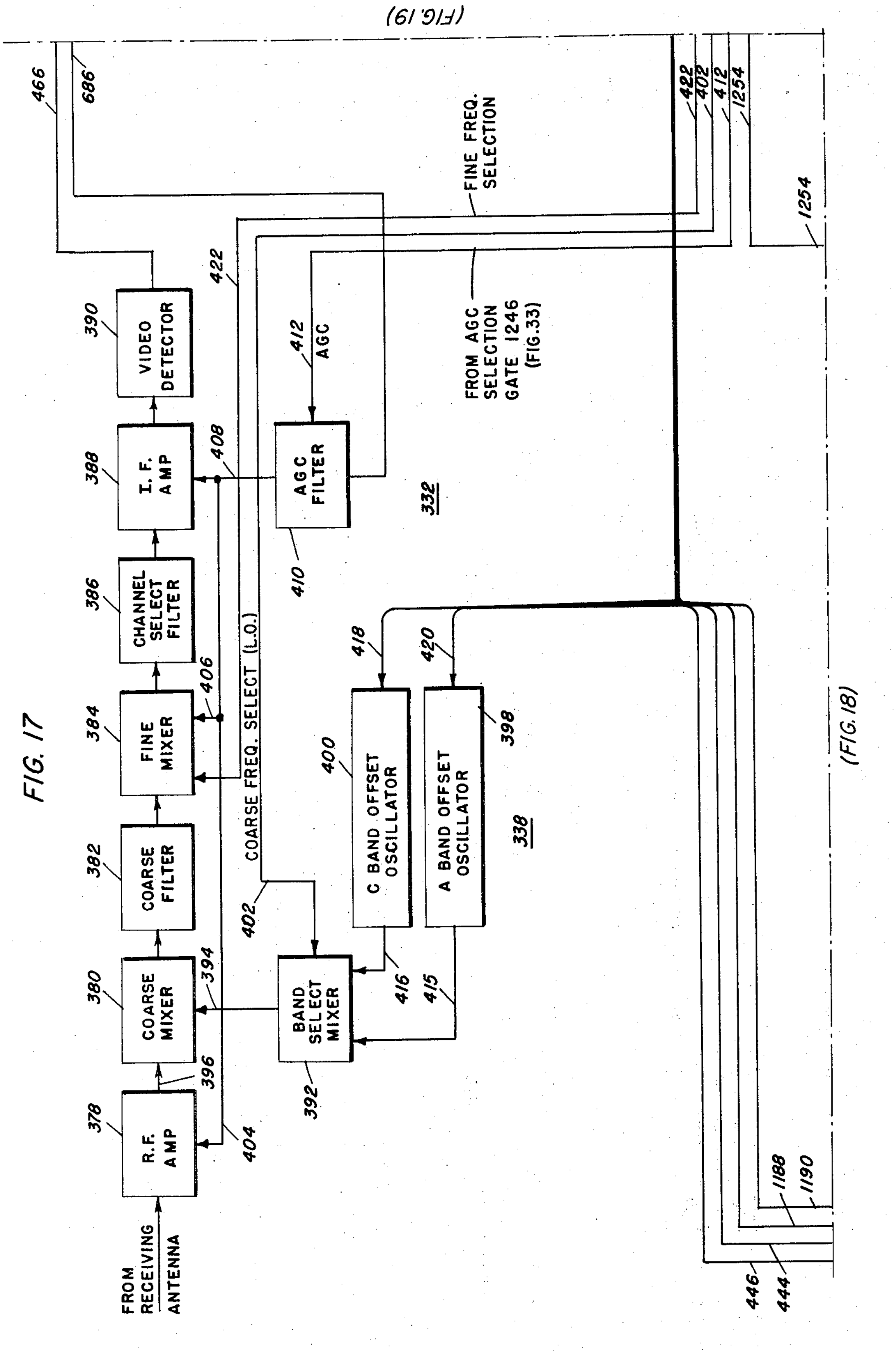

Referring now to FIG. 17, message and supervisory receiver 332 shown in FIG. 16, comprises an RF amplifier 378, a coarse mixer 380, a coarse filter 382, a fine mixer 384, a channel select filter 386, a tuned IF amplifier 388, and a video detector 390, connected in series. The frequency conversion signal for coarse mixer 380 is provided from a band select mixer 392 over lead 394, while the information signal is provided over lead 396 from RF amplifier 378. Band select mixer 392 is fed by an A band offset oscillator 398 and a C band offset oscillator 400, and by a coarse frequency signal from synthesizer 336 provided over lead 402 as a local oscillator signal for the receiver. Gain control is provided to RF amplifier 378, fine mixer 384, and IF amplifier 388 over leads 404, 406, and 408, respectively, by means of an AGC filter 410, controlled over lead 412 by the output of OR gate 1288 in AGC selection gate 1246 shown in FIG. 33.

RF amplifier 378 is sufficiently broadband to cover the entire frequency range of the A and C bands to provide message and supervisory reception both in the "basic communication unit to basic communication unit" mode, and in the "retransmission unit to basic communication unit" mode.

Because of the extremely large number of channels provided within each of the A and C bands, it has been found desirable that receiver 332 be of the double conversion type, including coarse mixer 380 and fine mixer 384. For simplicity, coarse mixer 380 is arranged to select sub-bands (either in the A or C bands) encompassing ten communication channels, while fine mixer 384 is arranged to select a particular channel within each of the ten channel sub-bands.

Band select mixer 392 is fed over leads 415 and 416 by offset oscillators 398 and 400 respectively, which may be gated oscillators of any appropriate type controlled by program sequencer 350 over leads 418 and 420. The coarse frequency signal provided over lead 402 from an OR gate 952 (FIG. 24) in frequency synthesizer 336, which determines the tuning of the receiver to the particular ten channel sub-band, is fed to mixer 392 and is converted by the output of one of offset oscillators 398 and 400 to select a ten channel sub-band in band A or band C.

Coarse filter 382 is adapted to cooperate with the coarse mixer 380 and is of sufficient bandwidth to pass the entire group of ten channels selected. For example, for 50 kilocycle per second bandwidth communication channels, a coarse filter of approximately one megacycle per second bandwidth at the appropriate intermediate frequency would be satisfactory.

Thus, as may be understood, the output of coarse filter 382 is band limited (approximately one megacycle centered at a suitable intermediate frequency, e.g., 60 megacycles), and corresponds to a sub-band of ten channels including the particular channel desired to be received.

Fine mixer 384 serves to select the particular channel to be demodulated from among the ten channels chosen by the first frequency conversion in coarse mixer 380. The fine frequency selection in mixer 384 is controlled by OR gate 992 (FIG. 25) over lead 422 from frequency synthesizer 336 and is of appropriate frequency to effect the second frequency conversion. The bandwidth of channel select filter 386, of course, must be sufficiently wide to accommodate each of the system communication channels, in this case 50 kilocycles per second, However, in order to compensate for tolerance buildup in the frequency determining oscillators of frequency synthesizer 336, it is desirable that channel select filter 386 be somewhat wider than the 50 kilocycle per second minimum. Accordingly, channel select filter 386 may appropriately be an 80 kilocycle per second bandwidth passive filter of any suitable construction.

The output of channel select filter 386 is provided to a suitable IF amplifier 388, which provides all of the necessary intermediate frequency amplification for the receiver. As may be seen from FIG. 17, no intermediate frequency amplifier is provided between coarse filter 382 and fine mixer 384, since dynamic range problems make it desirable to have the receiver gain occur after the entire frequency selection process is completed. Thus, as a practical matter, RF amplifier 378, mixers 380 and 384, and coarse filter 382 should be so arranged that the signal loss between RF amplifier 378 and the output of fine mixer 384 is minimized.

As previously noted, message and supervisory receiver 332 cooperates with the channel search control unit to determine the availability of a communication channel for use by the basic communication unit in establishing or responding to a call. In order to provide for the variable selection criteria by which a channel of lesser quality than normal may be selected if a high quality channel is unavailable (because of peak system traffic loads) a variable gain control circuit including AGC filter 410 and an AGC selection gate 1246 shown in FIG. 33 is provided.

As described in detail subsequently, an AGC signal on lead 412 will be appropriately selected by program sequencer 350 to represent the minimum level of the tones of a received supervisory triad, the level of the signal appearing at the output of video detector 390, or a specially programmed automatic level power control signal used for channel search.

At all times, except during channel search and during actual reception, the signal on lead 412 is such that AGC filter 410, which may be of conventional construction, will operate receiver 332 at maximum sensitivity. Upon receipt of supervisory information, the signal on lead 412 will reflect the level of the received triad. For received messages the output of video detector 290 on lead 412, is switched through gate 1246 (FIG. 33) to provide AGC based on the strength of the incoming video signal. In these three conditions, operation is quite similar to that of conventional AGC since the gain is varied to maintain the detector 390 output at a constant level.

In the channel search mode, an automatic level and power control units 1248 and 1250 (FIG. 33) cooperate to set the gain of receiver 332 and the power output of transmitter 360 to levels which will properly determine if the channel being considered is usable.

After a channel has been selected, conventional AGC is used to provide the normal benefits, for example, resistance to fading, etc. However, the transmitters in both the calling and called units remain under control of automatic level and power control units 1248 and 1250 since the use of the channel may have been predicated on the assumption that a maximum transmitted power, determined during the channel search, would be used. The receiver AGC, though conventionally controlled will be under the influence of the automatic level control signal at the beginning of the actual call before coming under control of the receiver output in conventional fashion, whereby unduly high receiver sensitivity will not be employed at any time.

Figures 18, 29:
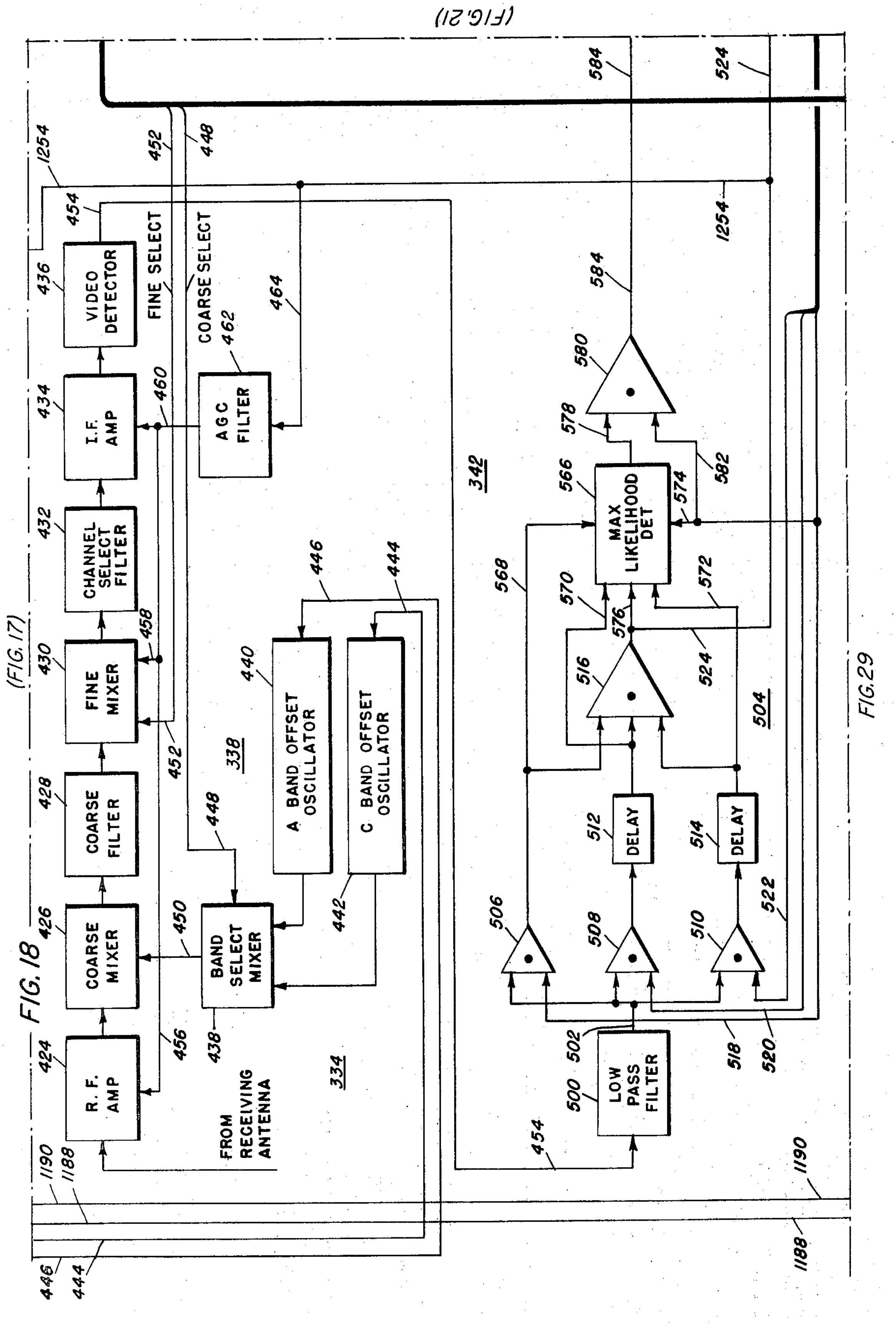

In FIG. 18, there is shown the supervisory receiver 334, comprising an RF amplifier 424, a coarse mixer 426 a coarse filter 428, a fine mixer 430, a channel select filter 432, and IF amplifier 434, and a video detector 436, all in series connection, similar to the configuration of message and supervisory receiver 332 shown in FIG. 17. Receiver 334 is also of the double conversion superheterodyne type; however, it is adapted to operate only in the supervisory channels in the A and C bands. As in the case of receiver 332, there is provided a band select mixer 438, and offset oscillators 440 and 442, controlled by sequencer 350, (FIG. 30) over leads 444 and 446, to alternately select the band of operation. The second input to band select mixer 438 is supplied over lead 448 from OR gate 449 in synthesizer 336 (FIG. 24) as a coarse frequency signal to select a ten channel sub-band in either the A or C bands. The output of band select mixer 438, provided over lead 450 to coarse mixer 426, is of appropriate frequency to convert signals appearing in the A and C band address channels to which the particular basic communication unit is to respond into the IF pass band of coarse filter 428. As in receiver 332, the coarse frequency sub-band selection is followed by a fine frequency channel selection, accomplished by means of fine mixer 430 and a fine frequency selection signal supplied over lead 452 from frequency synthesizer 336.

Channel select filter 432, IF amplifier 434, and video detector 436 operates as described in connection with receiver 332 to provide a series of rectangular pulses on lead 454 representing time shift keyed supervisory FT matrices in the A or C bands for normal or network alert addresses.

As explained in detail below, the timing of the local oscillator signals on leads 448 and 452 from synthesizer (FIG. 26) 336 is controlled by triad sequencer 356 (FIG. 22) to alternately switch between normal and network alert addresses. During the time that the normal address is present, band select mixer 438 alternates the A and C bands, so that incoming call-up messages from both basic communication units and retransmission units may be processed. As may be understood, immediately upon receipt of a call-up message, the band and address alternation stops, whereby the received message may be fully processed. Upon completion of the message, the receiver returns to its normal alternating mode.

Gain control for supervisory receiver 334 is provided to RF amplifier 424, fine mixer 430, and IF amplifier 434 over leads 456, 458, and 460, respectively, from an AGC filter 462, similar to AGC filter 410 in message and supervisory receiver 332. The input to AGC filter 462 is provided over leads 464, 1254 and 524 from address detector 342, as explained below, and operated in conventional fashion when a proper FT matrix is received. Supervisory receiver 334 does not participate in the message channel search procedure, and therefore does not require the gain control selection feature accompanying the automatic level control. Accordingly, the AGC signal is provided directly, rather than through an AGC selection gate comparable to gate 1246 shown in FIG. 33.

Figure 19:
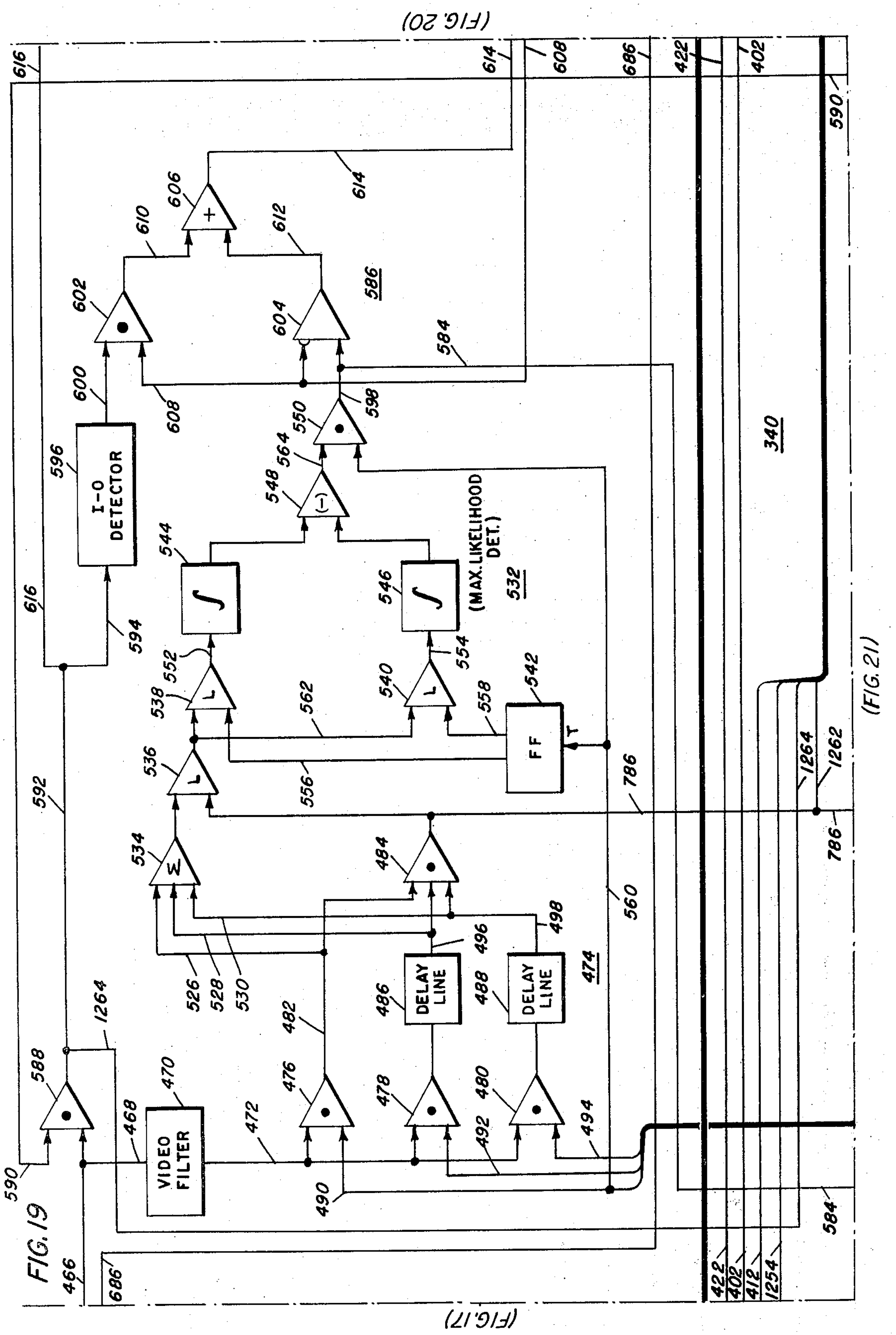

In FIGS. 18 and 19, there are shown detailed diagrams of the processing circuitry which accept demodulated information, provided by receivers 332 and 334, and provide the address recognition and preliminary decoding functions required by the system.

The output of video detector 390 (FIG. 17) in message and supervisory received 332 is provided through leads 466 and 468, to a low pass video filter 470, to assure optimum bandwidth filtering characteristics. The output of filter 470 is provided over lead 472 to an address recognition circuit 474 which operates under control of triad sequencer 354, (FIG. 21) described in detail subsequently, to reject all proper combinations of frequencies which do not possess the required time relationship.

As previously noted, message and supervisory receiver 332 responds to FT matrices upon which an acknowledgement signal is encoded on the address of a previously called basic communication unit. Address detector 474 includes three coincidence gates, 476, 478, and 480. The output of coincidence gate 476 is connected over lead 482 directly to the input of another coincidence gate 484 while the outputs of coincidence gates 478 and 480 are connected through delay circuits 486 and 488, respectively as the second and third inputs to coincidence gate 484. The first input to gates 476, 478 and 480 is provided on lead 472 from video filter 470, while the second inputs are provided respectively on leads 490, 492 and 494 from triad sequencer 354 shown in FIG. 21. Thus, as described in connection with FIG. 10 (showing a simplified diagram of an FT matrix address detector) if the input signals appearing on lead 472 (FIG. 19) are in proper time relationship with the signals appearing on leads 490, 492, and 494, the signals appearing on lead 482 at the output of gate 476, and the signals on leads 496 and 498 at the outputs of delay circuits 486 and 488 will occur in time coincidence and will be passed through coincidence gate 484, indicating the presence of a message to which the particular basic communication unit must respond.

Referring again to FIG. 18, the output of video detector 436 is connected by means of lead 454 to a low pass video filter 500 similar in construction and function to video filter 470 shown in FIG. 19. The output of video filter 500 is provided over lead 502 as an input to an address detector circuit 504 similar to circuit 474 in FIG. 19. Address detector 504 comprises three coincidence gates, 506, 508 and 510, a pair of delay circuits 512 and 514 and a fourth coincidence gate 516. First inputs to each of coincidence gates 506, 508 and 510 are provided over lead 502 from low pass filter 500, while second inputs to the gates are provided over leads 518, 520 and 522; respectively, from a second triad sequencer 356, (FIG. 22) which operates to select the proper time spacing between pulses of FT matrices corresponding to the normal address of the basic communication unit in bands A and C, and the system network alert address. As in the case of address detector 474, if the time spacing of the pulses on lead 502 matches that of the pulses on leads 518, 520 and 522, delay circuits 512 and 514 will produce a coincidence of pulses on the three inputs to coincidence gate 516 resulting in an output signal therefrom.

Thus, there will appear an output from gate 516 whenever a proper address is received, irrespective of whether it is a normal address or a network alert address. However, the remainder of the system will respond without ambiguity, since appropriate portions thereof will be sequenced to recognize when the coincidence signal represents the normal address in the A or C band, or a network alert address, by operation of program sequencer 350.

The output of coincidence gate 516 is provided over leads 525, 1254 and 464, mentioned previously as the AGC signal for supervisory receiver 334. As may be understood, use of the correlated pulse output of gate 516 for generating the AGC signal is desirable since receiver 334 is required to respond only to certain inputs, and absent such inputs, corresponding to no output from gate 516, receiver sensitivity should be at a maximum.

Gate 516 may be arranged to pass a signal representative of the lowest level of its inputs, whereby the AGC signal generated by AGC filter 462 will reflect the maximum path loss encountered by the frequencies of the received address.

Referring again to FIG. 19, there is further shown the maximum likelihood detector 532, which comprises a summing amplifier 534, linear gates 536, 538, and 540, flip-flop 542, integrating circuits 544 and 546, differential amplifier 548, and coincidence gate 550. Maximum likelihood detector 532 serves to convert time shift keyed FT matrices into a series of ONES and ZEROS for further processing.

Summing amplifier 534 is fed by inputs on leads 526 528 and 530. The output thereof is connected to linear gate 536 which is connected in turn to linear gates 538 and 540. Linear gates 538 and 540 are connected by means of leads 552 and 554 as inputs to integrators 544 and 546, respectively. Amplifier 534 and the linear gates are required in order to provide signals to integrators 544 and 546 which resemble as closely as possible the original pulse shape of the inputs to coincidence gate 484. Multi-vibrator 542 provides gating signals over leads 556 and 558 to gates 538 and 540, respectively. The trigger for flip-flop 542 is provided by the timing signal from trial sequencer 534 over leads 490 and 560 and serves to gate the flip-flop into one state during that portion of the triad cycle which would correspond to a time shift keyed input representing a ONE and to gate the flip-flop into its opposite state during that portion of the time slot corresponding to an incoming digital ZERO. If the FT matrix is undelayed within the time slot, it may correspond to a digital ZERO, as in FIGS. 7A and 7B; however, if the FT matrix is delayed, there is represented a digital ONE. Accordingly, since the gating signal appearing on lead 490 corresponds to the last pulse in the FT matrix triad (i.e., the pulse which is not delayed before application thereof to coincidence gate 484) during the portion of the time frame which would correspond to an incoming digital ONE, the output of linear gate 536 would be connected through linear gate 538 to integrator 544 while during the portion of the time period corresponding to an incoming digital ZERO, the output of linear gate 536 would be connected through lead 562, linear gate 540, and lead 554, to integrator 546.

Figure 22:
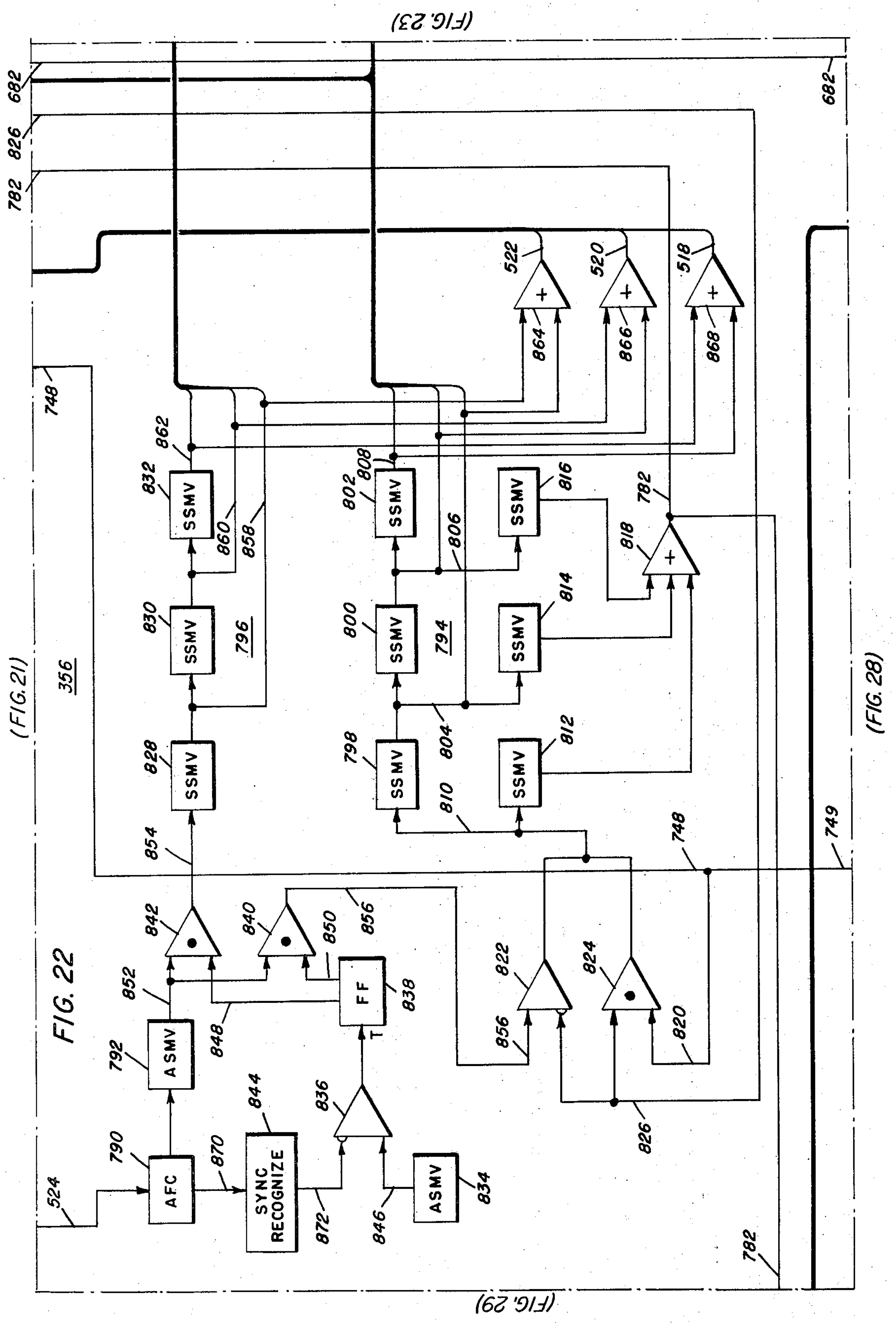

The outputs of integrators 544 and 546 are compared by means of a differential amplifier 548, which determines by amplitude discrimination, whether the incoming signal is representative of a digital ONE or a digital ZERO. The output of differential amplifier 548 is connected over lead 564 as one input to coincidence gate 550, while the second input is provided over lead 560 from triad sequencer 354 (FIG. 22). Thus, the signal appearing on lead 564, which may be a high or low level, corresponding to a ONE or a ZERO respectively, will be gated by the triad sequencer 354 during each FT matrix time period to provide a stream of pulses corresponding to the time shift keyed information provided by receiver 332.

Further discussion of the maximum likelihood detector may be found in assignee's copending U.S. patent application, Ser. No. 171,494, filed Feb. 6, 1962, by M. J. Wiggins, et al., entitled "Maximum Likelihood Detector," now U.S. Pat. No. 3,212,014.

A second maximum likelihood detector 566 of the type shown in FIG. 19 is also connected to the output of the supervisory receiver address detector 504 (see FIG. 18). The inputs to coincidence gate 516 are provided to the maximum likelihood detector 566 over lead 568, 570, and 572, while the gating signals, corresponding to those provided over leads 490 and 560 in maximum likelihood detector 532, are provided over leads 568 and 574 from the supervisory receiver triad sequencer 356 (FIG. 22) The output of gate 516 is provided over lead 576. The output of maximum likelihood detector 566 is provided over lead 578 as one input to coincidence gate 580, which is gated by a signal over lead 528, and leads 574 and 518 from triad sequencer 356, to provide pulses representing ONES and ZEROS on lead 584. For reasons explained below, the signal on lead 584 is connected in common with the output of coincidence gate 550 (see FIG. 19) as one input to supervisory selection gate 586.

As previously noted, for supervisory signaling on the A, B and C band message channels, on-off signaling is employed, rather than time shift keying. Accordingly, the output of video detector 390 in message and supervisory receiver 332 (FIG. 17) is connected over lead 466 as one input of a selection gate 588. A second input thereto is provided over lead 590 and 750 from program sequencer 350 (FIG. 30) when information is to be received over the message channels. In other words, when supervisory information encoded on the appropriate FT matrices is to be received, the output of video detector 390 is provided only to video filter 470; however, when information is expected on the various message channels in bands A and C, gate 588 is unblocked by the enabling signal on lead 590 to pass the incoming information through leads 592 and 594 to a ONE-ZERO detector 596.

The signal appearing on lead 592 is also provided over lead 1264 as an automatic gain control signal to the AGC selection gate 1246 ( see FIG. 33), as previously noted. Thus, gate 588 serves to provide an AGC signal for the receiver which may be used in the conventional manner if the AGC selection circuitry is appropriately activated.

ONE-ZERO detector 596 which may be a suitable threshold circuit connected to a Schmitt trigger, receives the presence-absence modulation representative of supervisory information in the message channels, and transforms it into a series of sharply defined rectangular pulses similar to the outputs of maximum likelihood detectors 532 and 566.

The outputs of the maximum likelihood detectors 532 and 566, and of ONE-ZERO detector 596 are provided over leads 598, 584, and 600, respectively, as the signal inputs to supervisory selection gate 586 which comprises coincidence gate 602, inhibit gate 604 and OR gate 606.

Figure 30:
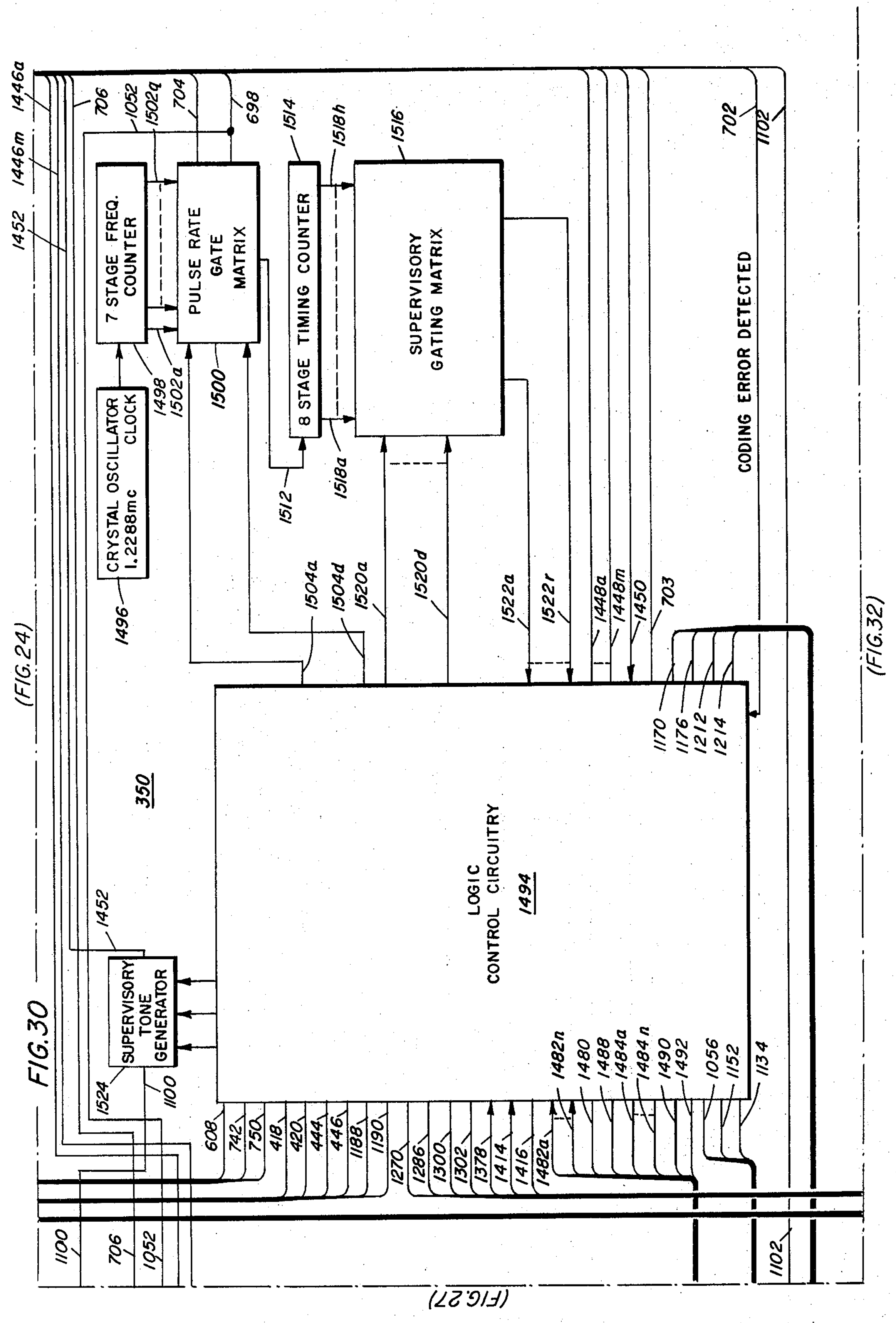

As may be understood, signals appearing on lead 600 at the output of ONE-ZERO detector 596 will be meaningful only during channel confirmation messages in the A band, and during the receipt of the various C band supervisory messages. On the other hand, the information provided by maximum likelihood detectors 532 and 566 will be of significance only during periods of expected FT matrix supervisory information. Accordingly, selection gate 586 is necessary in order to properly select meaningful supervisory information. The outputs of the maximum likelihood detectors are connected over leads 584 and 598 as one input to inhibit gate 604 while the output of ONE-ZERO detector 596 is connected over lead 600 to coincidence gate 602. The second input to both gates 602 and 604 is provided over lead 608 from program sequencer 350 (FIG. 30). A signal is present on lead 608 when supervisory information in the message channels is expected, simultaneously blocking inhibit gate 604 to prevent the passage of maximum likelihood detector signals, and enabling coincidence gate 602 to permit the passage of ONE-ZERO detector signals. The outputs of gates 602 and 604 are provided over leads 610 and 612 respectively, to OR gate 606 which provides over lead 614 all of the supervisory information to which the basic communication unit must respond.

The supervisory information is encoded on a multibit error correcting code such as the Bose-Chaudhuri code previously mentioned. Thus, the output of selection gate 586 is provided over lead 614 to a suitable error detecting decoder 370 (see FIG. 20) to be described in detail subsequently. The signal on lead 592 is connected by lead 616 to the audio message demodulator 344 also shown in FIG. 20, wich comprises a threshold detector 618 and a series connection of a first linear gate 620, a first holding circuit 622, a second linear gate 624, a second holding circuit 626, an audio filter 628, and an audio amplifier 630. Demodulator 344 further includes a ramp generator 632 and a timing circuit comprised of inhibit gate 648 and OR gate 650. The demodulator input is provided over lead 616 to threshold detector 618 from gate 588 in FIG. 19. Threshold detector 618 accepts the pulses from the message and supervisory receiver 332, adjusted to equal amplitude by operation of AGC filter 410 (see FIG. 17) and produces a narrow rectangular output pulse on lead 652 when the input signal on lead 616 crosses the detector threshold.

The output of the threshold detector is provided over leads 652 and 654 to the security adapter 644 which provides a decoded version of the secret message at its output on lead 656.

Lead 652 is further connected as one input to inhibit gate 648. The inhibit input to gate 648 is provided over lead 658 from a switch 1442 (FIG. 31), whenever the security adapter 644 is to be used to block the direct output of threshold detector 618. The outputs of security adapter 644 and inhibit gate 648 are provided over leads 656 and 660, respectively, as the inputs to OR gate 650 which provides an output over lead 662 corresponding either to the output of threshold detector 618 when scrambled or otherwise encrypted messages are not being received, or the output of security decoder 644 in the form of a sequence of pulse position modulated pulses. As previously noted, the encoding scheme may be either analog or quantized pulse position modulation, through the latter is more convenient when the secure or secret mode is employed.

The position modulated pulses appearing on lead 662 are connected to a first linear gate 620 which may be a suitably based linear amplifier. A second input to gate 620 is provided by ramp generator 632 over lead 664. The narrow pulses provided over lead 662 gate the ramp generator output through linear gate 620 to provide pulses on lead 666, the amplitude of which corresponds to the PPM deviation of the signals on lead 662. In other words, the position modulated receiver output is converted into pulse amplitude modulation. However, the pulse amplitude modulated signal on lead 666 varies plus and minus about the ground level and is still time position modulated.

The linear gate output is provided over lead 668 to integrator 642, the output of which is provided over lead 670 to astable multi-vibrator 640. The control signal provided over lead 670 serves to vary the phase of the multi-vibrator output. The pulse signals appearing on lead 672 drive ramp generator 632 so that the center of the ramp signal is synchronized with the center of the pulse position modulation deviations of the signals on lead 662.

In order to remove the time deviation in the pulse amplitude modulated signal, a first holding circuit 622, a second linear gate 624, and an inhibit circuit 636 are provided. Hold circuit 622 temporarily stores the modulated signal appearing on lead 666 to permit the sampling thereof by linear gate 624. The sampling is controlled by a signal on lead 674, provided through inhibit gate 636 from timing multi-vibrator 640. The output of linear gate 624, appearing on lead 676, is a pure pulse amplitude modulated signal with no time deviation on the pulses. The audio waveform may then be recovered by stretching the pulse amplitude modulated signal on lead 676 by means of a suitable holding circuit 626 and filtring the output thereof through an audio filter 628. The output of audio filter 628 is connected to a suitable audio amplifier 630, the output of which is connected by lead 352 to a speaker 1434 (FIG. 31) in the handset of the basic communication unit. In addition, a second input to audio amplifier 630 is provided over leads 680 and 1452 from a supervisory tone generator in program sequencer 350 (FIG. 30) to supply the various supervisory tones, such as the ringing tone, the ringback tone, the busy signal, etc., to the handset speaker over lead 532.

The timing signals for multi-vibrator 640 are normally provided through inhibit gate 638 and lead 682 from a clock source in audio message encoder 362 shown in FIG. 16.

The second input to inhibit gate 638 is provided over lead 686 from the AGC filter 410 in message and supervisory receiver 332, (FIG. 17). Thus, when the PPM signals are present, as indicated by the presence of the AGC signal on lead 686, gate 638 is blocked, and timing multi-vibrator 640 is released from the clock in encoder 362 and permitted to synchronize with the incoming pulses. Final synchronization occurs quite rapidly, since multi-vibrator 640 must change phase by a maximum of 180°, and by a frequency of only a few cycles (the difference between the encoder oscillator frequency, and the very similar frequency of the incoming position modulated pulses). The inhibit gate 636 prevents the second holding circuit 626 from being reset unless an incoming position modulated pulse is present. This latter feature is necessary, since the redundant pulse elimination in the transmitted message, as described in the aforementioned Varsos and Douglas patent, will require that the absence of a received pulse be interpreted as meaning that the transmitted waveform did not change significantly between two successive sampling intervals. Thus, second holding circuit 626 retains the last received value of the signal on lead 676. The final speech processing is accomplished by means of filter 628 and audio amplifier 630. Filter 628 comprises a low pass filter having a center frequency just beyond the audio band, (e.g., 3800 cycles per second), with a de-emphasis of approximately 3 db starting at approximately 500 cycles. The de-emphasis feature complements a corresponding pre-emphasis provided in audio encoder 362, which serves to increase resistance to noise by increasing the normally low PPM deviation that is characteristic of high-frequency voice signal components.

Figure 20:
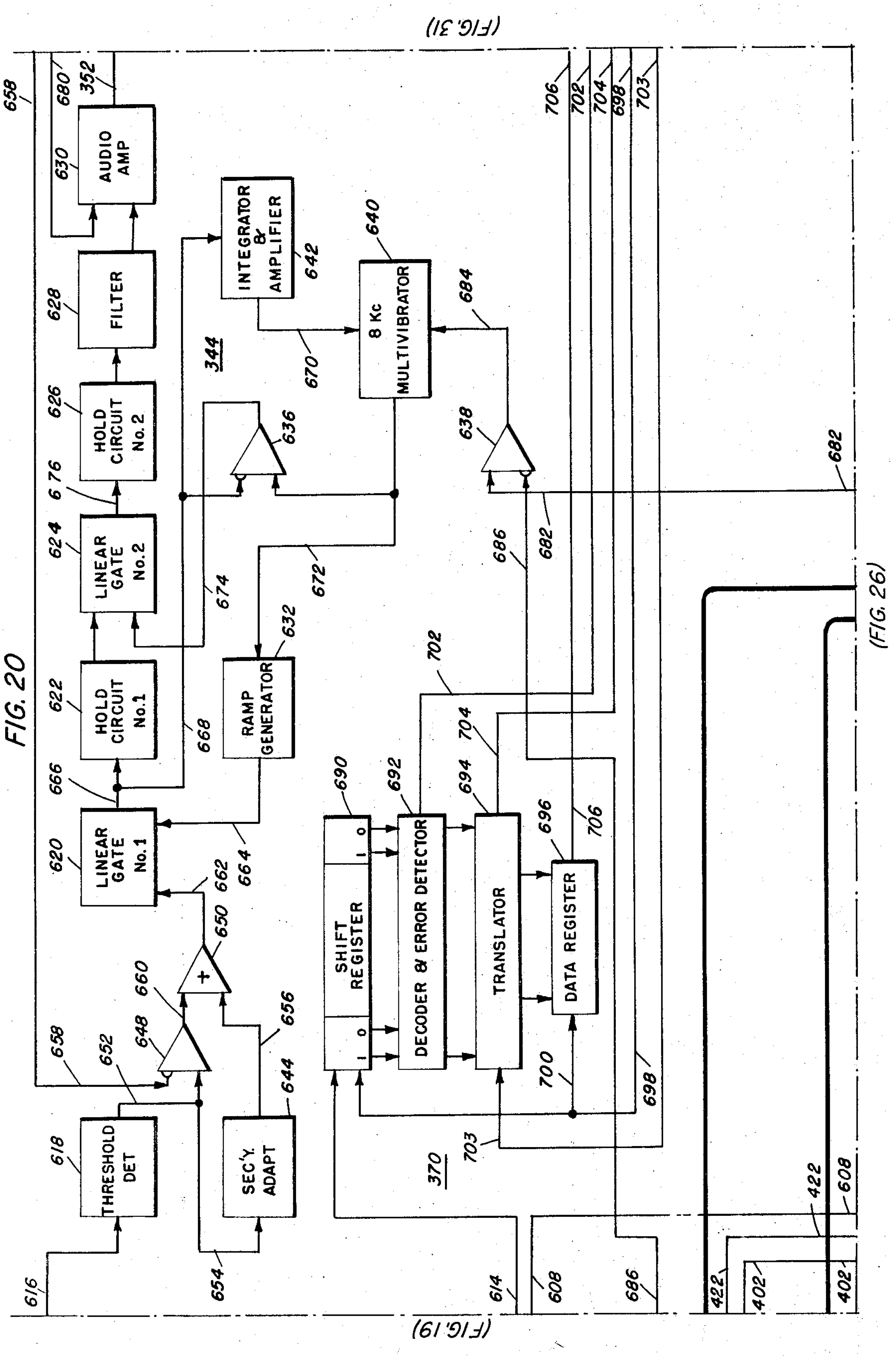

As previously indicated, the output of the supervisory gate 586 (FIG. 19) is provided over lead 614 to an appropriate decoder such as Bose-Chaudhuri decoder 370 shown in the FIG. 20. Decoder 370 comprises a shift register 690 connected to a decoder and error detector 692 which is in turn connected to a translator 694. The output of translator 694 is provided to data register 696 which temporarily stores the decoded supervisory word pending its transfer to common register 1460 associated with processor 366 (See FIG. 27). Registers 690 and 696 are operated in synchronism by means of shift pulses provided over leads 698 and 700 from a system timer in sequencer 350 (FIG. 30). As explained below, time 350 provides shift pulses of approximately 6 microseconds either at 600 pulses per second for FT matrix information, or at 2400 pulses per second for high-speed supervisory data transmitted in the message channels.

Figure 27:
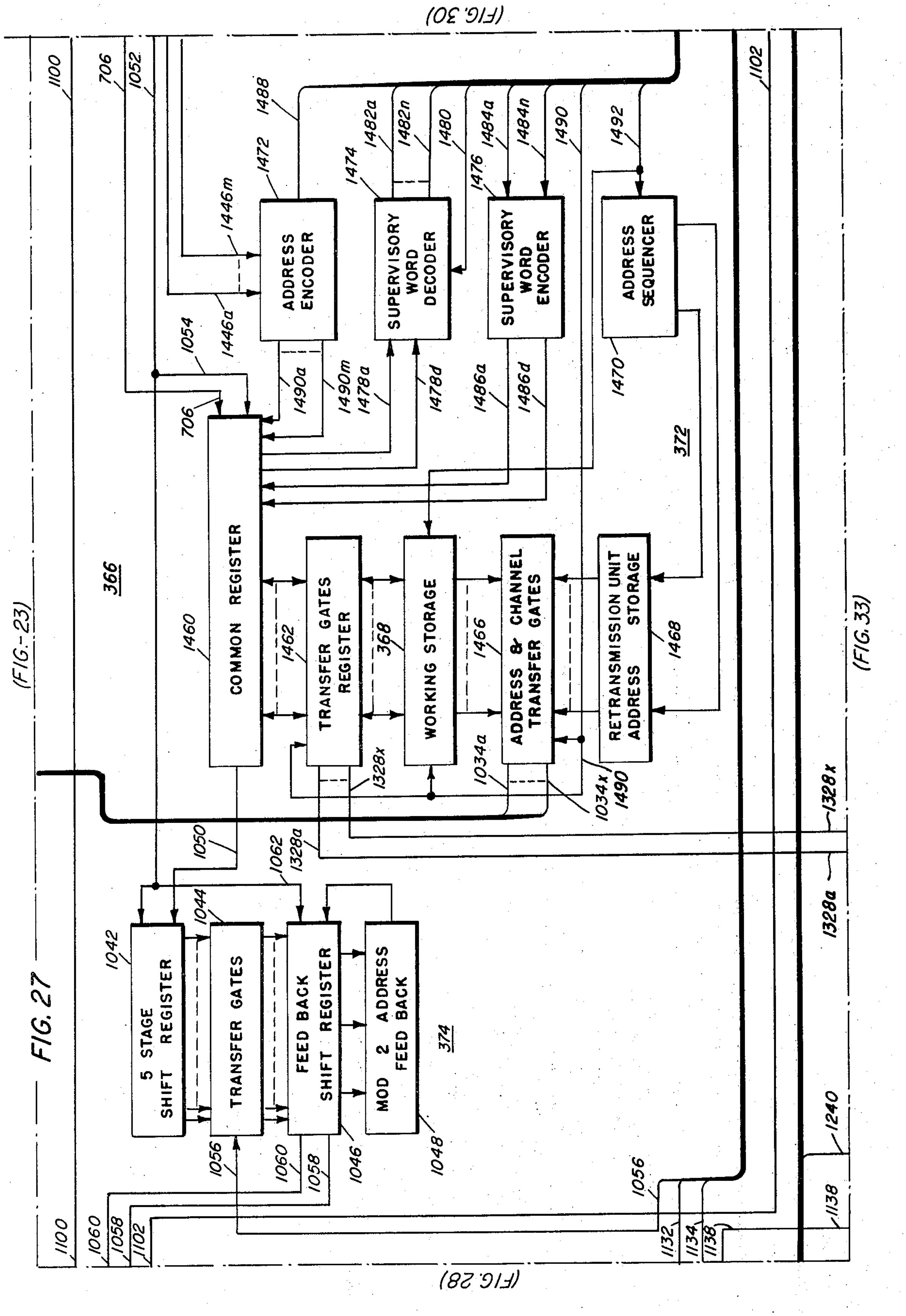

The actual operation of Bose-Chaudhuri decoder 370 is conventional; however, it should be noted that in response to the detection of an error by decoder and error detector 692, a signal is provided over lead 702 to timer-sequencer 350, whereby processing of the incorrect data is suspended, and a request for retransmission initiated. In addition, translator 694 operates on the work synchronization signals on lead 704 for establishing local synchronization for the particular call being processed. The remainder of the message format is operated on by translator 694 and provided to data register 696 from which it is provided over lead 706 to common register 1460 in processor 366 (FIG. 27).

Figure 21:
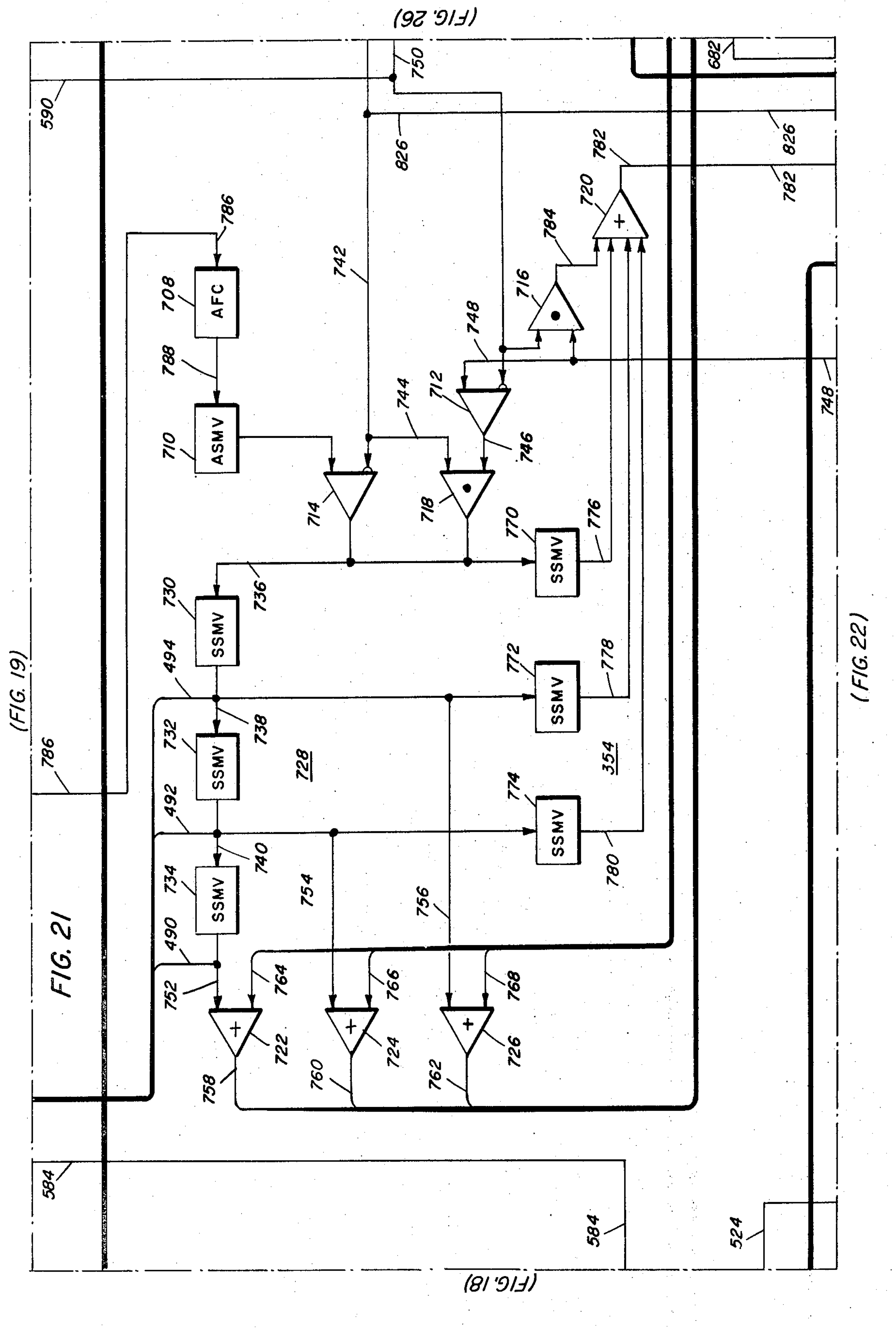

In FIGS. 21 and 22 are shown in detail the triad sequencers and synchronizers 354 and 356 which operate in connection with receivers 332 and 334 to establish the proper time sequences and delays for the FT matrices for the normal address of the calling and called basic communication units as well as for the network alert address. The particular circuits shown are especially useful when the relative delay between frequency components is the same for all addresses, i.e., the three frequencies will always occur in consistently spaced time slots. For example, referring to FIG. 5A, addresses would be constituted such that the three frequencies occur in dealy periods $D_1$, $D_2$, $D_3$ or $D_5$, $D_6$, $D_7$, etc. If unequal spacings such as $D_1$, $D_4$, $D_5$, are to be used, then other appropriate spacings would include $D_2$, $D_5$, $D_6$; $D_4$, $D_7$, $D_8$, etc. If such spacing is not used, sequencing circuits such as shown generally in FIG. 8 would be required.

FIG. 21 shown with the triad sequencer 354 used with the message and supervisory signal receiver. The circuit includes an automatic frequency control unit 708, a free running multivibrator 710, a pair of inhibit gates 712 and 714, a pair of coincidence gates 716 and 718, and OR gates 720, 722, 724, and 726. The actual delay sequence is generated by means of a timing chain 728 comprising a series connection of single shot multivibrators 730, 732, and 734, triggered by variable frequency free-running multi-vibrator 710 through normally conducting inhibit gate 714. The triggering signals are provided at the output of gate 714 over lead 736 to the first multivibrator 730, an output signal from which is provided over lead 738 to trigger the second multi-vibrator 732. Similarly, the output of multivibrator 732 is provided over lead 740 as the trigger signal for the third multi-vibrator 734. The delay periods of single shot multi-vibrators 730, 732, 734 are adjusted such that the pulses appearing on output leads 490, 492, and 494 are properly timed, to represent the delay periods of the FT matrix associated with the addresses of the various basic communication units. Leads 490, 492, and 494 are connected to coincidence gates 476, 478 and 480 in address detector 474 (see FIG. 19) and serve to gate the signals appearing on lead 472 from video detector 390 in receiver 332 and video filter 470.

As hereafter explained, inhibit gate 714 serves to pass the gating signals from astable multi-vibrator 710 to the timing chain 728 only when receiver 332 is required to accept supervisory information on a cochannel address, i.e., when information is not being transmitted or received on a message channel. An inhibit signal is provided over lead 742 from program sequencer 350 when the basic communication unit is to operate in the transmit mode. The presence of a signal on lead 742 will turn off inhibit gate 714, thereby blocking the signal appearing at the output of free running multi-vibrator 710.

At the same time, the signal appearing on lead 742 is provided over lead 744 as one input to coincidence gate 718. The second input to coincidence gate 718 passes through lead 746 from the output of inhibit gate 712. A first input to inhibit gate 712 is provided by modulated signals on lead 748 from message and supervisory encoder 362 (FIG. 22).

For operation of the basic communication unit in the transmit mode, the signals on lead 748 may be time shift keyed pulses or presence-absence signals, for supervisory transmission over A and B band message channels, or pulse position modulated signals (either continuous or quantized) corresponding to message information transmission over the A or B band message channels.

The second input to inhibit gate 712 is provided over lead 750 from program sequencer 350 for operation in the message channel mode. As may be understood, a signal appears on lead 750 during such times as transmission over one of the A or B band message channels or reception on one of the A or C band message channels is in progress. During these times, gate 712 is blocked, and the modulation signal appearing on lead 748 is not connected through gate 712 to gate 718. At other times, i.e., when transmission is to take place over supervisory channels in the A or B bands modulation signals are provided over lead 746 and are gated through coincidence circuit 718 to lead 736 by the transmit mode signals appearing on leads 742 and 744.

The signals from astable multi-vibrator 710, having been blocked by the transmit mode signal on lead 742, it may be seen that the modulated signals on lead 748 will trigger the FT matrix sequence in timing chain 728, rather than multi-vibrator 710.

In either event, the outputs of timing chain 728 are provided over leads 752, 754, and 756 to OR gates 722, 724 and 726, respectively, for transmission over leads 758, 760, and 762 to frequency synthesizer 336. As explained in detail subsequently, these signals properly sequence the outputs of the frequency synthesizer during such times as FT matrices are to be generated, either for the recognition of an incoming signal on the basic communication unit's normal address or for the transmission of an acknowledge signal on the unit's own normal address upon receipt of an incoming callup word. Additional inputs to OR gates 722, 724, and 726 are provided over leads 764, 766, and 768 from matrix driver 363 (FIG. 23) to continuously enable frequency synthesizer 336 when the system is operating in the message channel mode.

Triad sequencer 354 further includes an additional series of monostable multi-vibrators 770, 772, and 774 which serve to expand the time shift keyed pulses generated by encoder 362 into a series of three pulses in fixed phase relationship to the three pulses which comprise the address to be transmitted. Monostable multivibrators 730 and 770 are triggered by the signal appearing on lead 736. Monostable multi-vibrator 772 is triggered by the output of monostable multi-vibrator 730 and monostable multi-vibrator 774 is triggered by the output of monostable multi-vibrator 732. Thus, it may be seen that for each modulated pulse appearing on lead 748, a sequence of three signals is provided on leads 776, 778, and 780 to OR gate 720, the output of which is provided over lead 782 to transmitter 360. (When timing chain 728 is triggered by free running multi-vibrator 710, signals are also provided to OR gate 720; however, these signals are of no significance since the basic communication unit is operating in the receive mode and the transmitter is not activated.)

When the basic communication unit is set up for operation in one of the message channels, the timing signals provided by triad sequencer 354 are not necessary, and it may be by-passed. Thus, the message channel enable signal from sequencer 350 appearing on lead 750 is used to block the passage of modulation signals appearing on lead 748 through gate 712. However, both leads 748 and 750 are connected as the inputs to coincidence gate 716, whereby the signal appearing on lead 748 is gated through lead 784 as an additional input to OR gate 720. Thus, instead of providing three delayed pulses for each modulated pulse on lead 748, there is directly provided over lead 782 the modulation signals appearing on lead 748 for transmission over a previously assigned message channel in either of bands A or B. As noted, hold signals provided on leads 764, 766, and 768 are provided to the frequency synthesizer to gate the appropriate channel set frequencies through leads 758, 760, and 762 at this time.

As noted, the function of triad squencer 354 is to provide a series of properly spaced pulses for operation of frequency synthesizer 336 and address detector 474. In the particular embodiment shown, receiver 332 includes a single tunable channel. Thus reception of the three different frequencies which comprise the normal address requires a succession of different mixer frequencies, to translate each of the address frequencies into the IF pass band of the receiver in the proper sequence.

In this regard, it may be understood that in order to permit totally asynchronous operation of the system as a whole, with local synchronization established only for a particular call, it is necessary that the receiver 332 be rapidly synchronized with incoming calls. While it would be possible to employ three separate tuned IF channels whereby sequencing of the three frequencies in the address would not be necessary, the single IF channel approach is somewhat more desirable in view of the fact that sequencing for the purpose of address transmission and recognition would be required in any event, and also in view of the fact that the sequencer for receiver 332 must be adapted to respond to both A and C band address frequencies.

In order to assure the rapid and accurate synchronization of the receiver during the first preamble period of the supervisory format shown in FIG. 14a, triad sequencer 354 is adapted to cycle through the FT matrix time slots at a faster rate than that at which the information is to be received. The rate of operation of timing chain 728 is controlled by free running multivibrator 710 and an automatic frequency control (AFC) circuit 708, driven by the output of coincidence gate 484 in address detector 474 over lead 786. AFC circuit 708 may be of any suitable construction providing two voltage levels over lead 788 for setting the frequency of free running multi-vibrator 710. In the absence of a signal over lead 786, which corresponds to the absence of an output from gate 484, the signal level on lead 788 causes free running multi-vibrator 710 to operate at a rate such that FT matrices are generated faster than the sequence of ONES and ZEROS which comprise the preambles in the supervisory formats of FIGS. 14*a* through 14*c*. This frequency is chosen such that over the course of the preamble, there will eventually be coincidence of signals appearing on leaeds 490, 492, and 496 with the signals appearing on lead 472. At this time, there will be provided an output from gate 484 over lead 786 to switch the AFC level provided on lead 788 to that corresponding to the expected incoming pulse rate. AFC circuit 708 includes appropriate time constant circuits such that the continuing sequence of coincidence signals on lead 788 due to the receipt of ecah of the incoming FT matrices will sustain multi-vibrator 710 in synchronism.

Shown in FIG. 22 is the triad sequencer 356 associated with supervisory receiver 334. Triad sequencer 356 differs from triad sequencer 354 shown in FIG. 21 since supervisory receiver 334 is required to respond both to the normal address of the basic communication unit and to the network alert address. Triad sequencer 356 includes an automatic frequency control circuit 790 and free running multi-vibrator 792 similar to comparable circuits 708 and 710 shown in FIG. 21. AFC circuit 790 responds to signals over leads 524 from the output of coincidence gate 516 in address detector 504 to provide scanning of the output of receiver 334 as described in connection with message and supervisory triad sequencer 354. However, triad sequencer 356 includes two timing chains 794 and 796 rather than a single timing chain as in sequencer 354. Timing chain 794, comprising single shot multi-vibrators 798, 800, and 802, provides output signals on leads 804, 806, and 808, respectively, in response to an input pulse provided over lead 810.

As in the case of triad sequencer 354, sequencer 356 also includes three monostble multi-vibrators 812, 814, and 816, triggered by the signals on leads 810, 804 and 806, respectively, to provide sequencing signals through an OR gate 818 in response to time-shift keyed supervisory information provided on leads 748 and 820. The output of OR gate 818 is connected to the same lead 782 as is the output of OR gate 720 in triad sequencer 354. The input signals to timing chain 794 and to monostable multivibrator 812 are selectively switched through inhibit gate 822 and coincidence gate 824 in response to the transmit-mode gate signal provided over leads 742 and 826 from program sequencer 350 (FIG. 30).

Timing chain 796, comprising single shot multivibrators 828, 830, and 832, supplies the sequencing signals for the network-alert address. The trigger signal for timing chains 794 and 796 is provided by the output of astable multivibrator 792 by means of a switching circuit comprised of an astable multivibrator 834 inhibit gate 836, flip-flop 838, coincidence gates 840 and 842 and sync-recognition circuit 844. Astable multivibrator 834 is arranged to provide an asymmetrical output signal on lead 846 one level of which triggers the normal address and the other level of which triggers the network-alert address. The network-alert address may be arranged to be generated approximately five percent of the time, while the normal address generated ninety-five percent of the time, and astable multivibrator 834 arranged to supply properly timed output signals. Assuming an output from sync-recognition circuit 844 to be absent, the output signals from multivibrator 834 are provided through gate 836 to cycle flip-flop 838 between its two states. Outputs are supplied by flip-flop 838 on lead 848 to coincidence gate 842, and on lead 850 to coincidence gate 840. The second input to each of coincidence gates 840 and 842 is provided in common on lead 852 from the output of astable multivibrator 792. When a high-signal level is provided on one of leads 848 and 850, the timing signal on lead 852 is gated through one of circuits 840 and 842 to provide triggering signals on leads 854 and 856 for network-alert address timing chain 796 and normal-address timing chain 794 respectively. Thus, it may be seen that in response to the switching of astable multivibrator 834, each of timing chains 794 and 796 is cycled in sequence to provide the normal and network-alert triads for supervisory receiver 334.

Timing chain 796 is connected by leads 858, 860, and 862 to frequency synthesizer 336 and to OR gates 864, 866 and 868, respectively. Similarly, timing chain 794 is connected by leads 870, 872 and 874 to the frequency synthesizer and to OR gates 864, 866 and 868. The first pulse in each of the network-alert and normal address triads is supplied to OR gate 864, the second signal in each of the triads is supplied to OR gate 866, and the third signal in each of the triads is supplied to OR gate 868. The outputs of OR gates 864, 866, and 868 are connected over leads 518, 520 and 522 to triad coincidence detector 509 shown in FIG. 18 to gate appropriately timed signals on lead 502 from the output of video detector 436 in supervisory receiver 334. Thus, it may be seen that signals appearing on leads 518, 520 and 522 will alternately represent a normal address triad and a network-alert triad. As in the case of triad sequencer 354, the two outputs of triad sequencer 356 are normally generated at a rate greater than the rate of incoming ONES and ZEROS in the preamble of the signaling format shown in FIGS. 14A–14C.

Alternate attempts are made to synchronize the supervisory receiver with the two addresses. As soon as synchronization with one of the addresses is achieved, a signal is provided over lead 524 from coincidence gate 516 in response to which, AFC circuit 790 switches free-running multivibrator 792 to its slower or synchronized mode of operation. At the same time, a signal is passed over lead 870 to a sync-recognition circuit 844 which provides an inhibit signal over lead 827 to block the passage of switching signals from lead 846 to flip-flop 838. Thus, whichever timing chain was in operation at the time that synchronization was acquired remains in operation to permit the reception and processing of supervisory information on either the normal address or the network-alert address, as the case may be. Once signals are no longer present on lead 524 and astable multivibrator 792 has ben switched back to its higher frequency of operation, the sync-recognition signal on lead 872 is removed, which permits timing chains 794 and 796 to resume sequencing between the network-alert and normal addresses.

FIGS. 23–26 show the details of one suitable embodiment of frequency synthesizer 336 and synthesizer matrix driver 363 shown in FIG. 16. Since a relatively large number of frequencies must be synthesized simultaneously, a crystal matrix technique is used in which the necessary frequencies are selected by the program sequencer 350, and gated to transmitter 360 and receivers 332 and 334 under the command of triad sequencers 354 and 356. As previously noted, receivers 332 and 334 are of the double conversion superheterodyne type; therefore, frequency synthesizer 336 includes a coarse frequency submatrix, and a fine frequency submatrix, both driven by matrix driver 363.

Figure 23:
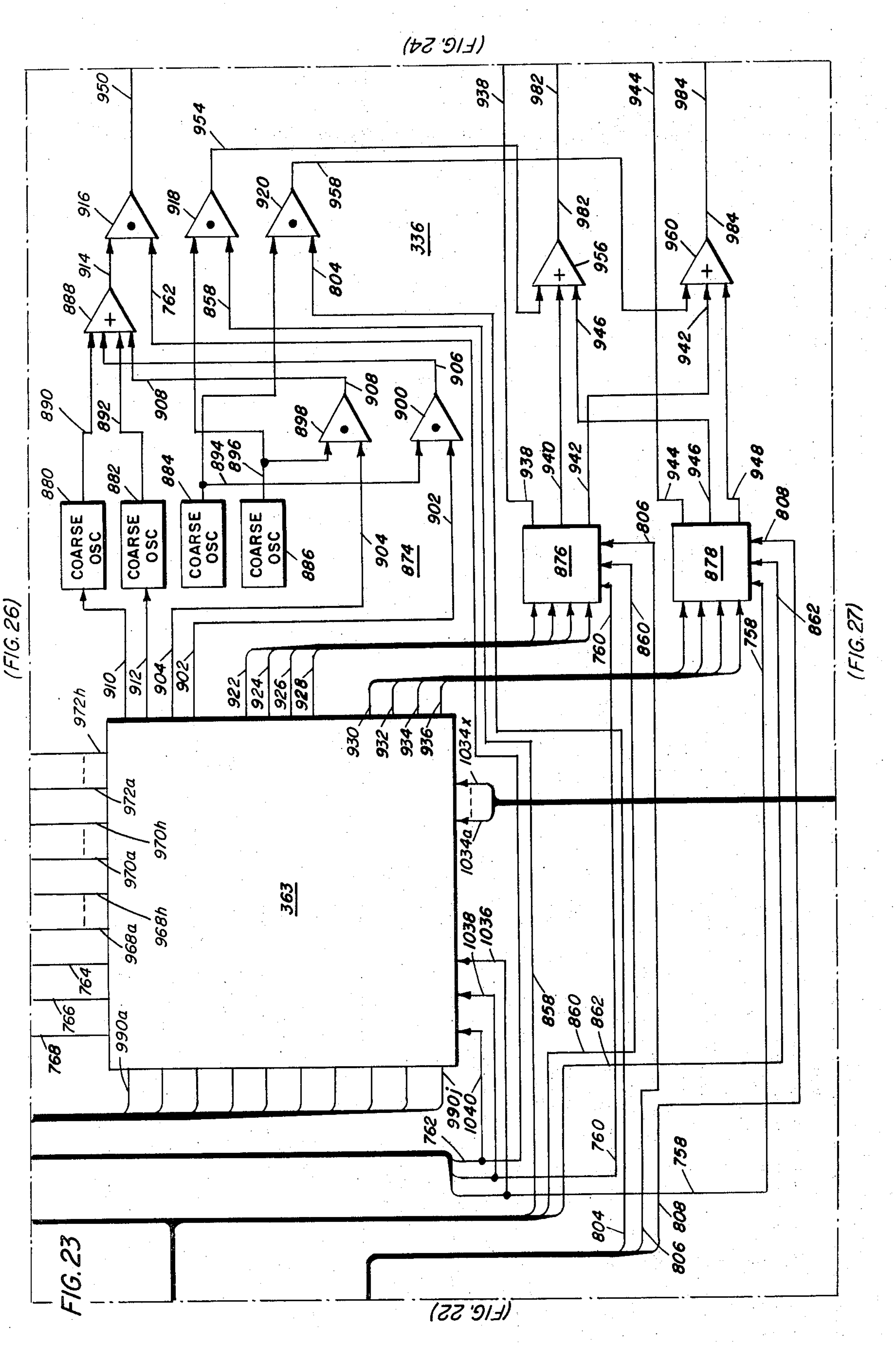
Figure 24:
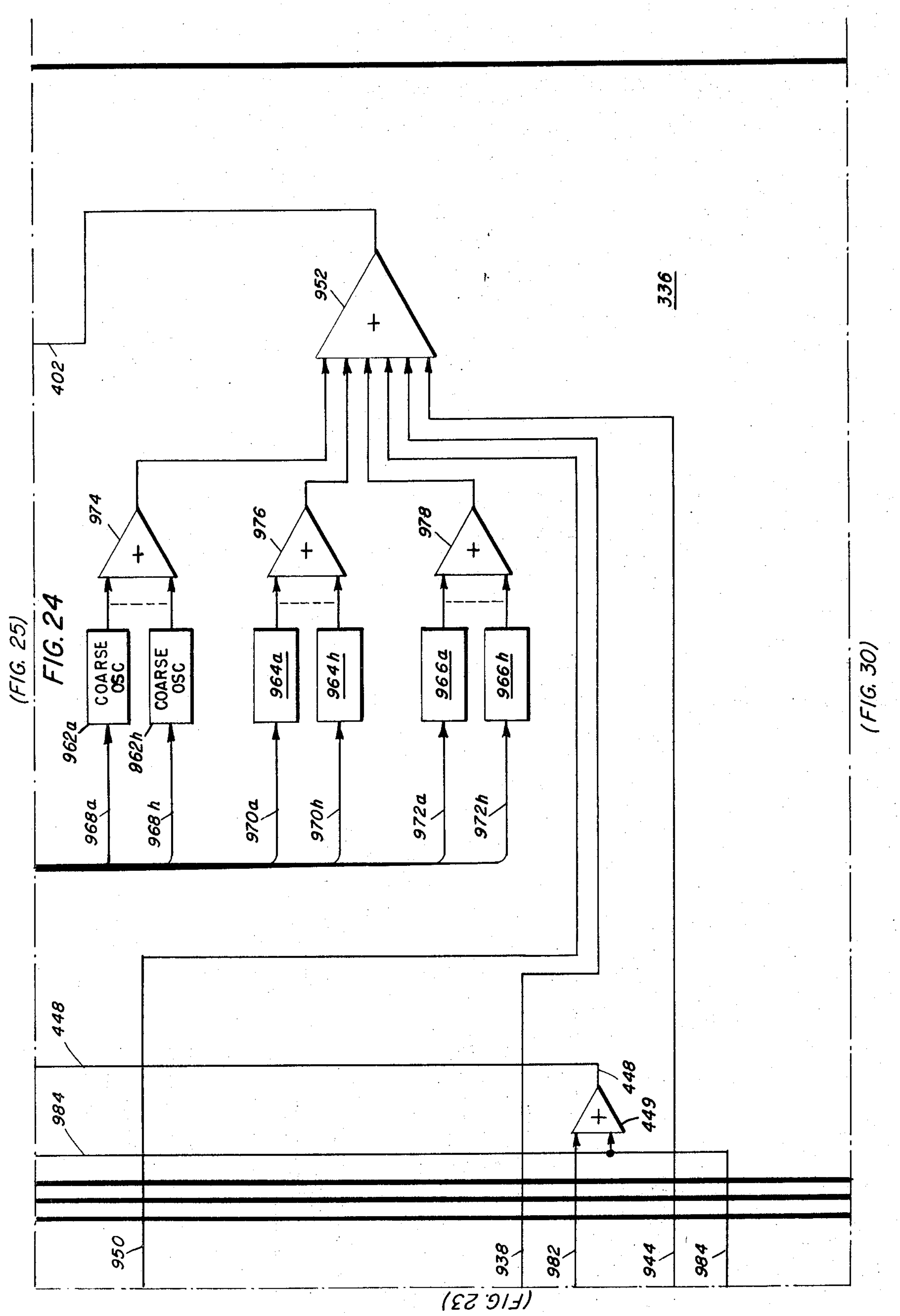

Specifically, the coarse frequency generation circuitry is shown in FIGS. 23 and 24. For the particular channel allotment shown in Table II the frequency synthesizer must provide for a total of 125 channels in the A band and 186 channels in the B band. As may be understood, an additional group of channels for the C band is not necessary, since the 186 C band message channels may be equally displaced in frequency from the corresponding 186 B band channels, while the 12 supervisory channels in the C band may be uniformly displaced from the corresponding 12 supervisory channels in the A band, whereby appropriate offset oscillators may be used to select between the bands.

Assuming however, a requirement for a total number of 350 discrete frequencies, frequency synthesizer 336 may conveniently provide a toal number of 360 frequencies by the use of a submatrix of 36 coarse oscillators, each representing a band of 10 channels, and a submatrix of 10 fine oscillators by which a one out of 10 selection within each of the coarse frequency bands is made. For convenience, the 36 coarse oscillators may be separated into three groups of four oscillators each, and three groups of 12 oscillators. One such group 874 of four coarse oscillators is shown in detail in FIG. 23, while the remaining two groups 876 and 878 of four oscillators each are represented by a single block of similar construction to that of group 874.

Group 874 comprises four oscillators 880, 882, 884, and 886. Oscillators 880 and 882 are gated oscillators, while oscillators 884 and 886 are continuously operating, for reasons explained below. The outputs of gated oscillators 880 and 882 are provided to an OR gate 888 over leads 890 and 892 respectively, while the outputs of free running oscillators 884 and 886 are provided over leads 894 and 896, respectively, as first inputs to coincidence gates 898 and 900. The second inputs to each of gates 898 and 900 are provided over leads 902 and 904 from matrix driver 363. The outputs of coincidence gates 898 and 900 are provided over leads 906 and 908 as third and fourth inputs to OR gate 888. Gating signals for oscillators 880 and 882 are provided over leads 910 and 912 from matrix driver 363. Thus in the presence of a control signal over one of leads 902, 904, 910 or 912, a signal from the appropriate oscillator will pass through gate 888 and lead 914 as a first input to a coincidence circuit 916.

Oscillator group 874 further includes second and third coincidence circuits 918 and 920 having a first inputs thereto the outputs of free running oscillators 884 and 886. The gating signals for circuits 916, 918, and 920 are provided by the triad sequencers 354 and 356, and serve to gate appropriate ones of the coarse frequency signals to receivers 332 and 334, and transmitter 360. In particular, the gating signal for coincidence circuit 916 is provided over lead 762, representative of the first output of timing chain 728 (FIG. 21). The gating signal for coincidence circuits 918 and 920 are provided on leads 858 and 804 and represent the first output of network alert address timing chain 796 and normal address timing chain 794, respectively (FIG. 22) while the gating inputs to gates 916, 918, and 920 provide coarse selection of the 10 frequency sub-bands including the first frequency in a rolled basic communication unit's address, in the network alert address or in the unit's own normal address, respectively.

Frequency selection signals for oscillator group 876 are provided by matrix driver 363 over leads 922, 924, 926, and 928, and for oscillator group 876 over leads 930, 932, 934, and 936. Timing signals may be provided to oscillator group 876 over leads 760, 806, and 860 and to oscillator group 876 on leads 758, 862 and 808 from timing chains 728, 796 and 974 respectively.

Oscillator group 876 provides an output on lead 938 corresponding to the second frequency of the address of a called basic communication unit, an output on lead 940, for the second frequency of the network alert address, and on lead 942 as the second frequency of the basic communication unit's own address. Oscillator group 878 provides a first output on lead 944 corresponding to the third frequency in the address of the called basic communication unit, a second output on lead 946 representing the third frequency in the network alert address, and a third output on lead 948 representative of the third frequency in the basic communication unit's own normal address.

The output of gate 916 on lead 950 and on the signals on leads 938 and 944 are provided as three inputs to a six input OR gate 952 shown in FIG. 24. The output of gate 918 on lead 954 and the signals on leads 940 and 946 are provided to an OR gate 956 while the output of gate 920 on lead 958 and the signals on leads 942 and 948 are provided to a third OR gate 960. Thus, it may be understood that gate 952 serves to assemble the coarse frequencies for tuning receiver 332 or transmitter 360 to the co-channel address of a called basic communication unit while gates 956 and 960 assemble the coarse tuning signals for the network alert address and the unit's normal address, to be used by supervisory receiver 334 or transmitter 360.

Receiver 334 must continuously guard the normal and network alert addresses. For this reason, and because these addresses will seldom change, oscillators used to construct these addresses are free running, rather than gated. Oscillators 884 and 886, in group 874 are of this class, as are two oscillators in each of groups 876 and 878. Oscillators 884 and 886 are directly connected to gates 918 and 920 which serve only to establish the proper time of occurence of the address frequencies. In addition, gates 898 and 900, controlled by matrix divider 363, selectively provide the outputs of coarse oscillators 884 and 886 to OR gate 888, whereby the frequencies generated by the latter two oscillators may also be selectively provided through lead 914, gate 916, lead 950 and gate 952 for the tuning of message and supervisory receiver 332 and transmitter 360. Thus, any of the 12 frequencies generated by oscillator groups 874, 876 and 878, may be used to tune message and supervisory receiver 332 in its supervisory mode, while only half of the 12 frequencies, i.e., those corresponding to free-running oscillators 884, 886, etc. are used for the network alert address and the normal address of the particular basic communication unit. Selection of those oscillators to be free running will be determined by the address chosen for the network alert, and the particular address of the basic communication unit. These addresses may be suitably inserted in the basic communication unit by means of externally accessible switches at the time the basic communication unit is placed in operation.

The remaining 24 coarse oscillators, shown in FIG. 24, include oscillators *962a–962h*, *964a–964h*, and *966a–966h*, selectively controlled by matrix driver 962 over leads *968a–968h*, *970a–970h*, and *972a–972h*. These oscillators are grouped as shown primarily for convenience of operation of matrix driver 363, though it will be understood, that no grouping of these oscillators is necessary. The outputs of the oscillators are provided through a suitable number of OR gates 974, 976, and 978 or in any other convenient fashion, as the remaining input to OR gate 952.

The output of OR gate 952 is provided over lead 402 as the coarse input to band select mixer 392 in receiver 332 (see FIG. 17) and simultaneously over lead 980 to transmitter 360 as described below.

The outputs of gates 956 and 960 are connected by leads 982 and 984 to an OR gate 449, which provides an output on lead 448 which feeds band select mixer 438 in receiver 334 (see FIG. 18), to alternately tune the receiver to the normal and network alert address. The normal address signal on lead 984 is also provided to transmitter 360 as explained below to tune it during response to a call-up on its address.

Figures 25, 26:
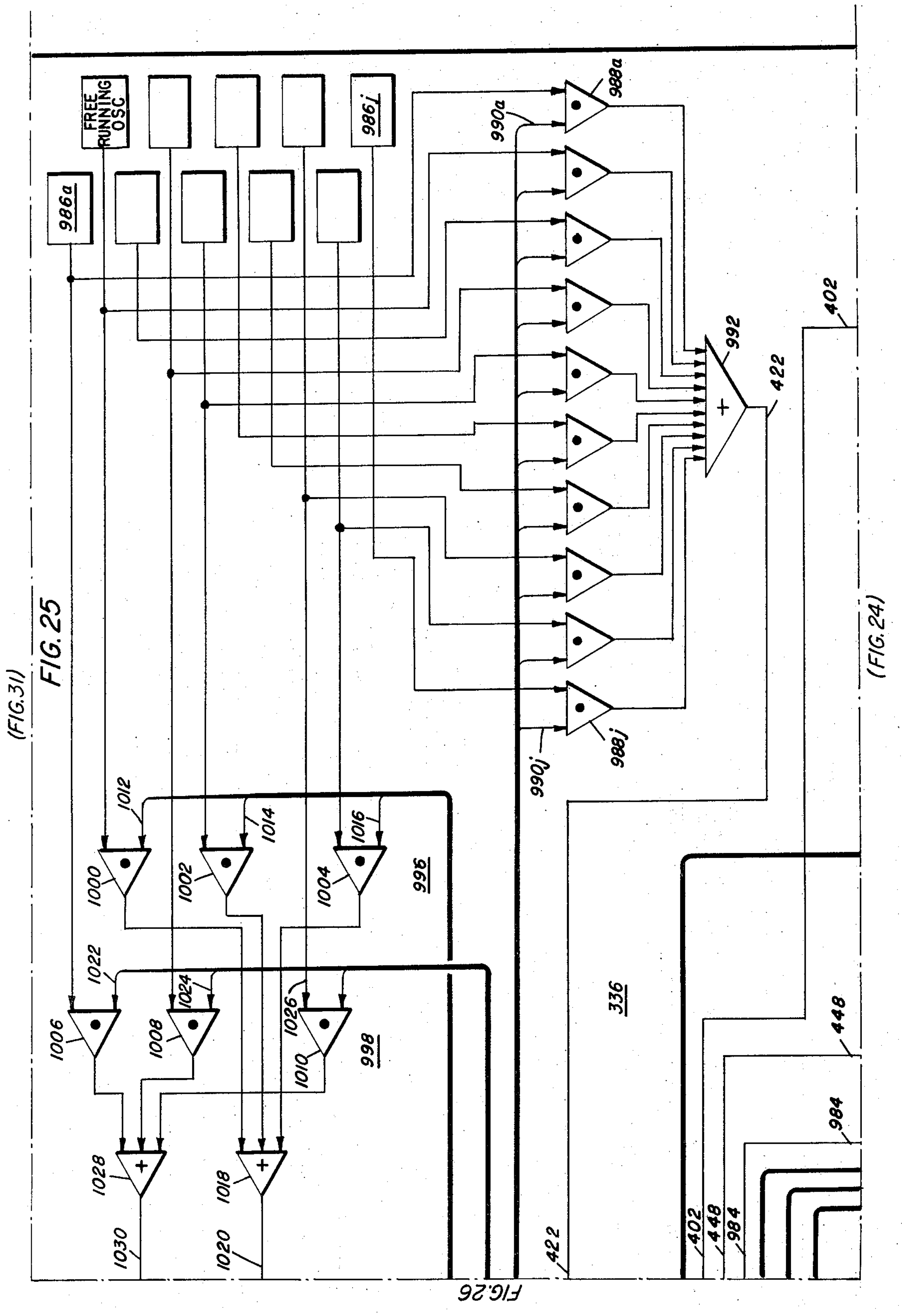
Figure 26:
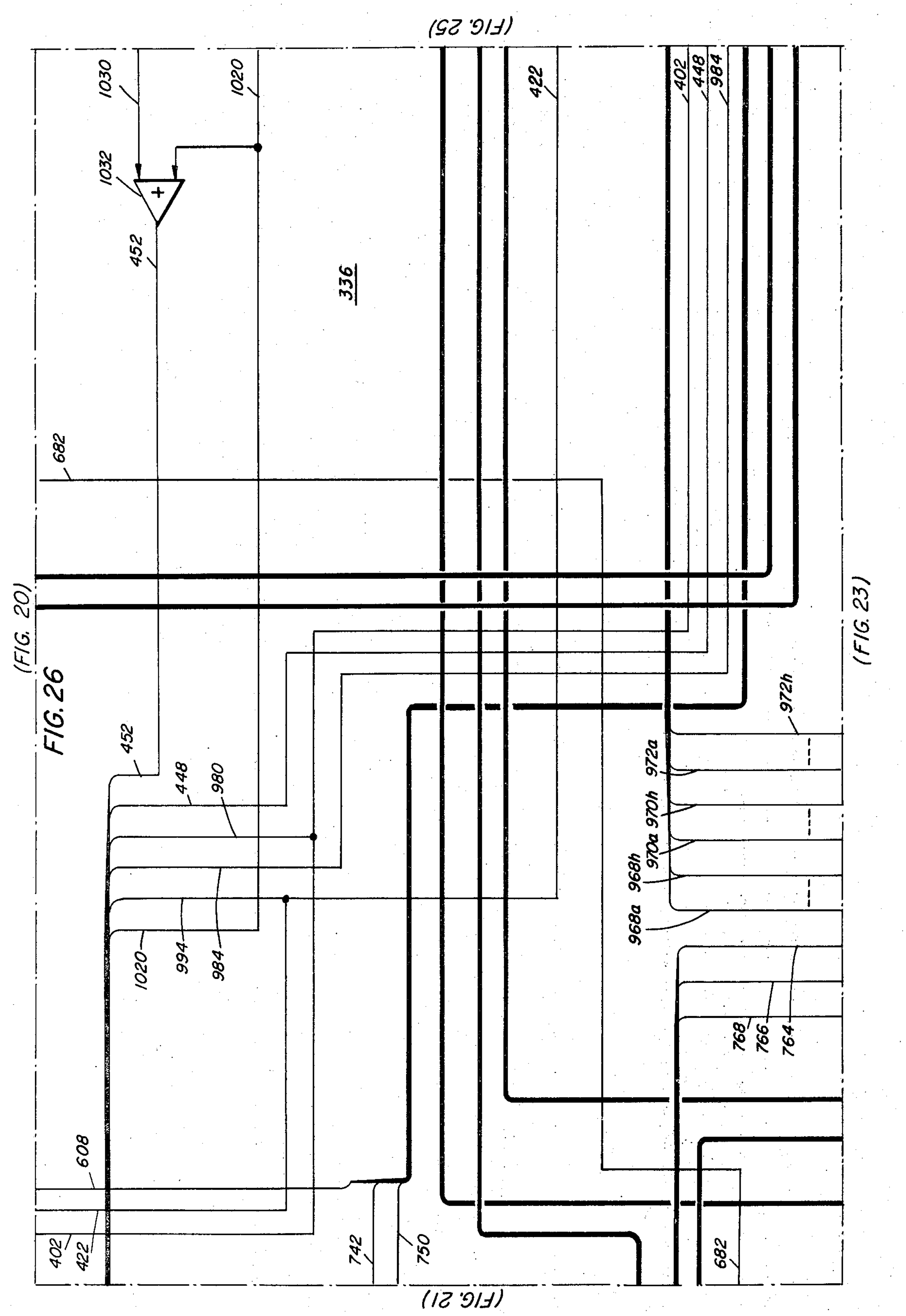

The fine frequency sub-matrix shown in FIG. 25 is comprised of 10 free running oscillators *986a–986j* and a plurality of RF gating circuits. Ten such gating circuits *988a–988j* are operated under control of matrix driver 363 ovr leads *990a–990j*, respectively.

The outputs of gates *988a–988j* are fed in common to OR gate 992, the output of which is provided over lead 422 to fine mixer 384 in receiver 332 (FIG. 17) and over lead 994 (FIG. 26) to transmitter 360, to effect the fine channel selection both for message channel operation and for reception for a call-up acknowledgement. The channel selection signals for the basic communication unit normal address, and the network alert address are also provided by free running oscillators *986a–986j* and are selected by means of a pair of triads 996 and 998 of RF coincidence gates comprised of gating circuits 1000, 1002, and 1004; and 1006, 1008 and 1010, respectively. Triad 996, which corresponds to the normal address, is driven by the output of timing chain 794 over leads 1012, 1014, and 1016 so that the appropriate channel select frequencies are switched through F gates 1000, 1002, 1004 to RF OR gate 1018, the output of which appears on lead 1020. In similar fashion, triad 998 is driven by the output of network alert address timing chain 796 in supervisory triad sequencer 356 over leads 1022, 1024 and 1026, and provides a succession of three channel selection frequencies to RF OR gate 1028 which provides an output over lead 1030.

The signals appearing on leads 1020 and 1030 are provided to an additional Rf OR gate 1032, which provides over lead 452 the alternating sequence of normal and network alert address channel selection signals for tuning fine mixer 430 in supervisory receiver 334 (FIG. 18). In addition, the normal address signals on lead 1020 are provided directly to transmitter 360 to permit response to a call-up supervisory message on the unit's own co-channel address.

As stated, the selection of the coarse and fine frequency selection signals to be generated and/or gated to receivers 332 and 334, and transmitter 360 is controlled by frequency matrix driver 363. In its simplest form, driver 363 may be comprised of a plurality of logic elements in an appropriate configuration such that signals from timing chains 728, 794, and 796 in triad sequencers 354 and 356, (FIGS. 21 and 22) and from processor 366 on leads *1034a–1034x* to pass properly timed signals to the sub-matrices of frequency synthesizer 336 to provide the desired frequencies. The exact nature of the circuitry comprising driver 363 is of course subject to substantial variation within the scope of this invention, as may be understood in light of the disclosure. In order to simplify its construction, matrix driver 363 may include various binary to decimal conversion circuits or the like whereby transformation from one mode of signal representation to another may be conveniently effected.

By means of the processing circuitry 336 shown in detail in FIG. 27 signals representative of the various frequencies to be generated are provided to matrix 363 over a plurality of leads *1034a–1034x*. The number of leads will depend of course upon the particular information format used; for example, in one particular embodiment of the invention, the output of processor 366 may be in parallel form, and may consist of 6 four-bit address words or 3 four-bit message channel words. As explained below, under control of program sequencer 350, signals will be provided over leads *1034a–1034x* from processor 366 whenever frequencies representative of message channels or FT matrix addresses are to be generated.

As described in connection with FIGS. 23 through 26, the timing of the output of frequency synthesizer 366 may be controlled by independent coincidence circuits such as 916, 918, and 920 driven by the timing chains in triad sequencers 354 and 356. However, in the particular embodiment shown, it is convenient that the timing of the fine frequency selection signals provided over leads 442 and 994 to receiver 332 and transmitter 360, respectively, be controlled by coincidence circuits incorporated within matrix driver 363. To this end, triad or message channels hold signals appearing on leads 758, 760 and 762 are connected by means of leads 1036, 1038, and 1040 respectively as inputs to matrix driver 363.

Thus, it may be seen that matrix driver 363 provides for translation of the selection signals generated by processor 366 into properly timed FT matrices for supervisory signalling or continuous frequencies for message channels by means of the coarse and fine selection outputs of the frequency synthesizer 336.

Figure 28:
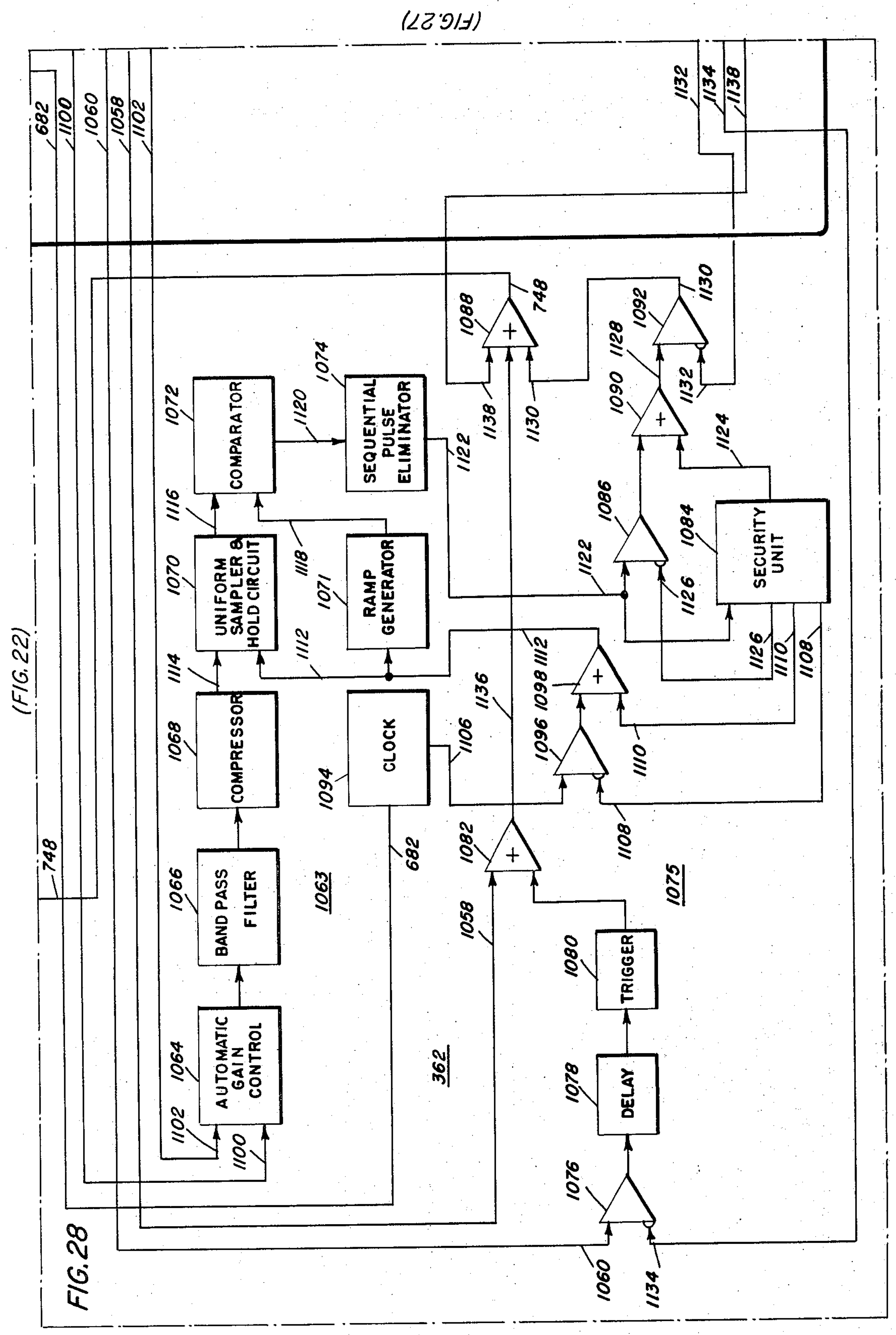
Figure 29:
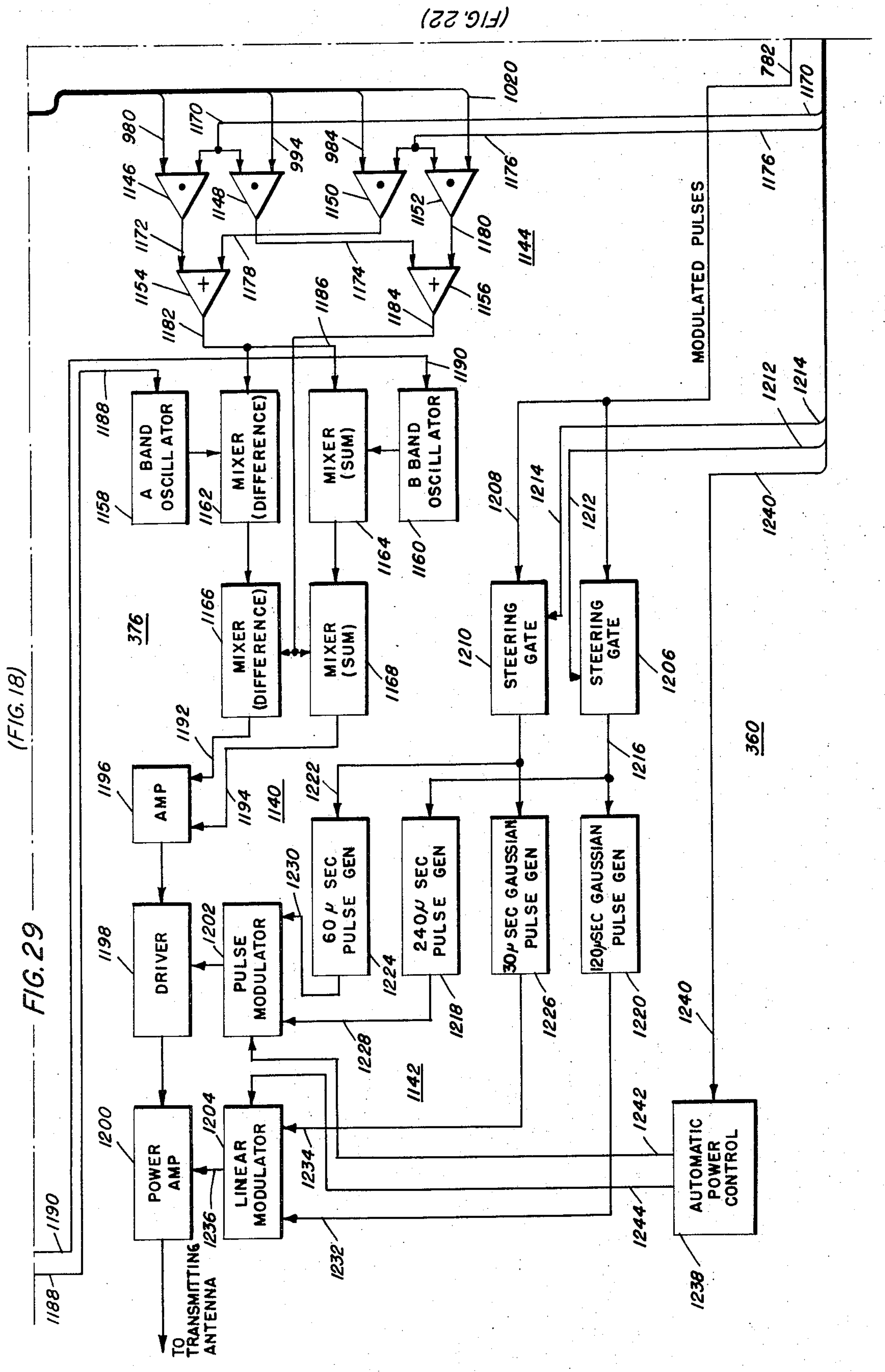

In the FIGS. 27 through 29 are shown the details of transmitter 360, audio modulator and encoder 362, and BoseChaudhuri encoder 374.

Shown in detail in FIG. 27, is the Bose-Chaudhuri encoder 374 which serves to translate supervisory messages into the error correcting code for transmitting. It comprises a shift register 1042, a transfer gate unit 1044, a feed-back shift register 1046, and an associated modulo two address feedback circuit 1048. The input signals to encoder 374 are provided to shift register 1042 over lead 1050 from a so-called common register in 1460 information processor 366, in serial form, and are entered therein responsive to shift pulses from program sequencer 350 over lead 1052. The shift pulses are also provided on lead 1054 to common register 1460 in processor unit 366, described in detail below, to synchronously step the four-bit code words from the common register to five-stage shift register 1042. After each four digit binary word has been entered into shift register 1042, a timing signal on lead 1056 from program sequencer 350 activates a series of gates 1044 to transfer the four-bit code word in shift register 1042 into a second shift register 1046, which serves to transform the four-bit code word into the corresponding 15-bit Bose-Chaudhuri code word. The latter result is accomplished by appropriately adding digits to the four-bit code as the information in shift register 1046 is shifted out along leads 1058 and 1060 under control of the shift signals appearing on leads 1052 and 1062. Thus, as may be understood, information is serially transferred from the common register 1460 in processor 366, converted to parallel form, then reconverted into serial form with appropriate error checking and correcting digits added. The signals appearing on leads 1052 and 1062 may either be at 600 pulses per second, the frame rate of the FT matrices used for supervisory signaling, or at 2400 pulses per second for presence-absence modulation of supervisory information on the message channels.

The output signals appearing on leads 1058 and 1060 synchronized with the shift pulses on leads 1052 and 1062, drive the audio modulator and encoder 362 shown in detail in FIG. 28. Encoder 362 comprises an audio modulator section 1063 including an automatic gain control circuit 1064, a band pass filter 1066, an audio compressor 1068, a uniform sampler and hold circuit 1070, a comparator circuit 1072, and a sequential pulse eliminator 1074. Encoder 362 further comprises a supervisory modulator 1075 including an inhibit gate 1076, a delay circuit 1078, trigger circuit 1080, and an OR gate 1082. Encoder 362 may also include security unit 1084 and gating circuitry comprised of inhibit gates 1086 and 1092, and OR gates 1088 and 1090. Timing signals are generated by a clock circuit 1094 feeding an inhibit gate 1096 and an OR gate 1098. In addition, clock 1096 is connected to audio demodulator 344 (see FIG. 20) by lead 682 to provide standby synchronization for multivibrator 640 therein, as previously described.

A first input to audio modulator section 1063 is provided on lead 1100 from a supervisory tone generator 1524 associated with program sequencer 350 whenever the ringing tone is being generated in the basic communication unit. The ringing tone modulates the chosen message channel, and is transmitted to the calling basic communication unit to provide the ring-back tone. The audio or audio frequency data generated by the user of the basic communication unit is provided as a second input over lead 1102.

The input signals pass through a conventional automatic gain control circuit to an audio pre-emphasis circuit comprised of band-pass filter 1066 and audio compressor 1068. Band-pass filter 1066 is a sharply selective audio filter and serves to control bandwidth of the audio signal to be transmitted by blocking signals of frequency greater than approximately 3.5 kilocycles per second.

Compressor 1068 provides a pre-emphasis of 5 db starting at about 500 cycles per second to compensate for the normally small degree of position modulation characteristic of the average signal strength of the high frequency components of speech. The increased amplitude is compensated for by a complementary deemphasis circuit in the audio decoder, as previously noted.

The output of clock generator 1094 is connected over lead 1106 as the first input to inhibit gate 1096, the second input to which is provided over lead 1108 from security unit 1084. A signal is present on lead 1108 when the security unit is in use to prevent the passage of the timing signals on lead 1106 to OR gate 1098 at this time. The second input to OR gate 1098 is provided over lead 1110 from security unit 1084 and represents an internal clock signal for operating modulator 1063 in synchronism with the various components of the security unit.

The output of OR gate 1098 is provided over lead 1112 to uniform sampler and hold circuit 1070, and to ramp generator 1071. The pre-emphasized audio signal is fed as a second input to uniform sampler and hold circuit 1070 over lead 1114 from compressor 1068. Uniform sampler and hold circuit 1070 operates in response to the timing signals on lead 1112 to sample the audio signal at the Nyquist Rate, and to hold the sample at a constant value between timing pulses. The sample signal is provided on lead 1116 to comparator 1072. A second input to the comparator is provided by ramp generator 1071 over lead 1118. When the sampled audio signal on lead 1116 is exactly equal in amplitude to the ramp signal, comparator circuit 1072 provides an output on lead 1120 in the form of a 30 microsecond rectangular pulse.

The rectangular pulse is fed to a sequential pulse eliminator 1074, such as described in the aforementioned Varsos and Douglas patent. Unit 1074 processes the PPM signal and generates an output signal on lead 1122 in each time-frame during which the modulated audio pulse differs by a pre-set amount from the previously transmitted pulse.

The modulated pulse on lead 1122 is provided to inhibit gate 1086, and to security unit 1084. If the security unit is being used, the incoming signal is processed thereby and the encrypted signal provided over lead 1124 as a first input to OR gate 1090. A second input to gate 1086 is also present at that time to block the passage of the modulated signals on lead 1122 to OR gate 1090 when the security unit is in operation. The output of gate 1090 over lead 1128 represents the modulated audio information, and is connected through inhibit gate 1092 and lead 1130 as a first input to further OR gate 1088. A second input to inhibit gate 1092 is provided over lead 1132 from program sequencer 350 and serves to block the passage of modulated audio information when the system is operating in the supervisory mode.

The output of supervisory encoder 374 is provided over leads 1058, and 1060 as inputs to the time shift keying (supervisory) modulator 1075 comprising inhibit gate 1076, delay circuit 1078, trigger 1080, and an OR gate 1082. Shift register 1048 (see FIG. 27) is so constituted that the signals appearing on leads 1058 and 1060 represent the actual 15 bit Bose-Chaudhuri code word and the complement thereof, respectively. If digit ONE is to be transmitted without time shift, (and the digit ZERO, with time shift) the complement signal appearing on lead 1060 passes through inhibit gate 1076 to a delay circuit 1078 and trigger circuit 1080, while the actual code word is provided directly to OR gate 1082 over lead 1058. Inhibit gate 1076 serves as a selection gate to permit time shift modulation of the supervisory information only if it is to be transmitted on a FT matrix. When the supervisory information is to be transmitted on the message channel (by presence-absence modulation as previously mentioned) an inhibit signal is present on lead 1134 (from program sequencer 350) to block the complement signals on lead 1060 so that there will be an output from OR gate 1082 on lead 1136 only during the ONES of the actual code word. On the other hand, when the information is to be encoded on the FT matrices, the ONES of the complement message on lead 1060 (i.e., the ZEROS of the actual code word) pass through delay circuit 1078 and fire a trigger circuit 1080 after a sufficient delay to represent a time shift keyed ZERO.

The signal on lead 1136 (either the presence-absence or time shift keyed supervisory information) is the second input to OR gate 1088. The third input to OR gate 1088, over lead 1138 from the message channel search control unit shown in detail in FIG. 33, is present when a message channel is being interrogated to determine its availability. The output of gate 1088 is provided over lead 748 to triad sequencers 354 and 356 (FIGS. 21 and 22) for transformation into triads synchronized with the FT matrices or for direct connection to transmitter 360, as described in detail above.

In FIG. 29 is shown a detailed diagram of transmitter 360 operating in both the A and B bands, for the transmission of both message and supervisory information. Transmitter 360 includes a frequency programmer 1140 and a modulator section 1142. Frequency programmer 1140 includes a mode selection gating circuit 1144 comprised of four coincidence gates 1146, 1148, 1150 and 1152, and two OR gates 1154 and 1156. The programmer further includes A and B band offset oscillators 1158 and 1160, a pair of coarse mixers 1162 and 1164, and a pair of fine mixers 1166 and 1168.

Inputs to coincidence gates 1146, 1148, 1150 and 1152 are provided from frequency synthesized 336 over leads 980, 994, 984, and 1020, respectively. As shown in FIGS. 23 through 26, leads 980 and 994 carry coarse and fine selection signals respectively for message channel or remote basic communication unit address selection. Similarly, leads 984 and 1020 carry coarse and fine selection signals respectively for the basic communication unit's own normal address.

Gating signals for coincidence gates 1146 and 1148 are provided over lead 1170 from program sequencer 350 so that whenever it is desired to transmit on a message channel or on the co-channel address of a retransmission unit or a remote basic communication unit, coarse and fine signals are provided on leads 1172 and 1174 respectively.

In like manner, the gating signals on lead 1176 for coincidence gates 1150 and 1152 are generated by program sequencer 350 when the basic communication unit is required to transmit on its own normal address, i.e., in acknowledgment of a call request. Thus, in response to the gating signal on lead 1176, there is provided over leads 1178 and 1180 the coarse and fine selection signals for the basic communication unit's own normal address. The coarse signals on leads 1172 and 1178 pass through an OR gate 1154 while the fine signals on leads 1174 and 1180 pass through a second OR gate 1156 and leads 1182 and 1184 respectively.

The coarse signals are fed over leads 1182 and 1186 to coarse band select mixers 1162 and 1164. The second input to mixer 1162 is provided by A band offset oscillator 1158 which may be a suitable gated oscillator controlled by a signal on lead 1188 from program sequencer 350. Similarly, the second input to mixer 1164 is provided by B band offset oscillator 1160 which operates in response to gating signals over lead 1190 from the program sequencer. Thus, in response to a gating signal on one of leads 1188 or 1190, there is generated by one of mixers 1162 or 1164, a signal representative of the ten-channel sub-band in either the A or the B band including the particular channel upon which information is to be transmitted.

Mixers 1162 and 1164 and OR gate 1156 feed mixers 1166 and 1168 respectively. The signal on lead 1184 representing the appropriate one of the fine channel select signals is mixed with the coarse signal provided by mixers 1162 and 1164 to generate a single frequency in the A or B band which is fed through leads 1192 and 1194, respectively, and through amplifier 1196 to driver 1198 and amplifier 1200, for modulation by the information provided over lead 782 from triad sequencers 354 and 356.

As previously noted, the modulation appearing on lead 782 will either be in the form of presence-absence, or position modulated pulses for transmission over the message channels, or in the form of three closely spaced pulses synchronized with the FT matrix triads generated by triad sequencers 354 and 356. In the present embodiment, the particular modulation scheme used involves the concurrent modulation of both driver 1198 and power amplifier 1200 by pulse modulator 1202, and linear modulator 1204 respectively.

The modulated pulses on lead 782 are connected to a steering circuit 1206, and by means of lead 1208, to a second steering circuit 1210, which may be suitable coincidence circuits gated over leads 1212 and 1214 respectively, by signals from program sequencer 350.

Information encoded on FT matrices is transmitted on 120 microsecond pulses while message information is transmitted on 30 microsecond pulses. With Gaussian information pulses, the base width of a 30 microsecond pulse is 60 microseconds, while the base width of a 120 microsecond pulse is approximately 240 microseconds. When FT matrices are to be transmitted, gate 1206 passes the modulation on lead 782 over lead 1216 to a 240 microsecond rectangular pulse generator 1218 and to a 120 microsecond Gaussian pulse generator 1220.

Similarly, gate 1210 passes modulated pulses on lead 782 over lead 1222 to a 60 microsecond rectangular pulse generator 1224, and to a 30 microsecond Gaussian pulse generator 1226.

The outputs of rectangular pulse generators 1218 and 1224 are provided over leads 1228 and 1230 respectively to pulse modulator 1202, and serve to gate on driver 1198 either for 60 microseconds, or for 240 microseconds in accordance with which of the two inputs is present.

The outputs of Gaussian pulse generators 1220 and 1226 are fed to linear modulator 1204 which impresses the appropriate duration Gaussian signal on the gated output of driver 1198.

Additional inputs to modulators 1202 and 1204 are fed over leads 1242 and 1244 from an automatic power control circuit 1238 which responds to signals on lead 1240 as described below to adjust the power output level for optimum channel utilization.

FIG. 32 and 33 show the message channel search control unit 364. The function of this equipment is to establish the identity of an available channel over which the basic communication unit may communicate, to verify the availability of a particular channel suggested by another calling basic communication unit, and to determine a proper transmitted power level which will permit the maximum reuse of communication channels throughout the entire system.

Referring first to FIG. 33, there is shown the AGC selection gate 1246, referred to briefly in connection with FIG. 17, which cooperates with automatic level control unit 1248 and automatic power control unit 1250 to operate message and supervisory receiver 332 and transmitter 360 at the proper sensitivity and power level for each mode of basic communication unit operation. The selection gate includes an integration and storage circuit 1252 connected by leads 1254, 464, and 524 to the output of coincidence gate 516 in FIG. 18. The amplitude of the signal appearing on lead 1254 upon receipt of a supervisory call-up word is related to the path loss between the calling and called basic communication unit since prior to an output signal from gate 516, (FIG. 18) supervisory receiver 334 is operated at maximum sensitivity by its AGC circuit 462.

A second integrator circuit 1256 is connected by lead 1258 and OR gate 1260 to the output of address detector 474 (see FIG. 19) over leads 786 and 1262 and over leads 1264 and 592 to the output of message channel gate 588 in FIG. 19. The signal on lead 1262 is representative of the address channel path loss between two communicating units, while the signal on lead 1264 is representative of message channel path loss. The outputs of storage circuits 1252 and 1256 are connected through an OR gate 1266 as the first input to coincidence gate 1268, a gating input to which is provided over lead 1270 from program sequencer 350 whenever the basic communication unit is to operate in the supervisory mode. When gate 1268 is enabled, signals on leads 1272 and 1274 are fed to the automatic level control circuit 1248 and automatic power control circuit 1250 which determine proper signaling levels for the channel availability search described below.

The message and supervisory receiver path loss signal is fed over leads 1258 and 1276 to an additional coincidence gate 1278 which receives an enabling signal over lead 1280 from an OR gate 1282. A first input to OR gate 1282 is fed over leads 1270 and 1284 when the basic communication unit is operating in the supervisory signaling mode, while a second input is provided over lead 1286 from program sequencer 350 when the system is operating in the message channel communication mode.

In other words, gate 1278 is enabled and directly passes the path loss signal on lead 1258 whenever actual communication (either supervisory or message) is taking place. Gate 1278 is not enabled, as will be explained below, during the channel availability search mode. The output of gate 1278 is connected through an OR gate 1288 and lead 412 as the input signal for AGC filter 410 in message and supervisory receiver 332 (see FIG. 17).

A second input to OR gate 1288 is provided from coincidence gate 1290, which receives the automatic level control signal over lead 1292, and an enabling signal over leads 1294, 1296 and OR gate 1298 from program sequences 350. OR gate 1298 (see FIG. 32) is fed by program sequencer 350 over leads 1300 and 1302 during the reception and transmission phases respectively of the message channel search process. During this time, neither input to OR gate 1282 is present, whereby the output of the automatic level control unit passes through OR gate 1288 to lead 412 and establishes the sensitivity of receiver 332 in accordance with information stored in the automatic control circuit 1248.

Selection gate 1246 further includes an inhibit gate 1304 connected over lead 1306 to automatic power control circuit 1250. Gate 1304 is normally enabled, but is turned off in response to a signal appearing on leads 1308 and 1270 when the basic communication unit is in the supervisory mode. The output of gate 1304 on lead 1240 serves as the power control signal for transmitter 360 shown in FIG. 28. As may be understood, the path loss signal on lead 1274 establishes a transmitter power level to permit optimum reuse of the message channels. However, during the supervisory signaling mode, it is desirable that the greatest possible transmitted power be employed; therefore, at this time, gate 1304 is blocked and no signal is present on lead 1240. The absence of a signal on lead 1240 is interpreted by transmitter 360 as an indication that maximum transmitted power is to be used.

The search for an available message channel is accomplished in a two-step process including passive and active phases. In the passive phase, message and supervisory receiver 332 is set to the particular channel to be monitored with a sensitivity level controlled by automatic level control circuit 1248. This circuit may be a simple voltage divider, since it has been found that optimum channel utilization will result if both the transmitter power and the receiver sensitivity are linearly combined to overcome the transmission path loss between two units. In particular, one satisfactory arrangement embodying this technique is to establish a receiver sensitivity sufficient to compensate for half of the path loss, and to establish a transmitter power sufficient to compensate for the remaining half of the path loss. In other words, assuming a path loss of approximately 6 db, instead of maintaining constant transmitter power, and increasing receiver sensitivity by the required 6 db, in the present system the transmitter power is adjusted to compensate for 3 db of the path loss, while the receiver sensitivity is adjusted to compensate for the remaining 3 db. Thus, the signal on lead 1272 which corresponds to a conventional receiver AGC signal, is divided in half, and the receiver sensitivity signal on lead 1292 is passed through gates 1290 and 1288 and lead 412 to the AGC filter 410 shown in FIG. 17. As previously states, conventional AGC is used for actual reception. Thus, it is preferable that during search, a slight excess sensitivity is used to provide a greater safety margin for the search.

The actual circuitry by which the message channel is monitored, depicted in FIG. 32, comprises a threshold amplifier 1310, a single shot multi-vibrator 1312 and 8 kc signal detector 1314, and a flip-flop 1316, connected in series. Threshold amplifier 1310 is driven by the output of the message and supervisory channel video detector 390 and message channel gate 588 (FIGS. 17 and 19) through a coincidence gate 1318 which is enabled by the signal from gate 1298, present during the passive channel search. Threshold amplifier 1310 passes signals of greater than a predetermined level to single shot multi-vibrator 1312 which transforms the signals into sharply defined rectangular pulses.

The 8 kc signal detector 1314 responds only to signals which are of the type employed in the system so that foreign equipment using the monitored channel which would not interfere with communication does not cause a false indication of channel occupancy. The circuit may be arranged so that upon the receipt of three out of five pulses at the expected pulse rate (e.g., eight kilocycles per second) an output is provided over lead 1320 to set flip-flop 1316, which provides an output on lead 1322 upon detection of a pre-existing conversation on the channel being monitored, and a second output on lead 1324 in the absence of communication signals on the monitored channel.

The particular channel to be monitored is controlled by a suitable multi-stage counter 1326 shown in FIG. 33. Counter 1326 provides output signals on one or more of leads 1328*a* through 1328*x* and serves to set frequency synthesizer 336 to the desired message channel. Counter 1326 is controlled over lead 1330 and is advanced to another channel immediately upon determination that the channel previously monitored is unavailable.

In order to permit the rapid identification of an available channel, the system is arranged so that a channel is monitored for a given period of time (e.g. 50 milliseconds) or until the presence of communication signals thereon is detected. To this end, there is provided a timing multi-vibrator 1332 connected through inhibit circuit 1334 and lead 1336 to differentiators 1338 and 1340.

The monitoring period is initiated by the setting of flip-flop 1342 and the resetting of flip-flop 1343 in response to a channel search command from program sequencer 350 on lead 1296 from OR gate 1298 and lead 1300. The ONE output from flip-flop 1342 enables a coincidence circuit 1344 to permit the passage on lead 1346 of an output signal from differentiator 1338 in response to the leading edge of each pulse provided by multi-vibrator 1332. The signal on lead 1346 triggers gate 1344, when conditioned by the initiating flip-flop 1342, to set a further flip-flop 1348 which supplies a first conditioning signal over lead 1350 to a coincidence circuit 1352. A second enabling signal appears on leads 1324 and 1354 at the ZERO output of flip-flop 1316 which remains reset when no communication signals are present. Differentiator 1340 fires in response to the trailing edge of the output of multi-vibrator 1332 to signal the end of the monitoring period. If both enabling signals are present, gate 1352 operates and an output signal appears on lead 1356 indicating that the monitored channel is not in use by transmitters within range.

At the same time, a signal appears on lead 1357 to set flip-flop 1343, the output of which is indicative of the availability of the monitored channel.

In contrast, if flip-flop 1316 is set, then gate 1352 is blocked and no output signal can appear on lead 1356, and flip-flop 1343 is not set.

Flip-flop 1316 is set immediately upon discovery that the monitored channel is in use, to permit rapid retuning of receiver 332 for monitoring another channel. To this end, the signal on lead 1322 is fed to coincidence gate 1358 which is enabled by the ZERO output of flip-flop 1343. This, in turn, triggers gate 1360, which is conditioned by the channel search signal on lead 1300. When flip-flop 1316 fires, a signal passes through gate 1360, gate 1362 and lead 1330 to advance the channel counter 1326.

Also, the output of flip-flop 1316 is fed through lead 1364 and OR gate 1368 to reset flip-flop 1348, and the output of coincidence gate 1358 is connected through a delay multi-vibrator 1370 to disable inhibit gate 1334 for a short period to permit the reestablishment of initial operating conditions in the circuit before a new monitoring period is begun.

The presence of signals on leads 1356 and 1357 initiates the active phase of the channel search. At this time, an interrogation signal is transmitted on the channel and response thereto is awaited. If a response is received, then the channel is in use and another channel is selected. If no response is received within a fixed time period, the channel is assumed to be available.

During the interrogation, a slight excess of power is used over that required to compensate for the path loss previously determined, to provide a more accurate indication of whether the particular channel being monitored is actually in use but at a range slightly beyond that of the unit. Automatic power control 1250 thus includes suitable circuitry responsive to the signal at the output of gate 1298 to temporarily increase the transmitted power. However, during actual communication (characterized by the absence of the signal on lead 1294), lower power level is used.

The interrogation is initiated by the setting of flip-flop 1343. The ONE output thereof is fed over lead 1372 to a pair of coincidence gates 1374 and 1376. Gate 1374 is enabled by the search signal on lead 1300 so that an output on lead 1378 signifies success of the passive phase of the search. This signal is sent to program sequencer 350 which returns a channel check signal on lead 1302 to condition gates 1294 and 1376 and to reset flip-flop 1343. Concurrently, the signal on lead 1356 sets a single shot multivibrator 1380 which operates to time the transmission of the interrogation signal on the monitored channel. The output of multi-vibrator 1380 is fed over lead 1382 to set a multi-vibrator 1384 and over lead 1386 to condition a coincidence gate 1388. Multi-vibrators 1380 and 1384 cooperate to divide the active monitoring period into a transmission period during which the interrogation is sent, and a monitoring period during which a reply from a prior user is awaited. The time period (e.g. 380 microseconds) established by multi-vibrator 1380 is used for transmission of the interrogation signal, which may be 13 kilocycles per second modulation of the channel being monitored.

After the transmission period, the remainder of the period of multi-vibrator 1384 is used to listen for a reply to the interrogation signals. The reply will appear on lead 1264 (from video detector 390 in receiver 332) and is provided on leads 1389 and 1390 to a 13 kilocycles per second signal detector 1392 similar to circuit 1314.

The ZERO output of multi-vibrator 1384 is connected by lead 1392 to the inhibit input of a gate 1394, the other input of which is connected through inhibit circuit 1334 to multi-vibrator 1332. The ONE output of multi-vibrator 1384 and the output of gate 1394 are fed through OR gate 1396 to disable 8 kc detector 1314 and to reset flip-flop 1316 through differentiator 1398. As may be seen, gate 1396 provides an output to block detector 1314 and to reset flip-flop 1316 during the active monitoring period.

The actual interrogation signal is generated by a 13 kc oscillator 1400 and is fed through coincidence gate 1388 and OR gate 1402 and lead 1138 to OR gate 1088 in audio and supervisory encoder 362 (FIG. 28). As will be explained below, the 13 kc crystal oscillator 1400 serves both to generate the interrogation signal and the response thereto, so that detector 1392 must operate at the same frequency as oscillator 1400. It may be understood, that an output from detector 1392 is representative either of the fact that a remote unit is attempting to use a channel presently in use, or that the channel in which the interrogation signal was transmitted is already in use by some remote unit.

When an output signal from detector 1392 is present, it is fed over lead 1403 through normally enabled inhibit gate 1404, OR gate 1362 and lead 1330 to step the channel counter 1326 to a different channel. Gate 1404 is enabled only during the message channel check, and is blocked by the output of OR gate 1405 when signals are present on leads 1286 or 1300 from the program sequencer 350.

The occupancy signal is provided through a single shot multi-vibrator 1406 to the blocking input of an inhibit circuit 1408 which serves to prevent the generation of a signal indicating that the channel being monitored is available for use. Specifically, at the end of the delay period controlled by multi-vibrator 1384, the trailing edge of the output thereof causes a signal to be provided by differentiator 1410 which will pass through inhibit circuit 1408 in its enabled condition, as an input to a coincidence circuit 1412, also fed over lead 1324 from the ZERO output of flip-flop 1316. If coincidence gate 1412 is conditioned by the signal on lead 1324, and unless gate 1408 has been blocked, at the end of the monitoring period flip-flop 1343 is set again and a signal is provided over lead 1372 to coincidence gates 1374 and 1376 as described above in connection with the passive monitoring mode. Gate 1376 is conditioned by the signal on lead 1302, so that the setting of flip-flop 1343 causes a "channel available" signal to be sent to program sequencer 350 over lead 1414.

In addition, oscillator 1400 serves to generate reply signals for interrogations from other remote basic communication units operating in the active phase of their own channel selection programs. To this end, once a channel has been selected as clear and available for communication, i.e., has been adaptably assigned for exclusive use on a particular call, a hold signal is provided from program sequencer 350 over lead 1416 to condition a coincidence gate 1418. The latter receives a trigger signal as an additional output of 13 kc detector 1392. If an interrogation signal is detected after the channel has been assigned, coincidence gate 1418 activates a single shot multi-vibrator 1420 which conditions a further coincidence gate 1422 for a predetermined time period during which the interrogation reply is transmitted. The 13 kc oscillator 1400 is connected as the second input to coincidence gate 1422 through a differentiator 1424 and 100 microsecond time delay circuit 1426 connected in series. Thus, during the reply period set by multi-vibrator 1420, there is generated a series of pulses at the output of gate 1422 representative of the interrogation reply. This signal is fed through OR gate 1402 and lead 1138 as previously described, and is transmitted at the power required to overcome one-half of the path loss between the unit and that with which it is already in communication. The reply signal will be detected by the interrogating unit, if it is within range, and its message channel counter 1326 will be stepped to a new channel. Similarly, if the other party to the pre-established call is within range of the interrogating unit, it also will receive the interrogation signal and will generate the appropriate reply indicating that the desired channel is already in use.

From the above discussion, therefore, it may be seen that in the event that successive channels are monitored and found to be unavailable, counter 1326 will be stepped in turn to all of the possible channels until an available one is found. In addition, the system may be so arranged that after all of the channels have been monitored, control signals may be provided to automatic level and power control circuits 1248 and 1250 to establish modified power and sensitivity levels whereby channels already in use at the periphery of the range of the interrogating unit may be denoted as acceptable channels, even though the resulting quality of transmission and reception will be degraded. While such a result is undesirable, it may be understood that under the emergency condition which may have precipitated the high traffic demands leading to channel unavailability, it is more desirable to permit a larger number of somewhat degraded conversations than to prevent a potentially important message from being received.

Figure 31:
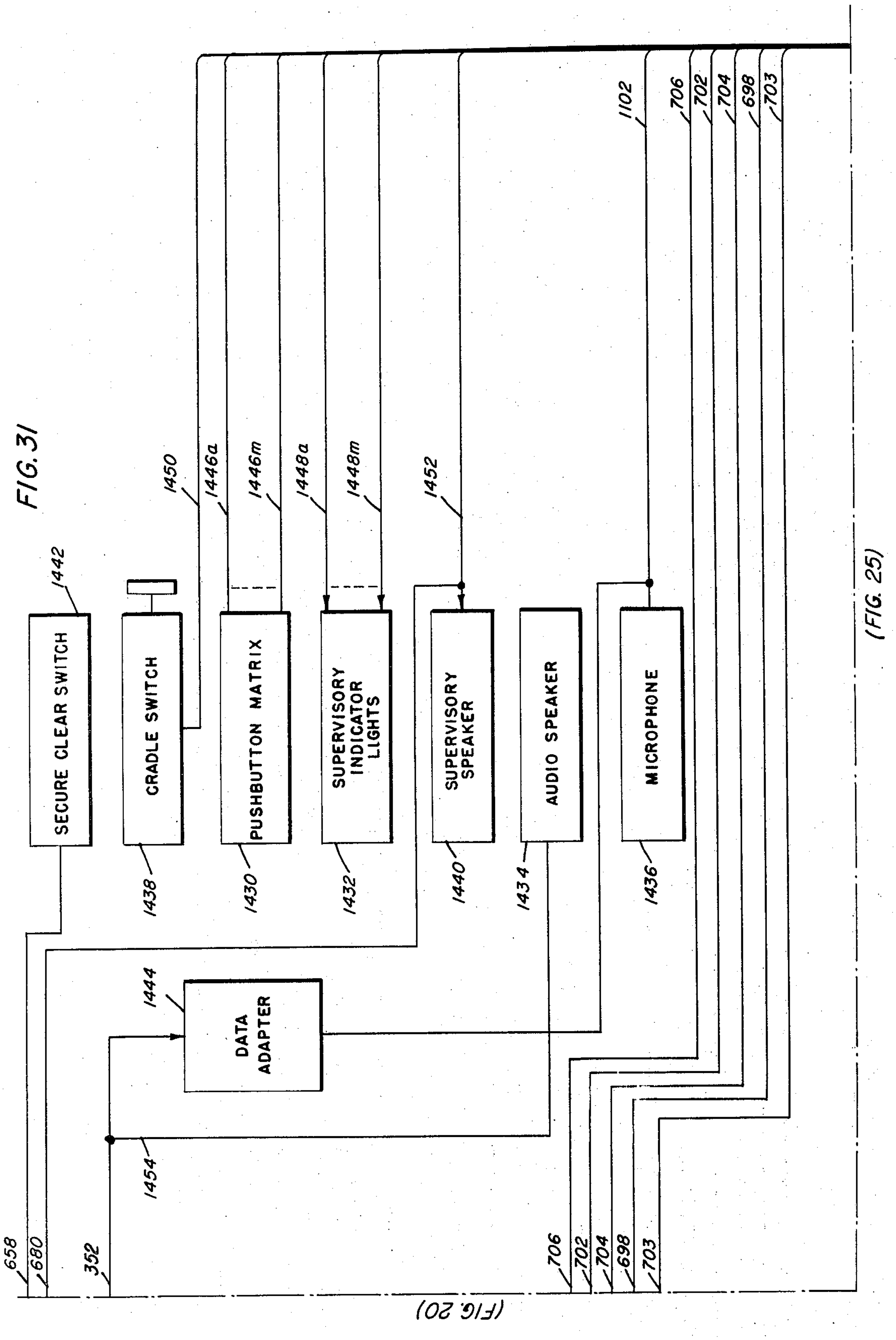

In FIG. 31 is shown in generalized form the functional components of the basic communication unit handset such as that shown in FIG. 3 and the manner of connection thereof to the remainder of the system. The handset itself comprises a pushbutton matrix 1430 or "dialing", an array of indicator lights 1432, a speaker 1434, and a microphone 1436.

In addition, as shown in FIG. 31, the basic communication unit includes a cradle switch 1438 which is adapted for cooperation with the handset in known fashion, a supervisory speaker 1440 for audibly signaling the existence and nature of an incoming call, a secure/clear select switch 1442 for use with the security adapter, and a suitable data adapter 1444 such as magnetic tape equipment, punched card readers, etc.

The output of pushbutton matrix 1430 is connected over leads **1446*a* through 1446*m* to an address encoder described below associated with information processor 366. The supervisory indications are provided from program sequencer 350 over leads 1448*a* through 1448*m*** and serve to operate the various indicator lights provided in the handset.

A further connection shown functionally as lead 1450 is connected between cradle switch 1438 and program sequencer 350 to initiate the operations thereof when a call is to be established, or to permit the establishment of a connection when a call is being answered. The connection between switch 1438 and sequencer 350 is shown functionally, and may take any of a number of forms which will be readily apparent to one skilled in the art. Microphone 1436, and data adapter 1444 are both connected to lead 1102 to provide the information signal for modulator and encoder 362 as previously described.

Supervisory speaker 1440, which is mounted in any convenient manner either in the handset or in the basic communication unit itself, supplies the supervisory tones from lead 1452 in audible form. The supervisory tones are also fed through lead 680 to the audio amplifier 630 (see FIG. 20) for amplification and connection over leads 352 and 1454 to handset speaker 1434. Lead 352 also provides the demodulated information as an input to data adapter 1444 whereby incoming data information is appropriately utilized.

Shown in FIG. 27 is the circuitry which comprises information processor 366. The unit comprises a common register 1460, an array 1462 of transfer gates, a working storage register 368, an array 1466 of address and channel identification transfer gates, a retransmission unit address memory 1468 and an associated address sequencer 1470, an address encoder 1472, a supervisory word decoder 1474, and a supervisory word encoder 1476. Processor 366 is comprised of various elements well known to those skilled in the art, and is used generally to transfer information back and forth between the various components of the system.

For example, common register 1460 receives an input over lead 706 from Bose-Chaudhuri decoder 370 (see FIG. 20) in the form of four-bit binary code words. The information is entered under the control of gating signals supplied over leads 1052 and 1054 from the system timer as described below.

This information is read out in parallel over leads 1478*a* through 1478*d* to the supervisory word decoder 1474 which processes the various supervisory word formats involved in the operation of the basic communication unit. Decoder 1474 is controlled by signals over lead 1480 from the program sequencer, and returns information thereto over leads 1482*a* through 1482*n* to initiate various sub-programs and/or jump operations therein, and to activate indicator lights, or tone signals, etc. in accordance with the nature of the incoming supervisory word.

As indicated by the two-headed arrows, common register 1460 and transfer gate array 1462 may exchange information in either direction, as may transfer gate array 1462 and working storage register 368. However, transfer gate array 1466 is used only to switch information out along leads 1034*a* through 1034*x* to the frequency synthesizer matrix driver 363 (see FIG. 23). Accordingly, it is not necessary that information be permitted to pass from transfer gate array 1466 either to the working storage register 368, or to the retransmission unit address storage register 1468. Transfer gate array 1462, working storage register 368, and address and channel transfer gate array 1466 is under the control of program sequencer 350, which control is indicated functionally by a connection 1490 between processor 366 and sequencer 350. However, it should be recognized that the exact manner in which the above described control is effected will depynd on the particular circuitry employed, and will be readily apparent to one skilled in the art in light of the above discussion.

Among the functions of working storage register 368, are to:

1. temporarily store the FT matrix address of the called basic communication unit as well as the appropriate supervisory word identifying the nature of the call;
2. store information relating to the addresses of the various prearranged and local conferences, plus the supervisory information necessary to establish such conferences;
3. store the address of the broadcast warning channel and provide the same when required, to the frequency synthesizer.

As may be understood, information relating to network calls initiated by the basic communication unit may be maintained in the working storage register while the call is being processed. In addition, information regarding presently established calls may also be stored in the working storage register so that upon the termination of a network alert message or command over-ride call, the originally communicating parties may be automatically reconnected. The appropriate circuitry necessary to accomplish the above outlined results, need not be described in detail, since a large number of possible configurations exist, and may be used interchangeably, as will readily be apparent to one skilled in the art.

Supervisory word encoder 1476 serves the corresponding function of receiving commands from the program sequencer, supplied over leads 1484*a* 14841844*n*, translating them into the appropriate four digit code words, and supplying them over leads 1486*a* through 1486*d* to common register 1460. This information may be provided over lead 1050 as an input to Bose-Chaudhuri encoder 374 previously described.

Address encoder 1472 is connected by leads 1446*a*, through 1446*n* to the keying unit 1430 shown in FIG. 31. In response to a command over lead 1488 from the program sequencer, the address of the called basic communication unit is transferred over leads 1490*a* through 1490*m* to common register 1460, from where it may be transferred through transfer gate array 1462, working storage register 368, and address and channel identification transfer array 1466 to the frequency syntheszer matrix driver 363 over leads 1034*a* through 1034*x*. This information may be temporarily stored in a portion of working storage register 368, in order to permit the local search for the called basic communication unit, and if necessary, the remote search through the range extension network.

In order to initiate the long distance search by means of the range extension network, processor 366 includes a retransmission unit address storage 1468, and an associated sequencer 1470 which responds to control signals over lead 1492 from the program sequencer to transmit on each of the retransmission unit addresses in turn a supervisory message as previously described requesting that a sequential search be conducted for the called basic communication unit. Memory 1468 is preferably of the magnetic type, e.g. a pre-punched magnetic card connected to the system when a basic communication unit is put into operation, or any other suitable memory circuit of sufficient capacity to store the addresses of all of the possible retransmission units which may be needed. In order to minimize the delay required in contacting a retransmission unit, sequencer 1470 may be arranged so that upon each request for service of a retransmission unit, the same retransmission unit address is contacted first as long as that retransmission unit continues to respond. If, as a result of relocation of the basic communication unit, or the retransmission unit, the two are no longer within communicating range, the sequencer selects another address and attempts to establish contact with the retransmission unit corresponding thereto. Each failure to respond causes the sequencer to select a different address in the memory, the cycle continuing until one of the retransmission unit addresses is responded to.

Shown in FIG. 30 is the program sequencer and system timer 350 which provides the overall program control for the operation of the basic communication unit. Again, as in the case of the information processor 366, it is unnecessary to discuss in detail the particular configuration of the circuitry which comprises the program sequencer, since a wide variety of possible configurations exist which would provide the requisite functions. Briefly, however, unit 350 comprises logic control circuitry 1494, a clock 1496 and a frequency dividing counter 1498 whice feeds a pulse rate gate matrix 1500 through which may be selectively switched timing signals necessary for the operation of the system. As may be understood, the output of oscillator 1496 is divided and the various frequency signals provided over leads 1502*a* through 1502*q* to matrix 1500, from which appropriate control signals supplied by logic control circuitry 1494 over leads 1504*a* through 1504*d* provide output signals on leads 698, 1052 and 1512 at the appropriate frequencies for operating the remainder of the system.

An additional counter 1514 fed over lead 1512 provides timing signals to a supervisory gaeing matrix 1516 over leads 1518*a* through 1518*h*. In response to the control signals on leads 1520*a* through 1520*d* matrix 1516 returns timing signals over leads 1522*a* through 1522*r* for operation of the program sequencer itself.

A supervisory tone generator 1524, which may be any appropriate combination of audio oscillators to generate the desired distinctive tones, is operated under control of logic control circuitry 1494 to generate the busy signal, the normal ringing signal, and the various priority ringing signals, as well as conference identification signals if desired. The tones are provided on lead 1452 to the basic communication unit handset, and on lead 1100 to audio modulator 1063 (see FIG. 28) for transmission to remote basic communication units when necessary.

Logic control circuitry 1494 is in essence a special purpose computer which responds to the various input signals to energize its outputs in accordance with the various operations necessary to effect the placement and completion of calls to and from the basic communication unit. The circuitry includes the necessary digital logic to provide the required functions, and may be comprised of any suitable electronic components. However, in order to enhance the portability and reliability thereof, the circuitry which comprises logic control 1494, as well as that comprising the remainder of the basic communication unit is preferably of the miniaturized type, e.g. integrated or molecular circuitry, etc. The particular circuit configurations chosen will follow directly in accordance with the above specification of the various functions to be served thereby.

DETAILED DESCRIPTION OF OPERATION

In order to correlate the various features of the invention as described above, and to facilitate a greater understanding of the nature of the present communication system, there will now be described the various steps carried out by the system in order to establish a call.

A call is initiated by the user lifting the basic communication unit handset and releasing cradle switch 1438 (FIG. 31) which transmits an initiation signal over lead 1450 to logic control circuitry 1494 in program sequencer 350. At this time, the user depresses appropriate ones of the buttons in push button array 1430 to register the address of the callee. An additional numerical digit is also registered to distinguish normal calls from command over-ride calls.

Each successive digit is transmitted over the appropriate ones of leads 1446*a* through 1446*m* to address encoder 1472 from which it is switched into common register 1460.

At the same time, in response to the signal on lead 1450 logic control circuitry 1494 generates the supervisory word corresponding to the basic communication unit call request and supplies the same through appropriate ones of leads 1484*a* through 1484*n* and supervisory word encoder 1476 to common register 1460.

Address encoder 1472 responds to the particular address registered therein to generate selection signals which pass through common register 1460 and transfer gate array 1462 to working storage register 368 where it is temporarily stored, and through transfer gate array 1466 and the appropriate ones of leads 1034*a* through 1034*x* to frequency synthesizer matrix driver 363. This information is used to establish the FT matrices by which the supervisory call-up message is transmitted. The output of supervisory word encoder 1476 passes through common register 1460 and lead 1050 to Bose-Chaudhuri encoder 374 which generates the corresponding fifteen-bit error correcting code word. The fifteen-bit code and its complement are provided over leads 1058 and 1060 respectively to TSK modulator 1075 for transformation into a series of time shift keyed pulses. Modulator 1075 is turned on at this point by a signal over lead 1134 from logic control circuitry 1494. The audio modulator portion of modulator and encoder 362 is blocked at this time by the inhibit signal provided from logic control 1494 over lead 1132.

The signals on leads 1034*a* through 1034*x* establish the proper signal paths through driver matrix 363 (see FIG. 23) to energize the coarse oscillators in groups 874, 876, and 878 and the appropriate ones of gates 988*a* through 988*j* (over leads 990*a* through 990*j*) to generate the three frequencies corresponding to the address of the called basic communication unit. At the same time, a signal on lead 742 energizes timing chain 728 (FIG. 21) to establish the time relationship between the pulses in the FT triad. The timing signals are provided to gates 916, 918, and 920 in the frequency synthesizer 336 (FIG. 23) and to corresponding gates (not shown) in matrix driver 363 to gate the appropriate ones of coincidence circuits 988a through 988j at the proper times.

The coarse frequency select signals are fed from OR gate 952 (FIG. 24) on leads 402 and 994 (FIG. 26) to selection gate 1144 in transmitter 360 (FIG. 29) while the fine selection signals are provided from OR gate 992 (FIG. 25) over leads 422 and 994 (FIG. 26) to the same selection gate. A signal on lead 1170 from logic control 1494 passes these signals through the selection gate 1144 to the coarse and fine mixers 1162 and 1166, while a gating signal over lead 1188 from logic control 1494 selects a band oscillator 1158 required for direct communication between basic communication units.

The time shift keyed signals on lead 1136 from TSK modulator 1075 pass over lead 748 to triad sequencer 354 (FIG. 19) for synchronization with the FT matrix and are provided over lead 782 to steering gates 1206 and 1210 in transmitter 360 (FIG. 29). Since the supervisory information is to be transmitted in the form of 120 microsecond Gaussian pulses, a signal from logic control 1494 over lead 1212 energizes gate 1206 to pass the modulated pulses to generators 1218 and 1220. Because of the operation of timing chain (FIG. 21), the signals appearing at the output of pulse generators 1218 and 1220 are in synchronism with the FT matrix at the output of amplifier 1196, whereby the FT address of the called basic communication unit is properly modulated and transmitted. No signal appears at this time on lead 1240 because gate 1304 (FIG. 33) in the selection gate 1246 is disabled by the presence of a message mode signal on lead 1270 and power control circuit 1238 permits the transmission of the supervisory message at the maximum possible power level.

Since the called basic communication unit, if it is in range, will respond on its own FT address, frequency selection signasl are also provided over leads 402 and 422 to receiver 332 (FIG. 17) and a selection signal is provided to A band offset oscillator 398 over lead 420 from the logic control unit 1494 to prepare receiver 332 for the expected response. However, since the calling and called units are operating in complete asynchronism, sync acquire circuitry described in connection with FIG. 21 allows the receiver to scan the expected reply frequencies until such a reply is received. At that time, synchronism is established and a supervisory acknowledgement may be processed.

During the above operations, the supervisory receivers 334 in both basic communication units cycle alternatively over their normal addresses and that of the network alert. Thus, it may be understood that normal address timing chain 794 will be used both to establish the reception of a supervisory message directed to the particular basic communication unit, as well as to reply to a call-up on its own address. To this end, receiver 334 is cycled through the normal and network alert addresses until properly timed signals appear as indicated by the correlated pulse output from gate 516 (see FIG. 18).

If a supervisory message on the proper FT address is received, the time shift keyed pulses are converted by maximum likelihood detector 566 into a stream of on/-off signals which are provided over lead 584 to selection gate 586. Under normal operating conditions, no signal is present on lead 608 from logic control 1494 so that the signals on lead 584 pass through gates 604 and 606 and lead 614 to Bose-Chaudhuri decoder 370.

Assuming that an error-free or correctable message has been received, the decoder output is provided over lead 706 and common register 1460 to supervisory word decoder 1474 which recognizes the message as a supervisory call-up and provides signals to logic control 1494 to initiate the reply.

If the incoming supervisory message represents a normal call, and the basic communication unit is in use (as indicated by signals on lead 1450) logic control 1494 generates the busy supervisory word and provides the same over leads 1484*a* through 1484*n* to the supervisory word encoder 1476. Appropriate signals then pass over leads 1486*a* through 1486*d*, and through common register 1460 and lead 1050 to Bose-Chaudhuri encoder 374 whereby the appropriate supervisory message is generated. Similarly, if the basic communication unit is not in use at the time the message is received, an appropriate acknowledge word passes from supervisory encoder 1476 to Bose-Chaudhuri encoder 374. If a command over-ride supervisory call-up is received, or if the supervisory call-up is received on the network alert address, the logic control circuitry initiates the generation of an appropriate indication by supervisory tone generator 1524 and (in the case of a command over-ride message) generates the appropriate acknowledgement message to be returned to the sender.

The time shift keyed message appearing at the output of OR gate 1088 on lead 748 (FIG. 28) passes along lead 820 (FIG. 22) and is switched through gate 824 in response to an initiation signal from logic control 4194 on lead 742, (FIG. 21) and lead 826. This permits the synchronization of the supervisory message with the normal address triad of the basic communication unit. The synchronized supervisory triad passes over lead 782 (FIG. 22) initiating signal is still provided by logic control 1494 over lead 1212. Similarly, initiating signals are provided on lead 1176 to permit the passage of coarse and fine channel select signals on leads 984 and 1020 respectively, from OR gate 960 and triad 996 (FIGS. 23 and 25) in frequency synthesizer 336.

The original calling basic communication unit is at this time awaiting a reply on the FT address of the callee. Thus, receiver 332 (FIG. 17) is set in the A band by a gating signal on lead 420 from logic control unit 1494 and is tuned to the proper frequencies by the signals on leads 402 and 422 from the frequency synthesizer so that upon the receipt of a supervisory message correlated in time and frequency with the expected address, gate 484 (FIG. 19) generates an output signal which synchronizes timing chain 728 with the incoming reply. AGC level is provided over lead 1262 to the AGC selection gate 1246 (FIG. 33). The supervisory message is converted from time shift keying to binary levels by the maximum liklihood detector 532, (FIG. 19), and is provided over lead 614 for further processing by supervisory word decoder 1474, and logic control circuitry 1494.

In the event that the received message represents a busy signal, logic control 1494 initiates the gnereation of a busy signal by tone generator 1524 which is supplied through lead 1452 (FIG. 30) and audio amplifier 630 to handset speaker 1434 (FIGS. 20 and 31). In the event that a go-ahead signal is received, channel search signals are provided on leads 1300 and 1302 from logic control circuitry 1494 (FIG. 30) in turn to initiate the passive and active phases respectively of the message channel search as previously described. The signal on lead 1262 passes through the AGC storage circuit 1256 and gate 1268 (FIG. 33) conditioned by a signal on lead 1270 to automatic level control 1248 and power control 2150 to establish the appropriate sensitivity and power levels for the channel search.

When an available channel is found, the signals on leads 1328*a* through 1328*x* which identify the available channel are switched through transfer gate array 1462 to the common register 1460 (FIG. 27) and through working storage 1464 and transfer gate array 1466 to the frequency synthesizer matrix driver 363 (FIG. 23). The channel identification is used to set receiver 332 and transmitter 360 and combined with the proper identifying supervisory word, and processed as previously described for transmission on the FT matrix address of the unit being called.

Upon receipt of the channel identification by receiver 334 of the callee, it is processed as described above, and the appropriate command sent by supervisory word decoder 1474 (FIG. 27) to logic control 4194. At this time, frequency matrix driver 363 in the called unit sets the message and supervisory receiver 332 thereof to the suggested channel and the channel availability search is conducted. The output of supervisory address detector gate 516 (FIG. 18) is provided over lead 1254 to storage circuit 1252 (FIG. 33) to provide an indication of the path loss for use by the called basic communication unit. This signal is switched through gate 1266 and gate 1268 (now enabled) to the automatic level control 1248 and automatic power control 1250 as described above to set the proper signal levels.

If the channel is found to be satisfactory during both the passive and active phases of the channel search, logic control 1494 initiates the generation of a go-ahead message for transmission to the calling basic communication unit. If the channel is found to be unsatisfactory as indicated by the absence of a signal on one of leads 1378 and 1414, then an alternative message is generated requesting the calling unit to select another channel.

In either event, these supervisory messages are transmitted in the form of presence-absence coding on the proposed message channel itself. Thus, a signal appears on lead 1134 from logic control 1494 to block gate 1076 (FIG. 28) in time shift keying encoder 1075 so that the output of Bose-Chaudhuri encoder 374 on lead 1058 passes directly to lead 748. The signal passes over lead 748 to the inputs of timing chains 728 and 794 (FIG.'S 21 and 22). However, at this time no signal is present on leads 742 and 826 (FIG. 21), from logic control 1494, while a signal is present on lead 750. This signal causes the direct passage of the supervisory message through enabled gate 716 and gate 720 (See FIG. 21) and lead 782 to steering gates 1206 and 1210 in transmitter 360 (See FIG. 29). A signal on lead 1214 from logic control 1494 selects steering gate 1210 since the reply is to be sent on a message channel (i.e., 30 microsecond pulses) rather than on the FT matrix.

The frequency synthesizer was maintained on the suggested message channel (even if such message channel was unsatisfactory) since a signal is to be returned thereon indicating whether or not the channel should be used. The frequency selection signals for the message channel appear on leads 480 and 494, and are gated by the signal on lead 1170 from the logic control unit to properly tune the transmitter 360 for modulation by the supervisory signal.

When the channel identification message is sent, a message channel enable signal is sent from logic control 1494 over lead 590 to condition gate 588 (FIG. 19). When the reply is received, it is supplied through enabled gate 588 to 1–0 detector 596 and then through selection gate 586 and lead 614 to Bose-Chaudhuri decoder 370. If the received signal indicates acceptability to the callee of the proposed channel, the sensitivity control for the calling basic communication unit is switched to conventional AGC by the appearance of a signal on lead 1286 (see FIG. 33) from logic control 1494.

If the proposed channel is satisfactory to the called basic communication unit, its logic control 1494 will switch to conventional AGC and will initiate the generation of a ringing tone on lead 1452. The tone on lead 1100 is connected through the audio modulator (See FIG. 28) and is transmitted on the message channel to the calling basic communication unit wherein it is received and passed over leads 592 and 616 to the audio demodulator. The signal is then supplied over lead 352 (FIG. 20) to handset speaker 1434 and represents the ring-back tone.

In the event that the proposed message channel is unsatisfactory, and a message to that effect is received by the calling basic communication unit, its logic control 1494 provides a signal over lead 1300 which causes the channel search process to be repeated. Another available channel is found, and its identify transmitted to the called basic communication unit for verification there. The above process is repeated until a mutually satisfactory channel is found at which time the ringing and ring-back signals are generated or the range extension mode is selected. When the called basic communication unit handset is lifted, a signal denoting that fact is transmitted over lead 1450 to logic control 1494 and the conversation between the two parties may begin. Upon the completion of the call, the siganl is removed from lead 1450 which signals the control logic 1494 that the conversation has concluded, and the system may be returned to its rest mode.

As may be understood, in many instances the called basic communication unit will not be available in the vicinity of the calling unit. Thus, logic control 1494 is arranged to retransmit the supervisory call-up after a predetermined time in order to minimize the possibility that the original call-up was not received. In the event that a second call-up fails to elicit a response, the system is automatically switched to the retransmission unit call-up program whereby memory 1468 and sequencer 1470 (FIG. 27) select the addresses to be called. The actual message transmission and reception occurs in the manner previously described, except that the appropriate off-set oscillators 400 and 1160 (FIG.'s 17 and 29) are used in order to permit transmission to the retransmission unit in the B band and reception from the retransmission unit in the C band.

Local area conferences are handled in a manner similar to normal calls. Except for the first party called, there is no verification of channels required by conferees prior to accepting the channel assignment. The basic communication unit originating a conference registers the address of the first conferee, using the normal call procedure. After an A band channel is agreed upon, this channel designation is stored in the working storage register 368 (FIG. 27) for transmission to the other conferees, who are called one at a time on their normal addresses. The local conference digit is dialed with the desired addresses which indicates that no channel verification is required by the called party. The tone generator 1524 provides a signal on lead 1452 in the normal manner but no signal is fed to lead 1100, so that ring-back is not transmitted. If the callee fails to answer in a reasonable time, a timer in logic control circuitry 1494 restores it to the idle condition. The originator reaching each conferee in turn verbally informs him to stand by for the conference while the other are being called. A roll call is then held by the originator. No terminate signal is used for local conference calls. Hanging up by the operator terminates the call in the basic communication unit of each conferee.

The command over-ride function allows the caller to reach a user already engaged in a normal call. A separate supervisory word is provided to indicate this function. Any basic communication unit is inherently capable of generating this supervisory word, though it may be locked out of a unit whose users are not authorized to exercise command over-ride. By placing a call in the normal fashion after registering the command over-ride digit, the supervisory word "command override" is transmitted instead of the "normal call" word. If the callee is busy when the call is received, its logic control compares the supervisory word with that received with the previous call. If the previous call was also "command override," a busy signal is returned to the new caller, otherwise a terminate sequence is begun on the previous call.

A single broadcast warning is provided which covers the entire communication network. Activation of the alert terminates all other traffic in the division. Automatic restoration of all interrupted calls is provided after the warning since call data is stored in the working storage register during the alert call. The network alert address is guarded simultaneously by all retransmission units so that a network alert may be initiated from any point in the division using one address. In unauthorized units this function may be locked out if desired. To establish a network alert, the proper address is registered and is recognized by logic control 1494 which activates address sequencer 1470 (FIG.27) to immediately address one of the retransmission units. The retransmission unit then assigns the originator a B band message channel and relays the warning to all retransmission units in the D band. The "alert" supervisory word is broadcast with an assigned channel designation on the alert address to all basic communication units in range in the range extension network.

Thus, from the above the operation of the basic communication unit in all phases of call establishment may be understood. However, further discussion of the details of the construction and operation of the retransmission unit itself, and of the range extension network, may be found in the aforementioned Graham U. S. patent application.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

This application is a continuation in part of copending U. S. patent application Ser. No. 463,304, filed June 11, 1965.

What is claimed and desired to be secured by United States Letters Patent is:

1. A communication system including a plurality of basic communication units, each permanently associated for addressing and supervisory control purposes with a portion of the radio frequency spectrum, and each having transmitting and receiving means, means for establishing a plurality of frequency-spaced channels in each of said basic communication units, less than the number of possible simultaneous calls between said units, means responsive to the initiation of a call from one of said units for automatically assigning a free channel to said call, means in each unit for manually registering an identifying address of the unit to which a call is to be placed, control means, means connected to the control means and responsive to the registration of an address to generate that portion of the spectrum associated with the addressee, and means to modulate the generated portion of the spectrum in accordance with a supervisory message to be transmitted, each supervisory message including characteristics uniquely identifying the addressee.

2. The communication system of claim 1 where the generating means includes means to generate a plurality of frequencies for each address.

3. The communication system of claim 2 where the generating means further includes means to provide the generated frequencies in a selectable order, and with a selectable time delay, the particular frequencies, the order, and the delay uniquely identifying the addressee.

4. The communication system of claim 1 where the generating means comprises means to generate a single frequency for each address and means to impress upon the single frequency a suitable modulation to uniquely identify the addressee.

5. The communication system of claim where each unit further includes transmitting means, receiving means, first detector means connected to the receiving means to provide an output in response to the receipt of a supervisory message uniquely addressed to the particular unit and second detector means connected to the receiving means to provide an output in response to the receipt of a supervisory message uniquely addressed to a selected one of the units.

6. The communication system of claim 5 where the control means is responsive to the registration of an address to cause the generated portion of the spectrum to be modulated with a supervisory message representative of a call request, and to cause the second detector means to be conditioned to receive a supervisory message in the portion of the spectrum associated with and uniquely identifying the addressee.

7. The communication system of claim 6 where the control means further responds to the receipt of a call request addressed to the particular unit to initiate the return to the calling unit of a second supervisory message representative of an acknowledgement in the portion of the spectrum within which the call request was received and uniquely identifying the original addressee.

8. The communication system of claim 7 where all of the units are associated with a further portion of the radio frequency spectrum for message communication, and where each unit includes means connected to the control means to monitor selected channels in the further portion of the spectrum and to provide an indication in the absence of a signal in the channel being monitored.

9. The communication system of claim 8 where the control means responds to the receipt of an acknowledgement message to further modulate the portion of the spectrum associated with the addressee with a message identifying a channel in the further portion of the spectrum characterized by the absence of signals thereon.

10. The communication sytem of claim 9 where the control means responds to the receipt of a channel identification message to monitor the particular channel identified and to provide a first indication if signals are present thereon, and a second indication in the absence of signals thereon, and to transmit the first or second indication on the identified channel.

11. The communication system of claim 10 where the control means responds to the receipt of an acknowledgement message to tune the receiving means to the identified channel in the further portion of the spectrum.

12. The communication system of claim 11 where the control means responds to the receipt of a first indication on the identified channel to cause the identification of another channel in the further portion of the spectrum characterized by the absence of signals thereon, and to transmit the identity thereof to the addressee.

13. The communication system of claim 11 where the control means responds to the receipt of a second indication on the identified channel to establish a message communication path between the calling and called units.

14. The communication system of claim 13 where the first detector means responds to a further call request received during an already established call to initiate the return to the calling unit of a supervisory message in the portion of the spectrum within which the call request was received and uniquely identifying the original addressee, indicative of the busy condition.

15. The communication system of claim 1 where all of the units are associated with a further portion of the radio frequency spectrum for message communication and where each unit includes means connected to the control means to monitor channels in the further portion of the spectrum to identify channels characterized by the absence of signals thereon, and to assign such a channel on an adaptive-exclusive basis for communication between the calling and called units.

16. The communication system of claim 15 where each unit includes receiver means, and means connected to the receiver means to identify supervisory messages uniquely directed to the particular unit.

17. Aradio communication system including a plurality of basic communication units and a plurality of retransmission units, each unit being uniquely identifiable by an address associated therewith, each basic communication unit comprising receiving means, transmitting means, means to initiate a call by registering the address of a basic communication unit to be called, addressing means responsive to the registration of an address to generate a first portion of the radio frequency spectrum associated with that address for supervisory signaling, secondary coding means connected to the generator means to impart an identifying characteristic to the generated first portion of the spectrum and to encode supervisory information thereon, the generating means being further responsive to the initiation of a call to generate a second portion of the radio frequency spectrum for message transmission, analyzing means to determine the presence or absence of signals on the generated second portion of the spectrum, and means responsive to the absence of signals thereon to assign the generated second portion for exclusive use of the call being established, and responsive to the presence of signals thereon to cause different portions of the spectrum to be generated and analyzed until a portion without signals thereon is found.

18. The communication system of claim 17 where the first and second portions of the spectrum each comprise single discrete frequencies.

19. The communication system of claim 18 where the secondary coding means includes means to modulate the supervisory frequency by a second frequency, the first and second frequencies being determined by the registered address and uniquely identifying the callee.

20. The communication system of claim 19 where the secondary coding means includes means to encode supervisory information on the second frequency.

21. The communication system of claim 17 where the first portion of the spectrum comprises a plurality of discrete frequencies, and where the second portion comprises a single discrete frequency.

22. The communication system of claim 21 where the secondary coding means includes means to present the plurality of supervisory frequencies in a selectable order and with selectable delay therebetween, the particular frequencies, the order thereof, and the delay therebetween being determined by the registered address, and uniquely identifying the callee.

23. The communication system of claim 22 where the supervisory portion of the spectrum comprises a triad of frequencies.

24. The communication system of claim 23 where the secondary coding means includes means for position modulating the supervisory triad to encode information thereon.

25. The communication system of claim 17 where the second portion of the spectrum comprises a single discrete frequency and including means to encode message information on the exclusively assigned single frequency.

26. The communication system of claim 25 where the message encoding means comprises means to impress continuous wave modulation on the second portion of the spectrum.

27. The communication system of claim 24 where the message information is encoded by pluse modulation of the discrete frequency.

28. The communication system of claim 26 where the modulator comprises means to pulse position modulate the single frequency.

29. The communication system of claim 17 where, in the absence of a call, all units are maintained in complete asynchronism relative to each other and where each unit includes means responsive to the reception of a supervisory message uniquely addressed thereto, to establish local synchronism with the callee and to return an acknowledgement message thereto.

30. The communication system of claim 27 where, upon failure to receive an acknowledgement message, a supervisory message is uniquely addressed to one of the retransmission units, the message including a request that the retransmission unit generate and transmit the first portion of the spectrum, including the uniquely identifying characteristic of the called basic communication unit, with a supervisory message modulated thereon.

31. A radio communication system comprising a plurality of user basic communications units, a plurality of retransmission units for relaying the message traffic between said user basic communications units, said retransmission units having a greater range than said user basic communications units, and automatic means for establishing a message channel connection between any two of said user basic communications units said automatic means including means for limiting reception of a given message to a pair of units between which communication is desired.

32. A system according to claim 31, wherein a direct-dialing connection is established directly between basic communications units within radio propagation range of each other, and through at least one of said retransmission units when the basic communications units are beyond radio propagation range of each other.

33. A radio communication system comprising a plurality of basic subscriber units having a plurality of exclusive transmission channels less than the number of possible simultaneous transmissions between said units, means in said units for transmitting co-channel address information between said units, said latter means including means for limiting reception of a given co-channel address to only the two units between which such communication is desired, and means in said units responsive to the initiation of a call between such two units for assigning an unused channel to said two units.

34. A system according to claim 33 wherein said channel assigning means senses the signal-to-noise ratio in successive channels until an unused channel is found.

35. A radio telephone system comprising a plurality of basic subscriber units having a hand set and transmitting and receiving means, means establishing a plurality of frequency-spaced channels in each of said units less than the number of possible simultaneous calls between said hand sets, means responsive to the initiation of a call from one of said hand sets for automatically assigning a free channel to said call, and means in each of said units for generating a pulse in three of said channels representative of at least a portion of the address of the called hand set.

36. A system according to claim 35 wherein said pulses generated in the three channels are time spaced.

37. A system according to claim 35 wherein said channels are pulse position modulation message channels having a bandwidth on the order of 50 $KH_z$.

38. A signal transmission system comprising a plurality of basic subscriber units operative in the same portion of the spectrum and having co-channel supervisory transmitters and receivers, said units also including exclusive channel transmitters and receivers, means in said units for transmitting and receiving co-channel supervisory information including digital addresses, latter means including means for limiting reception of the co-channel supervisory information to any two units between which communication is desired, and means in said units for transmitting and receiving pulse position modulation messages.

39. A method of establishing communications between remote telephones having a number of message channels less than the possible number of simultaneous transmissions between the telephones of the telephone system comprising finding an open message channel, addressing the called party in such a manner that only such called party receives the call, acknowledging the call by the called party giving his status, initiating a search to find if the channel recommended by the calling party is in fact open to the called party, and commencing transmission in a substantially private manner.

40. A radio communications system comprising a plurality of basic subscriber units having transmitting and receiving means, means for establishing a plurality of frequency-spaced channels in each of said basic subscriber units, less than the number of possible simultaneous calls between said basic subscriber units, means responsive to the initiation of a call from one of said basic subscriber units to a called unit for automatically assigning a free channel to said call, means in each of said units for generating addressing and signaling codes representing the calling address of the called basic subscriber unit, means for transmitting said codes, and means in each of said units for receiving and accepting said addressing and signaling codes where said codes represent its calling address, and rejecting said codes where said codes represent the calling address of another basic subscriber unit.

41. A system according to claim 40 wherein said radio communications system transmits and receives voice signals.

42. A system according to claim 40 wherein said radio communications system transmits and receives data signals.

43. A system according to claim 40 wherein said addressing and signaling codes are digital words.

44. A system according to claim 40 wherein said means for generating addressing and signaling codes include means for transmitting said codes on one or more of said frequency-spaced channels without regard to use of said channels by other users, and means in the called subscriber unit for receiving said addressing and signaling codes without regard to use of said channels by other users.

45. A system according to claim 40 wherein said means for generating addressing and signaling codes include means for generating pulses in more than one of said channels, said pulses being spaced in time, thereby producing a frequency-time code representative of at least a portion of the address of the called basic subscriber unit.

46. A system according to claim 40 wherein said means for automatically assigning a free channel to said call include coding means for generating an identification for such selected channel, wherein said means for generating signaling codes are responsive to such identification, and wherein the called basic subscriber unit includes means responsive to such channel identification signaling codes, thereby automatically setting the called unit to said assigned free channel.

47. A system according to claim 46 wherein a calling basic subscriber unit and a called basic subscriber unit having said means for automatically assigning a free channel to said call, each have means for determining which channels are free in the geographical area of each of said units, means for sequentially transmitting and receiving respective channel identification signaling codes between said called unit and said calling unit until a channel is found which is mutually free to both of said units.

48. A system according to claim 47 wherein said basic subscriber units include automatic control means for reducing transmitted power and receiver sensitivity to the lowest level satisfactory for communication, thereby increasing the number of free channels available to other basic subscriber units in other geographical locations.

* * * * *